United States Patent
Yamada

(10) Patent No.: US 8,790,023 B2
(45) Date of Patent: Jul. 29, 2014

(54) SHOCK-ABSORBING MECHANISM FOR MOVABLE MIRROR OF CAMERA

(71) Applicant: Ricoh Imaging Company, Ltd., Tokyo (JP)

(72) Inventor: Toshiaki Yamada, Saitama (JP)

(73) Assignee: Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 14/081,146

(22) Filed: Nov. 15, 2013

(65) Prior Publication Data

US 2014/0072291 A1 Mar. 13, 2014

Related U.S. Application Data

(62) Division of application No. 13/231,095, filed on Sep. 13, 2011, now Pat. No. 8,608,391.

(30) Foreign Application Priority Data

| | | |
|---|---|---|
| Sep. 14, 2010 | (JP) | 2010-206045 |
| Sep. 14, 2010 | (JP) | 2010-206046 |
| Sep. 14, 2010 | (JP) | 2010-206047 |
| Sep. 1, 2011 | (JP) | 2011-190289 |

(51) Int. Cl.
*G03B 19/12* (2006.01)
*G03B 17/00* (2006.01)

(52) U.S. Cl.
USPC .......................... 396/358; 396/447

(58) Field of Classification Search
USPC .................. 396/354, 356, 358, 447
See application file for complete search history.

(56) References Cited

U.S. PATENT DOCUMENTS

| | | |
|---|---|---|
| 8,061,908 B2 | 11/2011 | Yamana et al. |
| 8,608,391 B2 | 12/2013 | Yamada |
| 8,628,259 B2 * | 1/2014 | Seita ............................ 396/447 |
| 2013/0108257 A1 | 5/2013 | Yamada |
| 2013/0136441 A1 | 5/2013 | Yamada |

FOREIGN PATENT DOCUMENTS

JP 2000-131755 5/2000

OTHER PUBLICATIONS

U.S. Appl. No. 14/081,136 to Toshiaki Yamada, which was filed on Nov. 15, 2013.

* cited by examiner

*Primary Examiner* — W B Perkey
*Assistant Examiner* — Minh Phan
(74) *Attorney, Agent, or Firm* — Greenblum & Bernstein, P.L.C.

(57) ABSTRACT

A movable mirror shock-absorbing mechanism of a camera is provided and includes a movable mirror rotatable between a viewfinder light-guiding position and a retracted position, a first shock-absorbing member which comes into contact with, and is pressed and moved by, the movable mirror when the movable mirror rotates between the retracted position and the viewfinder light-guiding position, and a second shock-absorbing member which supports the first shock-absorbing member in a manner to allow the first shock-absorbing member to move relative to the second shock-absorbing member, and when the movable mirror rotates, firstly the second shock-absorbing member moves the first shock-absorbing member solely in a pressing-moving direction in which the first shock-absorbing member is pressed and moved by the movable mirror, and subsequently the second shock-absorbing member is moved with the first shock-absorbing member in the pressing-moving direction.

9 Claims, 51 Drawing Sheets

SHOCK-ABSORBING MECHANISM FOR MOVABLE MIRROR OF CAMERA

CROSS-REFERENCE TO RELATED APPLICATION

This application is a divisional of pending U.S. patent application Ser. No. 13/231,095, filed on Sep. 13, 2011, which claims priority to Japanese Application No. 2011-190289, filed Sep. 1, 2011, and No. 2010-206045, filed Sep. 14, 2010, and No. 2010-206046, filed Sep. 14, 2010 and No. 2010-206047, filed Sep. 14, 2010, the contents of which are expressly incorporated herein by reference in their entireties.

BACKGROUND OF THE INVENTION

1. Field of the Invention

The present invention relates to a drive mechanism for driving a movable mirror provided in a camera, and in particular to a shock-absorbing mechanism, provided in association with the drive mechanism, for the movable mirror.

2. Description of the Related Art

In SLR cameras, a movable mirror (quick-return mirror) is installed to be capable of moving up and down, more specifically, capable of rotating between a viewfinder light-guiding position (mirror-down position), in which the movable mirror is positioned onto a photographing optical path to reflect incident light from an object (object-emanated light) toward a viewfinder optical system, and a retracted position (mirror-up position), in which the movable mirror is retracted from the photographing optical path to allow the object-emanated light to travel toward the shutter. Rotation (swinging) of the movable mirror is limited by engagement of the movable mirror with a positioning member(s) provided in a mirror box which accommodates the movable mirror; however, if the rotating speed of the movable mirror is fast, the movable mirror bounces (vibrates) due to shock caused upon coming into contact with the positioning member(s). This bouncing of the movable mirror makes the image that is viewed through the viewfinder unstable, causing an adverse effect on the viewing performance of the viewfinder. Additionally, in a camera which is structured to lead light from an object to a distance measuring sensor and a photometering sensor via a movable mirror, a precise distance measuring operation or photometering operation cannot be performed during such bouncing of the movable mirror, which restricts sequential photographing performance. Because of such reasons, various shock-absorbing mechanisms which absorb shock of the movable mirror when it rotates to reduce bouncing of the movable mirror have been proposed. Examples of conventional shock-absorbing mechanisms include a type of shock-absorbing mechanism which makes the movable mirror come into contact with an elastic member and another type of shock-absorbing mechanism which makes the movable mirror come into contact with a movable member which is biased tending to move by a biasing member.

A high positioning accuracy of the movable mirror is required specifically when the movable mirror is in the aforementioned viewfinder light-guiding position, in which the movable mirror exerts a direct influence on the viewing performance of the viewfinder, and when the movable mirror is in the aforementioned retracted position, in which an exposure operation is performed; accordingly, it is necessary for the positioning of the movable mirror to be made using a special positioning member and for the shock-absorbing mechanism to be constructed so as not to interfere with the positioning that is made using this special positioning member. In other words, a shock-absorbing mechanism for a movable mirror provided in a camera is required not only to reduce bouncing of the movable mirror when rotating, but also is required not to interfere with the positioning of the movable mirror upon reaching either rotational limit thereof; however, satisfying these requirements tends to complicate the structure of the shock-absorbing mechanism.

Furthermore, if the biasing force that acts on a shock-absorbing movable member(s) (shock-absorbing member) is strengthened, the absorbing efficiency of the moving energy of the movable mirror increases; however, if the biasing force becomes too strong, the load on the movable mirror becomes excessive, so that there is a risk of not being able to reliably move the shock-absorbing movable member to a position corresponding to a mirror-up position or a mirror-down position of the movable mirror. On the other hand, if the biasing force that acts on the shock-absorbing movable member is too weak, a sufficient shock-absorbing capability cannot be obtained. Hence, there is a need for a shock-absorbing mechanism which can reliably operate a movable mirror while having a high shock-absorbing capability. In an attempt to solve the above-described problem, it is conceivable to provide an independent drive mechanism that moves the shock-absorbing movable member to a predetermined position at the final stage of the mirror-up operation/mirror-down operation; however, the number of components increases and the structure therefor becomes complicated, having the disadvantage of increasing (manufacturing) costs and increasing the size of the camera itself.

SUMMARY OF THE INVENTION

The present invention provides a shock-absorbing mechanism for a movable mirror of a camera which absorbs shock of the movable mirror when it operates and which makes an accurate positioning of the movable mirror possible upon the movable mirror reaching either rotational limit thereof even though the shock-absorbing mechanism is small in the number of components and simple in structure.

In addition, a shock-absorbing mechanism for a movable mirror of a camera has been required to display a high shock-absorbing capability with as simple and compact structure as possible, and the present invention provides a shock-absorbing mechanism for a movable mirror of a camera which is simple and compact in structure, and superior in shock-absorbing capability when the movable mirror rotates.

In addition, the present invention provides a movable mirror shock-absorbing mechanism which can achieve both a high shock-absorbing capability and a reliable driving operation of the movable mirror, while having a simple and compact structure.

According to an aspect of the present invention, a movable mirror shock-absorbing mechanism of a camera is provided, including a movable mirror which is supported to be rotatable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a mirror-advancing shock-absorbing member which comes into contact with, and is pressed and moved by, the movable mirror to absorb shock of the movable mirror when the movable mirror rotates from the retracted position to the viewfinder light-guiding position; and a mirror-retracting shock-absorbing member which comes into contact with, and is pressed and moved by, the movable mirror to absorb shock of the movable mirror when the movable mirror rotates from the viewfinder light-guiding position to the retracted position. The mirror-advancing shock-absorbing member is held in a position so as not to contact with the movable mirror by the mirror-retracting shock-absorbing member when the movable mirror is in the viewfinder light-guiding position.

According to this structure, the mirror-advancing shock-absorbing member, which absorbs shock of the movable mirror when the movable mirror rotates to the viewfinder light-guiding position, is held in a position (non-contact position) so as not to be contact with the movable mirror in a state where the movable mirror has reached the viewfinder light-guiding position, and accordingly, the viewfinder light-guiding position of the movable mirror can be set with high precision without being affected by the mirror-advancing shock-absorbing member. In addition, since the mirror-retracting shock-absorbing member, which absorbs shock of the movable mirror when the movable mirror rotates to the retracted position, is also used as a holder which holds the mirror-advancing shock-absorbing member in the aforementioned non-contact position, the movable mirror shock-absorbing mechanism has a small number of components and is simple in structure, which makes it possible to achieve miniaturization of the camera and a reduction of the production cost.

It is desirable for the movable mirror shock-absorbing mechanism to include a first biaser which biases the mirror-advancing shock-absorbing member in a direction to bring the mirror-advancing shock-absorbing member into contact with the movable mirror; and a second biaser which biases the mirror-retracting shock-absorbing member in a direction to bring the mirror-retracting shock-absorbing member into contact with the movable mirror. The mirror-advancing shock-absorbing member is rotatable about a shaft that is substantially parallel to an axis of rotation of the movable mirror. The movable mirror presses the mirror-advancing shock-absorbing member against a biasing force of the first biaser when rotating from the retracted position to the viewfinder light-guiding position. The mirror-retracting shock-absorbing member is linearly movable along a plane substantially orthogonal to the axis of rotation of the movable mirror. The mirror-retracting shock-absorbing member includes a rotation-restricting portion which moves into a path of rotational movement of the mirror-advancing shock-absorbing member to restrict a range of rotational movement of the mirror-advancing shock-absorbing member when the mirror-retracting shock-absorbing member moves to a movement limit thereof in a biasing direction of the second biaser, and which retracts from the path of rotational movement of the mirror-advancing shock-absorbing member when the mirror-retracting shock-absorbing member is pressed and moved by the movable mirror in a direction opposite to the biasing direction of the second biaser.

It is desirable for the mirror-advancing shock-absorbing member to include a rotationally restricted surface which comes into contact with the rotation-restricting portion of the mirror-retracting shock-absorbing member when movement of the mirror-advancing shock-absorbing member is restricted by the mirror-retracting shock-absorbing member; and a rotation allowance surface which is positioned radially outside of the rotationally restricted surface, with respect to the shaft, and allows the mirror-advancing shock-absorbing member to rotate while restricting movement of the mirror-retracting shock-absorbing member in the biasing direction of the second biaser when in contact with the rotation-restricting portion of the mirror-retracting shock-absorbing member.

It is desirable for the camera to include a mirror box which accommodates and supports the movable mirror between a pair of laterally-opposed side walls, wherein the mirror-advancing shock-absorbing member and the mirror-retracting shock-absorbing member are supported by one of the pair of side walls of the mirror box. The mirror-advancing shock-absorbing member and the mirror-retracting shock-absorbing member include a protruded contact portion and a protruded contact portion, respectively, each of which projects into the mirror box to be contactable with the movable mirror. The mirror box includes a mirror positioning portion which projects from the other of the pair of side walls to define the viewfinder light-guiding position of the movable mirror. The mirror-advancing shock-absorbing member comes into contact with the rotation-restricting portion of the mirror-retracting shock-absorbing member to be held in a position to make the protruded contact portion of the mirror-retracting shock-absorbing member disengaged from the movable mirror when the movable mirror comes into contact with the mirror positioning portion to be held in the in the viewfinder light-guiding position.

It is desirable for the mirror box to include a first limit portion which defines a rotational limit of the mirror-advancing shock-absorbing member in a biasing direction of the first biaser, and a second limit portion which defines a movement limit of the mirror-retracting shock-absorbing member in the biasing direction of the second biaser.

It is desirable for the first biaser to include a torsion spring which is engaged with the mirror box and the mirror-advancing shock-absorbing member, and for the second biaser to include an extension spring which is engaged with the mirror box and the mirror-retracting shock-absorbing member.

It is desirable for the first biaser to include a torsion spring which is engaged with the mirror box and the mirror-advancing shock-absorbing member, and for the second biaser to include a torsion spring which is engaged with the mirror box and the mirror-retracting shock-absorbing member.

In an embodiment, a movable mirror shock-absorbing mechanism of a camera is provided, including a movable mirror which is supported to be movable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a first shock-absorbing member which comes into contact with, and is pressed and moved by, the movable mirror to absorb shock of the movable mirror when the movable mirror rotates in one direction between the retracted position and the viewfinder light-guiding position; a second shock-absorbing member which comes into contact with, and is pressed and moved by, the movable mirror to absorb shock of the movable mirror when the movable mirror rotates in the other direction between the viewfinder light-guiding position and the retracted position; and an engaging mechanism provided on the first shock-absorbing member and the second shock-absorbing member. A range of movement of at least one of the first shock-absorbing member and the second shock-absorbing member includes a shock-absorbing moving range, in which the at least one of the first shock-absorbing member and the second shock-absorbing member comes into contact with and is pressed and moved by the movable mirror, and an overrun range that exceeds the shock-absorbing moving range in which the at least one of the first shock-absorbing member and the second shock-absorbing member is not in contact with the movable mirror. When one of the first shock-absorbing member and the second shock-absorbing member, the range of movement of which includes the overrun range, is pressed and moved by the movable mirror, the engaging mechanism engages the one of the first shock-absorbing member and the second shock-absorbing member with the other of the first shock-absorbing member and the second shock-absorbing member to be held in the overrun range.

According to this structure, at least one of the two shock-absorbing members, which absorb shock of the movable mirror when the movable mirror rotates to the viewfinder light-guiding position and the retracted position, respectively, also serves as a holder which holds the mirror-up shock-absorbing lever in the overrun range, in which the other shock-absorbing member is not in contact with the movable mirror; accordingly, the positioning of the movable mirror can be made with high precision without being affected by the shock-absorbing members. Moreover, the structure of the movable mirror shock-absorbing mechanism can be simplified by reducing the number of components thereof.

It is desirable for a range of movement of at least the first shock-absorbing member to include the overrun range, wherein the engaging mechanism includes a first biaser which biases the first shock-absorbing member in a direction opposite to a pressing-moving direction in which the first shock-absorbing member is pressed and moved by the movable mirror; a second biaser which biases the second shock-absorbing member in a direction opposite to a pressing-moving direction in which the second shock-absorbing member is pressed and moved by the movable mirror; an engaging surface formed on the first shock-absorbing member to face in a biasing direction of the first biaser; and a movement restricting portion which is formed on the second shock-absorbing member and moves into a path of movement of the engaging surface of the second shock-absorbing member in accordance with movement of the second shock-absorbing member. When the second shock-absorbing member moves in a biasing direction of the second biaser, the movement restricting portion moves into the path of movement of the engaging surface of the first shock-absorbing member, and the engaging surface and the movement restricting portion are engaged with each other by a biasing force of the first biaser to hold the first shock-absorbing member in the overrun range. When the second shock-absorbing member is pressed and moved by the movable mirror against a biasing force of the second biaser, the movement restricting portion retracts from the path of movement of the engaging surface of the first shock-absorbing member.

In an embodiment, a movable mirror shock-absorbing mechanism of a camera, including a movable mirror which is supported to be rotatable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a mirror-retracting shock-absorbing member which comes into contact with, and is pressed and moved in a first pressing-moving direction by, the movable mirror to absorb shock of the movable mirror when the movable mirror rotates from the viewfinder light-guiding position to the retracted position; and a mirror-advancing shock-absorbing member which is held in a limit position in which a range of movement of the mirror-retracting shock-absorbing member in a direction opposite to the first pressing-moving direction is limited when the movable mirror is in the retracted position, wherein the mirror-advancing shock-absorbing member comes into contact with, and is pressed and moved in a second pressing-moving direction by, the movable mirror from the limit position to release the limitation of the range of movement of the mirror-retracting shock-absorbing member and to absorb shock of the movable mirror when the movable mirror rotates from the retracted position to the viewfinder light-guiding position.

According to this structure, the bouncing action of the mirror-retracting shock-absorbing member, which absorbs shock of the movable mirror when the movable mirror rotates to the retracted position, is limited by the mirror-advancing shock-absorbing member, which absorbs shock of the movable mirror when the movable mirror rotates to the viewfinder light-guiding position, so that no additional member for suppressing bouncing of the mirror-retracting shock-absorbing member is required. Accordingly, the movable mirror shock-absorbing mechanism has a small number of components and is simple in structure, which makes it possible to achieve miniaturization of the camera and a reduction of the production cost.

It is desirable for the movable mirror shock-absorbing mechanism to include a first biaser which biases the mirror-advancing shock-absorbing member in a direction opposite to the second pressing-moving direction; and a second biaser which biases the mirror-retracting shock-absorbing member in a direction opposite to the first pressing-moving direction. The mirror-retracting shock-absorbing member is linearly movable along a plane substantially orthogonal to an axis of rotation of the movable mirror. The mirror-advancing shock-absorbing member is rotatable about a shaft substantially parallel to the axis of rotation of the movable mirror. The movable mirror shock-absorbing mechanism further includes a rotational limit portion which limits rotational movement of the mirror-advancing shock-absorbing member in the biasing direction of the first biaser to hold the mirror-advancing shock-absorbing member in the limit position.

It is desirable for the mirror-advancing shock-absorbing member to include a movement restricting portion which projects outwardly in a radial direction of the shaft. The movement restricting portion moves into a path of movement of a restricted portion formed on the mirror-retracting shock-absorbing member to restrict movement of the mirror-retracting shock-absorbing member in the biasing direction of the second biaser by engagement of the movement restricting portion with the restricted portion when the mirror-advancing shock-absorbing member is in the limit position. A rotation of the mirror-advancing shock-absorbing member from the limit position in a direction opposite to the biasing direction of the first biaser causes the movement restricting portion to retract from the path of movement of the restricted portion to release the restriction of the movement of the mirror-retracting shock-absorbing member in the biasing direction of the second biaser.

It is desirable for the movement restricting portion of the mirror-advancing shock-absorbing member to include a slide contact surface which contacts the restricted portion by the biasing force of the first biaser during movement of the mirror-retracting shock-absorbing member when the mirror-retracting shock-absorbing member comes into contact with and is pressed and moved by the movable mirror. The mirror-retracting shock-absorbing member is pressed and moved by the movable mirror while the restricted portion is in sliding contact with the slide contact surface.

It is desirable for the camera to include a mirror box which accommodates and supports the movable mirror between a pair of laterally-opposed side walls, wherein the mirror-retracting shock-absorbing member and the mirror-advancing shock-absorbing member are supported by one of the pair of side walls of the mirror box, and the rotational limit portion is formed on the one of the pair of side walls of the mirror box.

It is desirable for the camera to include a mirror box which accommodates and supports the movable mirror, wherein the first biaser includes a torsion spring which is engaged with the mirror box and the mirror-advancing shock-absorbing member, and the second biaser includes an extension spring which is engaged with the mirror box and the mirror-retracting shock-absorbing member.

It is desirable for the camera to include a mirror box which accommodates and supports the movable mirror, wherein the first biaser includes a torsion spring which is engaged with the mirror box and the mirror-advancing shock-absorbing member, and the second biaser includes a torsion spring which is engaged with the mirror box and the mirror-retracting shock-absorbing member.

In an embodiment, a movable mirror shock-absorbing mechanism of a camera is provided, including a movable mirror which is supported to be movable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a first shock-absorbing member which comes into contact with, and is pressed and moved by, the movable mirror to absorb shock of the movable mirror when the movable mirror rotates in one direction between the retracted position and the viewfinder light-guiding position; and a second shock-absorbing member which comes into contact with, and is pressed and moved by, the movable mirror to absorb shock of the movable mirror when the movable mirror rotates in the other direction between the viewfinder light-guiding position and the retracted position. When one of the first shock-absorbing member and the second shock-absorbing member is pressed and moved in a pressing-moving direction by the movable mirror, the other of the first shock-absorbing member and the second shock-absorbing member restricts a range of movement of the one of the first shock-absorbing member and the second shock-absorbing member in a direction opposite to the pressing-moving direction.

According to this structure, at least one of the two shock-absorbing members, which absorb shock of the movable mirror when the movable mirror rotates to the viewfinder light-guiding position and the retracted position, respectively, functions to limit the range of movement of the other shock-absorbing member in a direction opposite to the pressing-moving direction, in which the aforementioned one shock-absorbing member is pressed and moved by the movable mirror, so that bounding of the movable mirror can be suppressed with a small number of components.

It is desirable for each of the first shock-absorbing member and the second shock-absorbing member to be biased by a biasing force to move in a direction opposite to the pressing-moving direction, and wherein, when one of the first shock-absorbing member and the second shock-absorbing member is pressed and moved by the movable mirror, the other of the first shock-absorbing member and the second shock-absorbing member is held, by the biasing force, in a limit position in which a range of movement of the one of the first shock-absorbing member and the second shock-absorbing member is limited.

In an embodiment, a movable mirror shock-absorbing mechanism of a camera is provided, including a movable mirror which is supported to be rotatable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a first mirror-retracting shock-absorbing member which comes into contact with, and is pressed and moved by, the movable mirror when the movable mirror rotates from the viewfinder light-guiding position to the retracted position; a second mirror-retracting shock-absorbing member which supports the first mirror-retracting shock-absorbing member in a manner to allow the first mirror-retracting shock-absorbing member to move relative to the second mirror-retracting shock-absorbing member, wherein, when the movable mirror rotates from the viewfinder light-guiding position to the retracted position, firstly the second mirror-retracting shock-absorbing member moves the first mirror-retracting shock-absorbing member solely in a pressing-moving direction in which the first mirror-retracting shock-absorbing member is pressed and moved by the movable mirror, and subsequently the second mirror-retracting shock-absorbing member is moved with the first mirror-retracting shock-absorbing member in the pressing-moving direction; a biaser which biases each of the first mirror-retracting shock-absorbing member and the second mirror-retracting shock-absorbing member in a direction opposite to the pressing-moving direction; and a holder which limits movements of the first mirror-retracting shock-absorbing member and the second mirror-retracting shock-absorbing member in a biasing direction of the biaser when the first mirror-retracting shock-absorbing member and the second mirror-retracting shock-absorbing member are pressed and moved in a direction opposite to the biasing direction of the biaser by the movable mirror which rotates toward the retracted position.

According to this structure, when the movable mirror rotates from the viewfinder light-guiding position to the retracted position, firstly the first mirror-retracting shock-absorbing member is solely pressed and moved, and subsequently the second mirror-retracting shock-absorbing member that supports the first mirror-retracting shock-absorbing member is pressed and moved together with the first mirror-retracting shock-absorbing member, so that the space for movement of each shock-absorbing member is minimized while the duration of the shock-absorbing action by the shock-absorbing members can be extended. Additionally, when the movable mirror rotates to the retracted position, the bouncing actions of the first mirror-retracting shock-absorbing member and the second mirror-retracting shock-absorbing member can be reduced by the holder. This makes it possible to obtain a movable mirror shock-absorbing mechanism which is superior in shock-absorbing capability at the time the movable mirror rotates from the viewfinder light-guiding position to the retracted position, even though the movable mirror shock-absorbing mechanism is compact in structure. Additionally, it is easy to impose an optimum load on the movable mirror by independently setting the biasing forces of the first mirror-retracting shock-absorbing member and the second mirror-retracting shock-absorbing member, and the degree of freedom in the setting of the shock-absorbing capability is high.

It is desirable for the holder to include a mirror-advancing shock-absorbing member which is held in a movement limit position in which movement of the second mirror-retracting shock-absorbing member in the biasing direction of the biaser is limited when the movable mirror is in the retracted position, and which comes into contact with and is pressed and moved by the movable mirror from the movement limit position to absorb shock of the movable mirror and release the limitation to the movement of the second mirror-retracting shock-absorbing member when the movable mirror rotates from the retracted position to the viewfinder light-guiding position; and an interlocking lock member which is moved in association with movement of the second mirror-retracting shock-absorbing member between a lock position in which movement of the first mirror-retracting shock-absorbing member relative to the second mirror-retracting shock-absorbing member is restricted, and an unlock position in which the first mirror-retracting shock-absorbing member is allowed to move relative to the second mirror-retracting shock-absorbing member. The interlocking lock member is held in the lock position when the second mirror-retracting shock-absorbing member is in a position in which movement thereof is restricted by the mirror-advancing shock-absorbing member. A movement in the biasing direction of the biaser of the second mirror-retracting shock-absorbing member which is released from the restriction in movement thereof by the mirror-advancing shock-absorbing member causes the interlocking lock member to move to the unlock position.

In addition, the holder for the first mirror-retracting shock-absorbing member and the second mirror-retracting shock-absorbing member can be simplified with a small number of components by configuring the holder of the following two members: an interlocking lock member which allows the first mirror-retracting shock-absorbing member to move relative to the second mirror-retracting shock-absorbing member or prevents the first mirror-retracting shock-absorbing member from moving relative to the second mirror-retracting shock-absorbing member in association with movement of the second mirror-retracting shock-absorbing member, and a mirror-advancing shock-absorbing member which absorbs shock of the movable mirror and releases the limitation of the movement of the second mirror-retracting shock-absorbing member when the movable mirror rotates from the retracted position to the viewfinder light-guiding position.

It is desirable for each of the first mirror-retracting shock-absorbing member and the second mirror-retracting shock-absorbing member to be linearly movable along a plane substantially orthogonal to an axis of rotation of the movable mirror. The interlocking lock member is rotatable about a shaft which is substantially parallel to the axis of rotation of the movable mirror and includes a radial projection which projects in a radial direction of the shaft. The radial projection is positioned in a path of movement of a restricted portion formed on the first mirror-retracting shock-absorbing member to restrict the movement of the first mirror-retracting shock-absorbing member in the biasing direction of the biaser by engagement of the radial projection with the restricted portion when the interlocking member is in the lock position. The radial projection retracts from the path of movement of the restricted portion to allow the first mirror-retracting shock-absorbing member to move in the biasing direction of the biaser when the interlocking lock member moves to the unlock position from the lock position.

It is desirable for the camera to include a mirror box which accommodates and supports the movable mirror between a pair of laterally-opposed side walls, wherein the first mirror-retracting shock-absorbing member and the second mirror-retracting shock-absorbing member are supported on one of the pair of side walls of the mirror box. The biaser includes a first spring which is engaged with the mirror box and the first mirror-retracting shock-absorbing member; and a second spring which is engaged with the mirror box and the second mirror-retracting shock-absorbing member.

It is desirable for the movable mirror shock-absorbing mechanism to including a rotational biaser which biases and rotates the mirror-advancing shock-absorbing member toward the movement limit position. The mirror-advancing shock-absorbing member is rotatable about a shaft which is substantially parallel to an axis of rotation of the movable mirror. The movable mirror presses the mirror-advancing shock-absorbing member against a biasing force of the rotational biaser when the movable mirror rotates to the viewfinder light-guiding position.

It is desirable for the second mirror-retracting shock-absorbing member to include a locking portion which defines a movement limit of the second mirror-retracting shock-absorbing member in the biasing direction of the biaser by engagement with a fixed member; and a rotation-restricting portion which moves into a path of rotational movement of the mirror-advancing shock-absorbing member to prevent the mirror-advancing shock-absorbing member from rotating to the movement limit position when the second mirror-retracting shock-absorbing member moves to a position to make the locking portion contact the fixed member, and which retracts from the path of rotational movement of the mirror-advancing shock-absorbing member to allow the mirror-advancing shock-absorbing member to rotate when the second mirror-retracting shock-absorbing member is pressed and moved with the first mirror-retracting shock-absorbing member by the movable mirror in a direction opposite to the biasing direction of the biaser.

It is desirable for the mirror-advancing shock-absorbing member to include a rotationally restricted surface which comes into contact with the rotation-restricting portion of the second mirror-retracting shock-absorbing member to be prevented from rotating to the movement limit position; and a rotation allowance surface which is positioned radially outside of the rotationally restricted surface, wherein, when the mirror-advancing shock-absorbing member is in the movement limit position, the rotation allowance surface contacts the second mirror-retracting shock-absorbing member to restrict movement of the second mirror-retracting shock-absorbing member in the biasing direction of the biaser and to allow the mirror-advancing shock-absorbing member to rotate.

Additionally, a further simplification of the structure of the movable mirror shock-absorbing mechanism becomes possible by limiting rotational movement of the mirror-advancing shock-absorbing member by the second mirror-retracting shock-absorbing member when the movable mirror rotates to the viewfinder light-guiding position, contrary to when the movable mirror rotates to the retracted position.

In an embodiment, a movable mirror shock-absorbing mechanism of a camera is provided, including a movable mirror which is supported to be rotatable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a first shock-absorbing member which comes into contact with and is pressed and moved by the movable mirror when the movable mirror rotates in one direction between the viewfinder light-guiding position and the retracted position; a second shock-absorbing member which supports the first shock-absorbing member in a manner to allow the first shock-absorbing member to move relative to the second shock-absorbing member, wherein, when the movable mirror rotates in the one direction, firstly the second shock-absorbing member moves the first shock-absorbing member solely in a pressing-moving direction in which the first shock-absorbing member is pressed and moved by the movable mirror, and subsequently the second shock-absorbing member is moved with the first shock-absorbing member in the pressing-moving direction; a biaser which biases each of the first shock-absorbing member and the second shock-absorbing member in a direction opposite to the pressing-moving direction; and a holder which limits movements of the first shock-absorbing member and the second shock-absorbing member in a biasing direction of the biaser when the first shock-absorbing member and the second shock-absorbing member are pressed and moved by the movable mirror in a direction opposite to the biasing direction of the biaser.

Technical ideas of the present invention can be applied to either case where the movable mirror rotates in one direction or the other direction; according to the second embodiment of the movable mirror shock-absorbing mechanism, similar effects can be obtained even if the rotation directions of the movable mirror are reversed to those in the first embodiment of the movable mirror shock-absorbing mechanism.

It is desirable for the holder to include a third shock-absorbing member which is held in a movement limit position in which movement of the second shock-absorbing member in the biasing direction of the biaser is limited when the movable mirror rotates in the one direction to press and move the first shock-absorbing member and the second shock-absorbing member, and which comes into contact with, and is pressed and moved by, the movable mirror from the movement limit position to release the limitation of the movement of the second shock-absorbing member and to absorb shock of the movable mirror when the movable mirror rotates in a direction opposite to the one direction; and an interlocking lock member which is moved in association with movement of the second shock-absorbing member between a lock position in which the first shock-absorbing member is prevented from moving relative to the second shock-absorbing member and an unlock position in which the first shock-absorbing member is allowed to move relative to the second shock-absorbing member. The interlocking lock member is held in the lock position when the second shock-absorbing member is in a position in which movement thereof is restricted by the third shock-absorbing member. A movement in the biasing direction of the biaser of the second shock-absorbing member which is released from limitation of movement thereof by the third shock-absorbing member causes the interlocking lock member to move to the unlock position.

In an embodiment, a movable mirror shock-absorbing mechanism of a camera is provided, including a movable mirror which is supported to be rotatable between a viewfinder light-guiding position, in which the movable mirror is positioned in a photographing optical path to reflect incident light from an object toward a viewfinder optical system, and a retracted position, in which the movable mirror is retracted from the photographing optical path to allow the object light to travel toward a photographic light-receiving medium; a first shock-absorbing member which is held at a first shock-absorbing standby position by a first biaser, so that when the movable mirror rotates from the retracted position to the viewfinder light-guiding position, the first shock-absorbing member absorbs shock of the movable mirror by abutting and being pressed by the movable mirror so that the first shock-absorbing member moves against a biasing force of the first biaser; a second shock-absorbing member which is held at a second shock-absorbing standby position by a second biaser, so that when the movable mirror rotates from the viewfinder light-guiding position to the retracted position, the second shock-absorbing member absorbs shock of the movable mirror by abutting and being pressed by the movable mirror so that the second shock-absorbing member moves against a biasing force of the second biaser; and an auxiliary pressing member which is provided on at least one of the first and second shock-absorbing members, wherein the auxiliary pressing member applies a movement force in the direction of pressing movement that is applied by the movable mirror from the one of the first and second shock-absorbing members, which is returned toward the shock-absorbing standby position by the biasing force of the one of the first and second biasers, against the other of the first and second shock-absorbing members that is movably pressed by the movable mirror.

It is desirable for the auxiliary pressing member to include a first sliding contact surface provided on the first shock-absorbing member, the first sliding contact surface applying a component force in the direction of pressing movement that is applied by the movable mirror against the second shock-absorbing member upon the first sliding contact surface abutting against the second shock-absorbing member by the biasing force of the first biaser so as to slide along the abutting surfaces therebetween, while the second shock-absorbing member is movably pressed by the movable mirror; and a second sliding contact surface provided on the second shock-absorbing member, the second sliding contact surface applying a component force in the direction of pressing movement that is applied by the movable mirror against the first shock-absorbing member upon the second sliding contact surface abutting against the first shock-absorbing member by the biasing force of the second biaser so as to slide along the abutting surfaces therebetween, while the first shock-absorbing member is movably pressed by the movable mirror.

It is desirable for the first shock-absorbing member to be provided with a first movement control member which enters into a position which restricts movement of the second shock-absorbing member toward the second shock-absorbing standby position thereof when the first shock-absorbing member is held at the first shock-absorbing standby position by the first biaser, and wherein the first sliding contact surface is formed as part of an outer surface of the first movement control member; and for the second shock-absorbing member to be provided with a second movement control member which enters into a position which restricts movement of the first shock-absorbing member toward the first shock-absorbing standby position thereof when the second shock-absorbing member is held at the second shock-absorbing standby position by the second biaser, and wherein the second sliding contact surface is formed as part of an outer surface of the second movement control member.

It is desirable for the first shock-absorbing member to be rotatable about a rotational axis that is substantially parallel to a rotational axis of the movable mirror, wherein the first sliding contact surface is inclined with respect to a rotational direction of the first shock-absorbing member. The second shock-absorbing member is linearly movable in a plane which is substantially orthogonal to the rotational axis of the movable mirror, wherein the second sliding contact surface is inclined with respect to the linear movement of the second shock-absorbing member.

The present disclosure relates to subject matter contained in Japanese Patent Application Nos. 2010-206045 (filed on Sep. 14, 2010), 2010-206046 (filed on Sep. 14, 2010), 2010-206047 (filed on Sep. 14, 2010) and 2011-190289 (filed on Sep. 1, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE EMBODIMENTS

In the following description of the embodiments, six embodiments of a mirror shock-absorbing mechanism will be discussed. First, the structure common to all the six embodiments will be discussed hereinafter.

Figure 1:
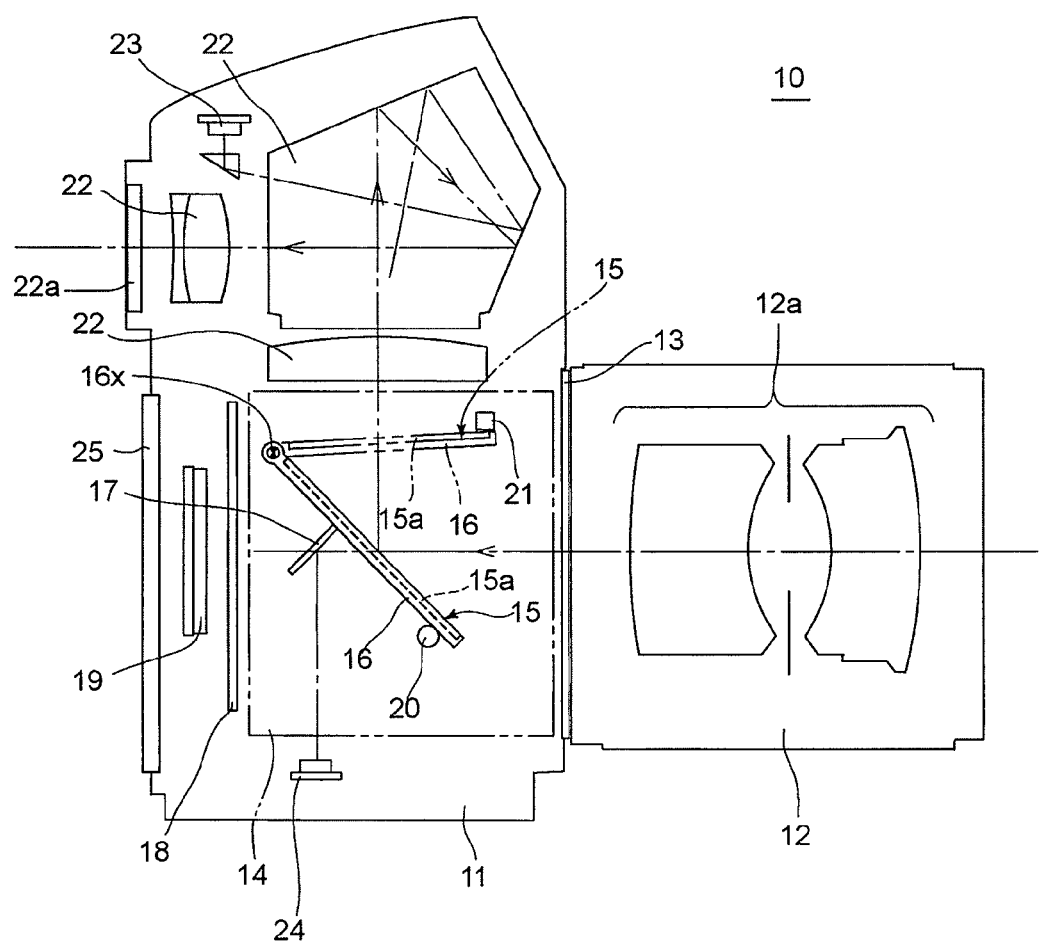
FIG. 1 is a diagram showing a schematic representation of the optical system of an SLR camera according to the present invention.
Figure 2:
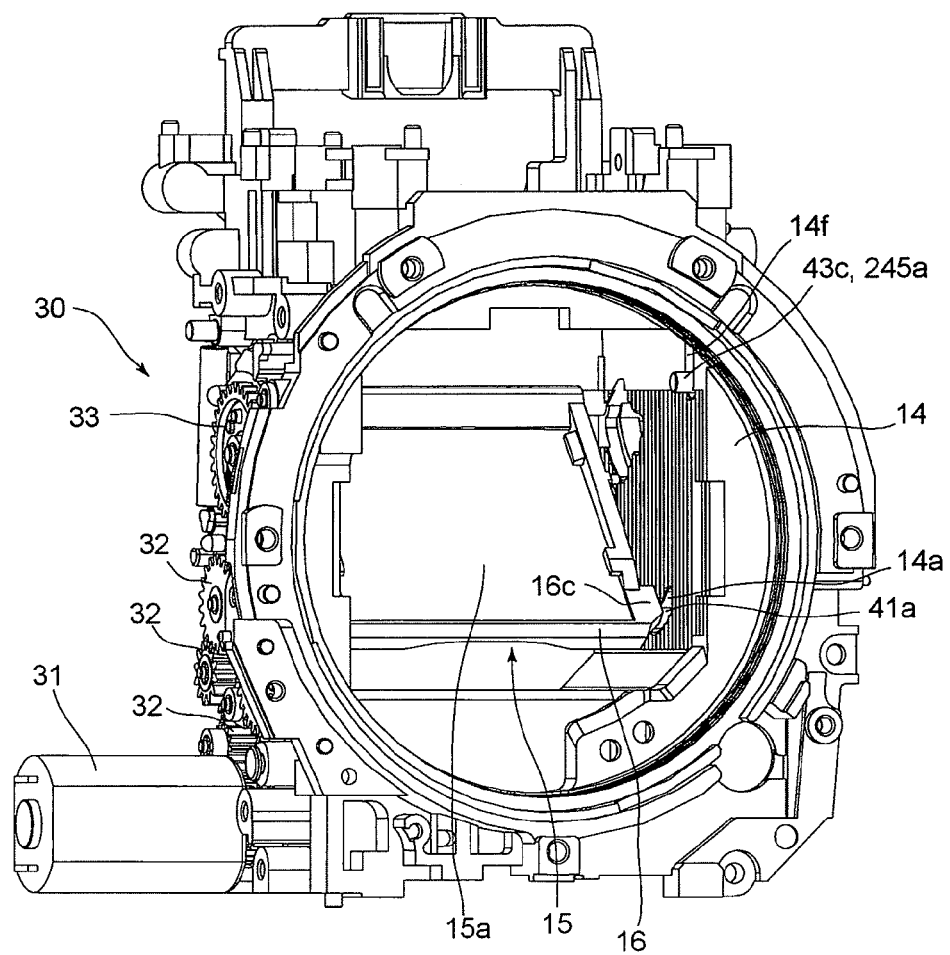
FIG. 2 is a front perspective view of a mirror box unit of the SLR camera in a mirror-down state
Figure 3:
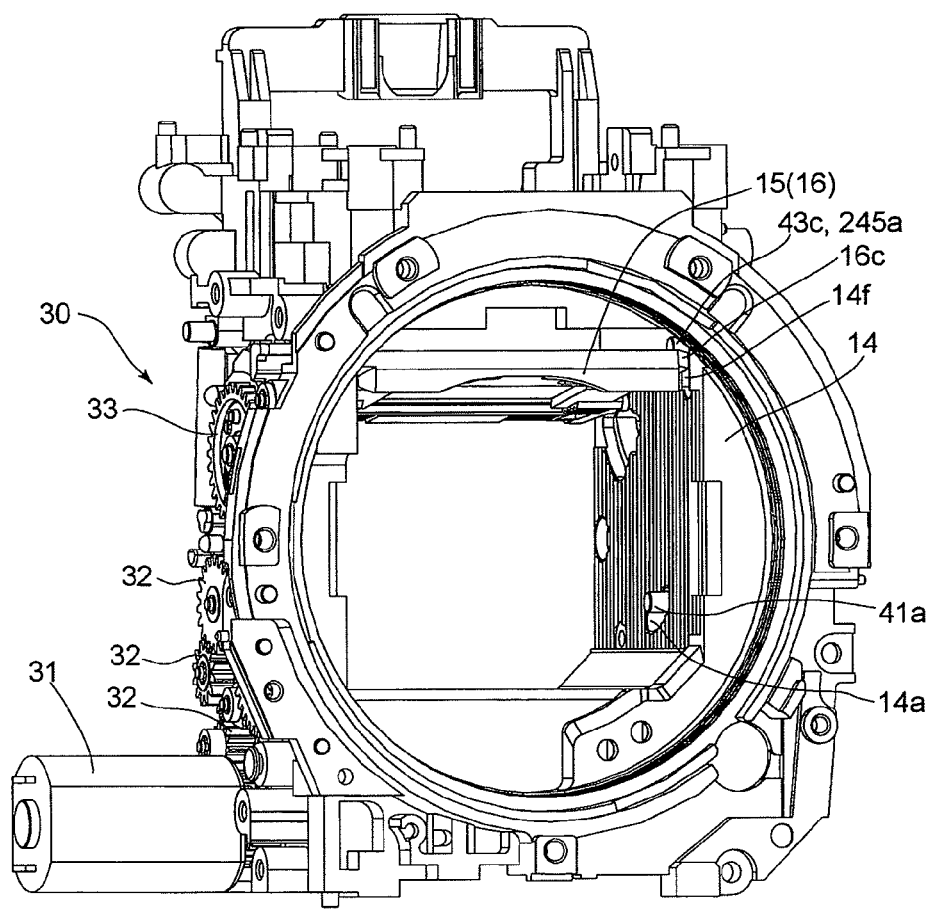
FIG. 3 is a front perspective view of the mirror box unit in a mirror-up state.
Figure 4:
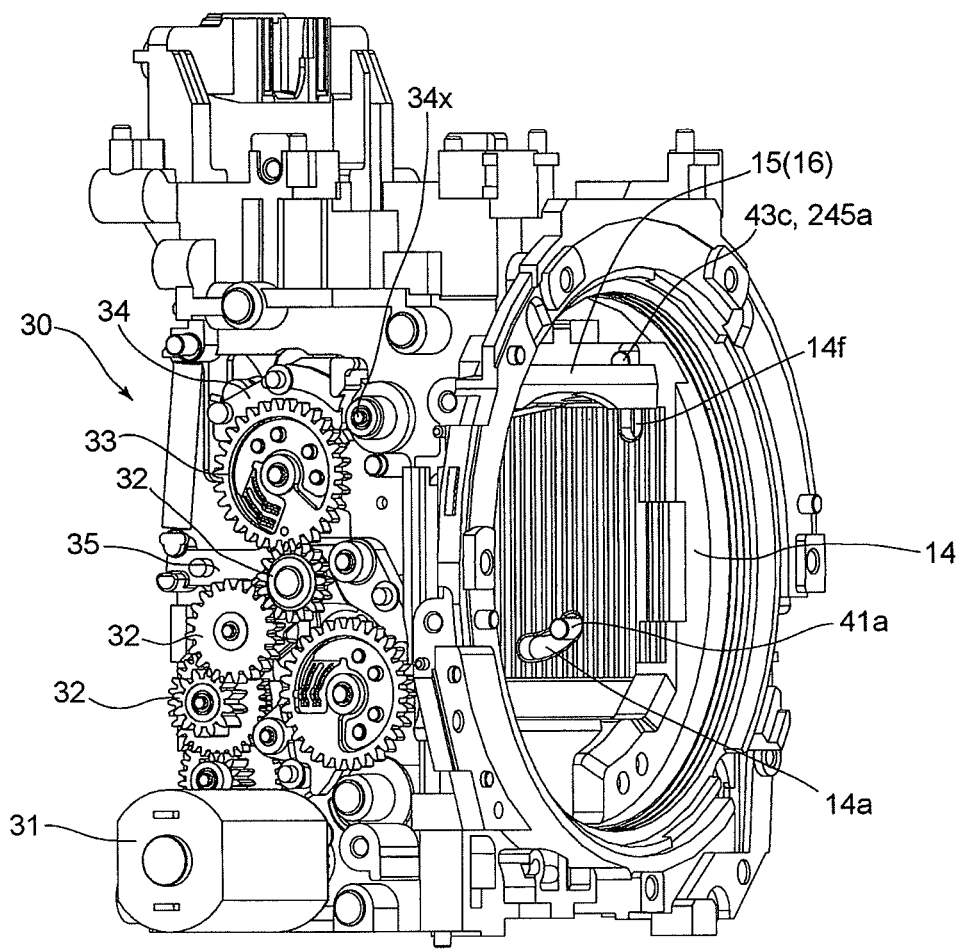
FIG. 4 is a front perspective view of the mirror box unit in the mirror-up state, viewed from a different angle.
Figure 5:
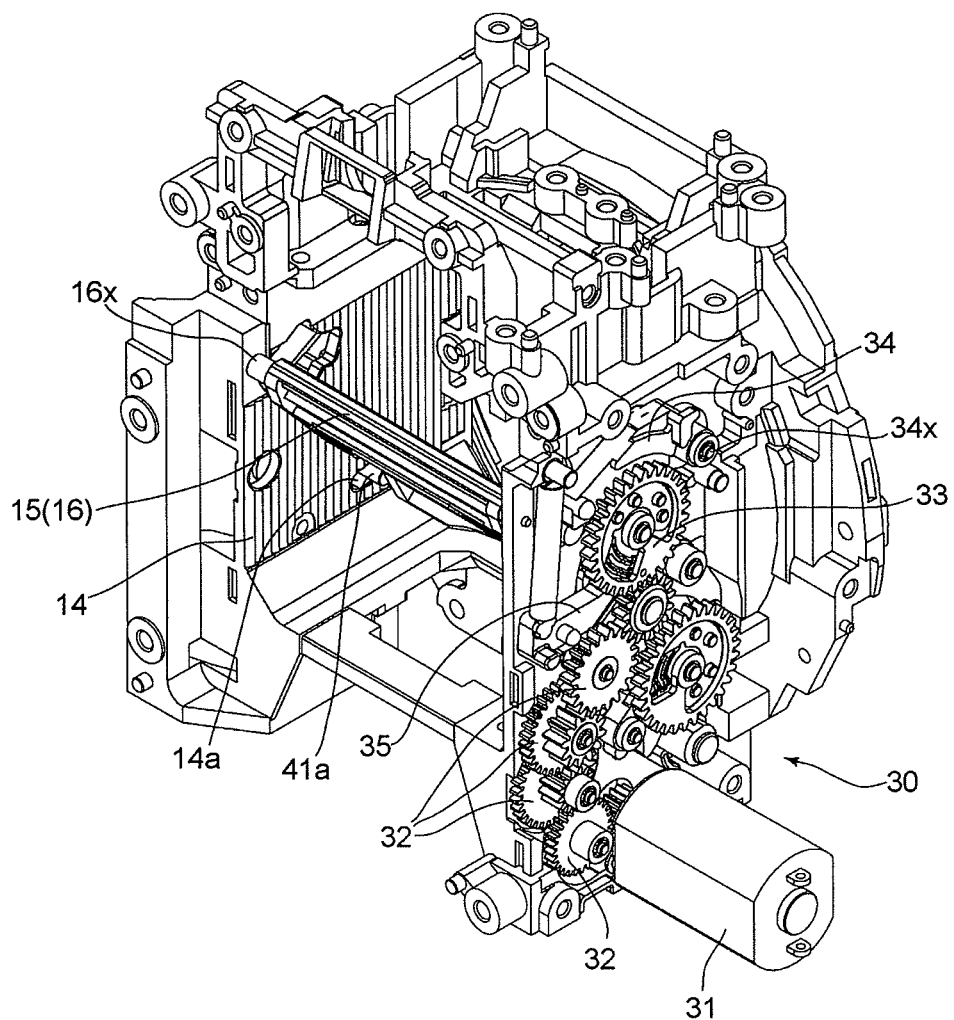
FIG. 5 is a rear perspective view of the mirror box unit in the mirror-down state.
Figure 6:
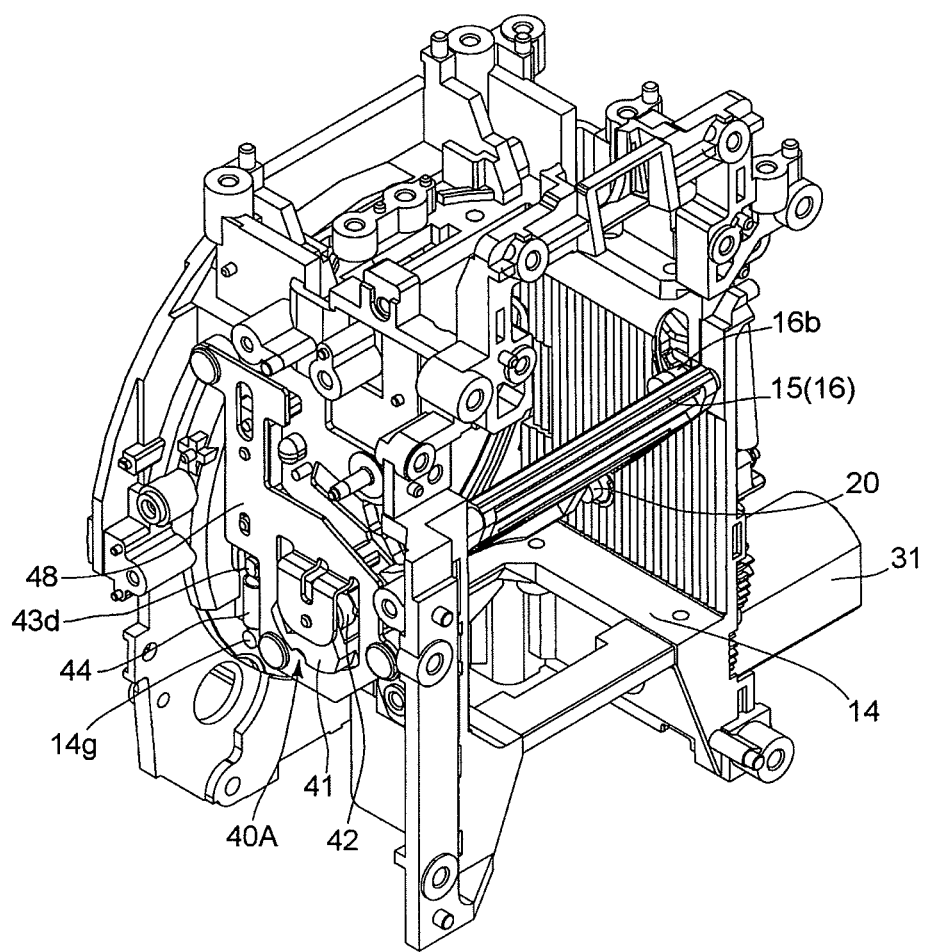
FIG. 6 is a rear perspective view of the mirror box unit in the mirror-down state which is equipped with a first embodiment of a mirror shock-absorbing mechanism.
Figure 7:
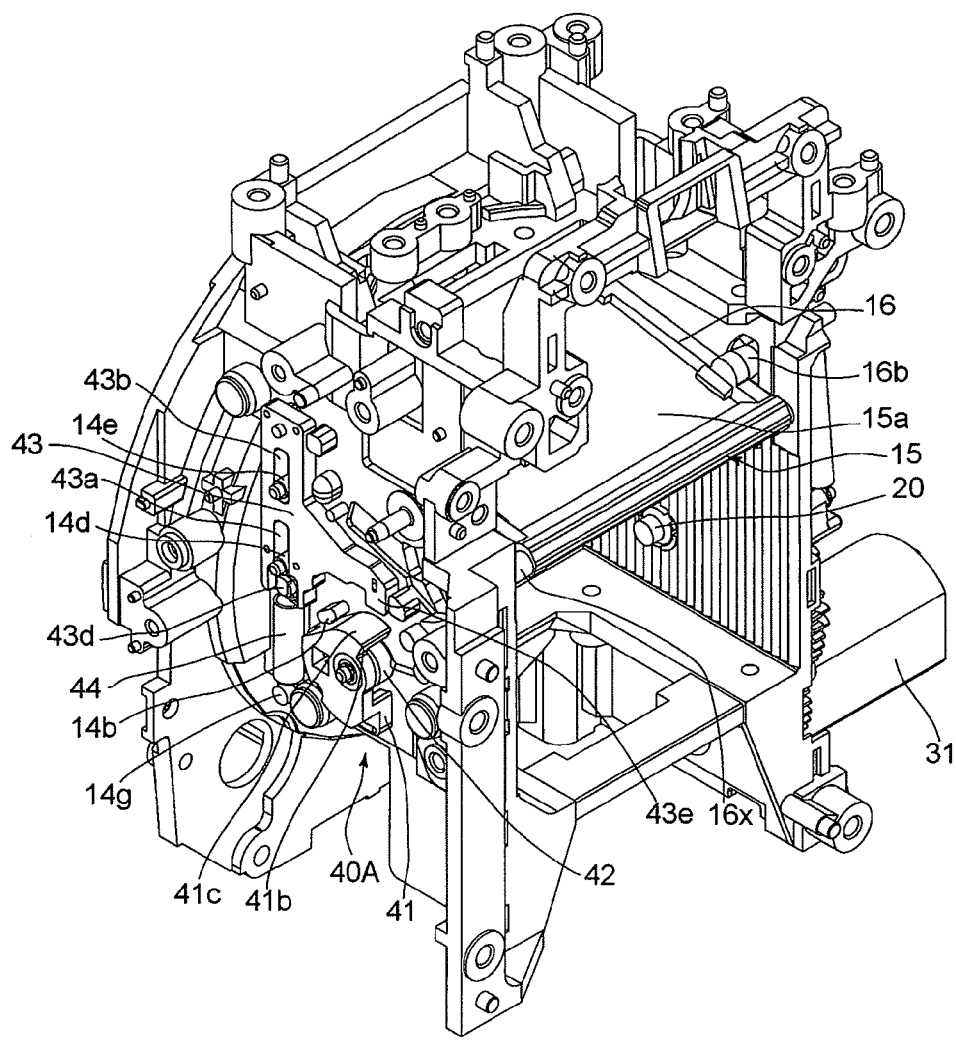
FIG. 7 is a rear perspective view of the mirror box unit in the mirror-up state which is equipped with the first embodiment of the mirror shock-absorbing mechanism.
Figure 8:
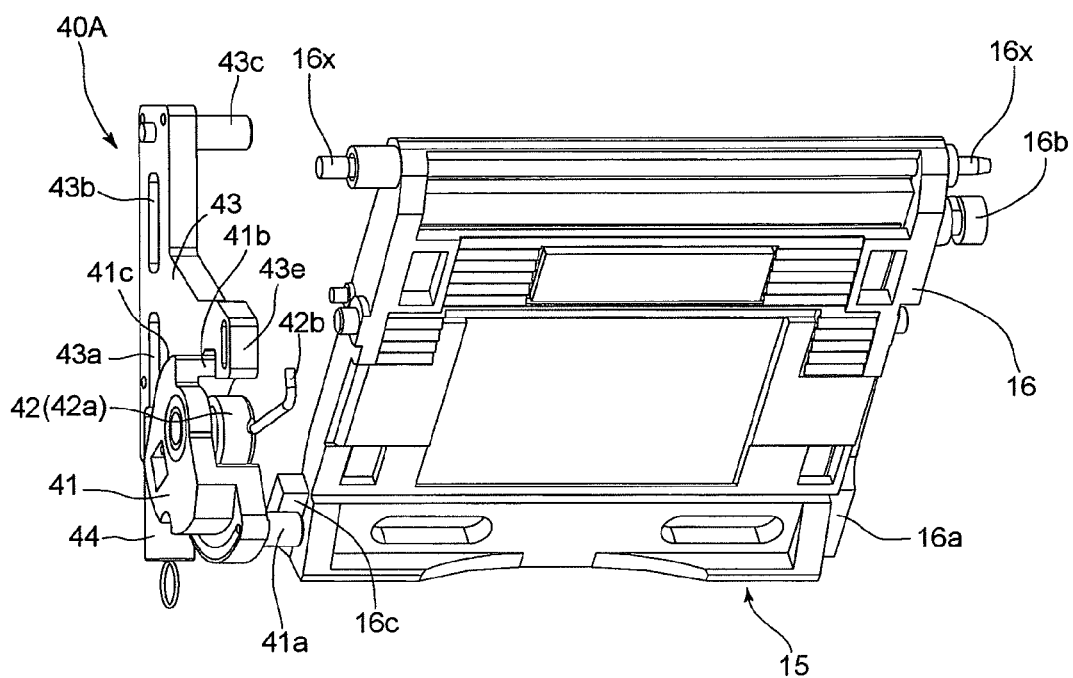
FIG. 8 is a rear perspective view of the first embodiment of the mirror shock-absorbing mechanism, showing a state where a contact portion of a mirror seat is in contact with a shock-absorbing pin of a mirror-down shock-absorbing lever.
Figure 9:
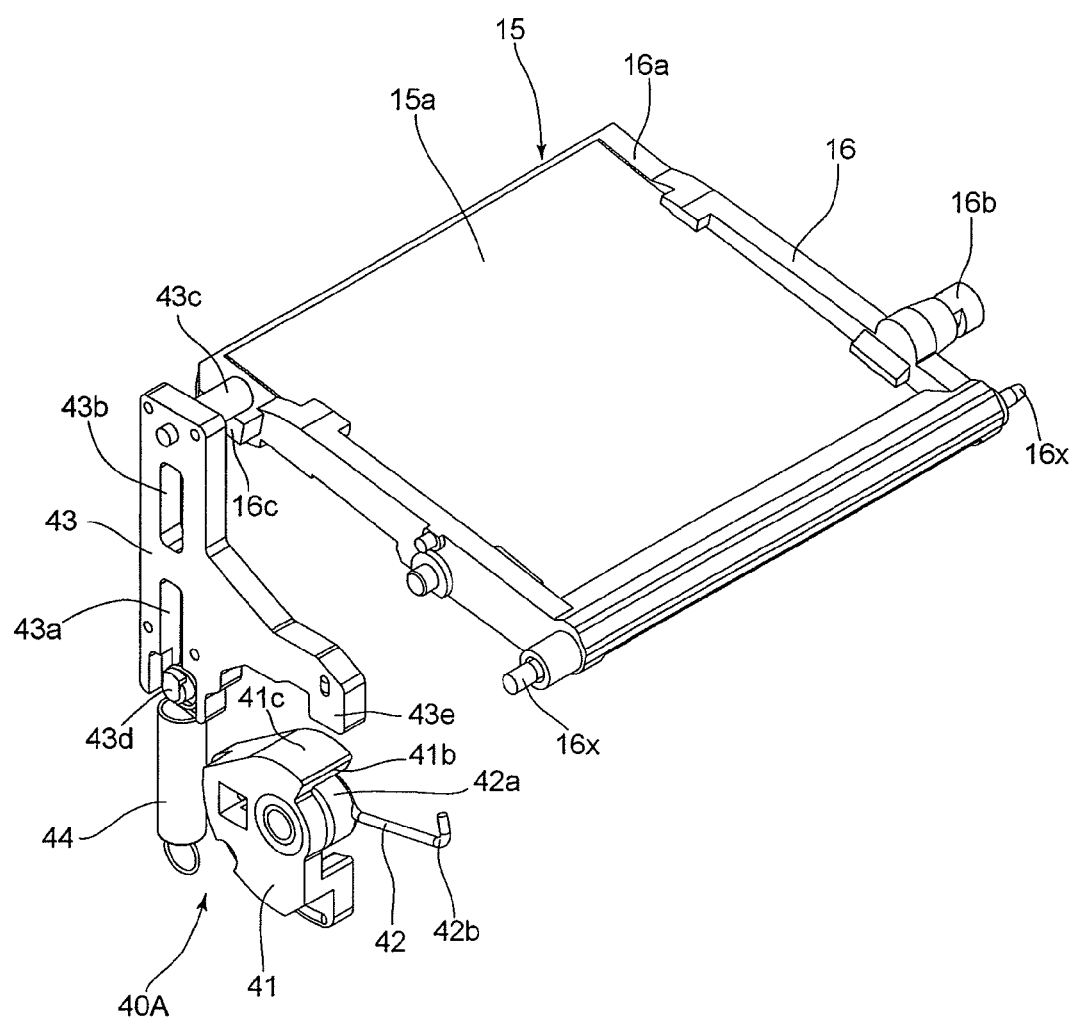
FIG. 9 is a rear perspective view of the first embodiment of the mirror shock-absorbing mechanism, showing a state where the contact portion of the mirror seat is in contact with a shock-absorbing pin of a mirror-up shock-absorbing lever.
Figure 10:
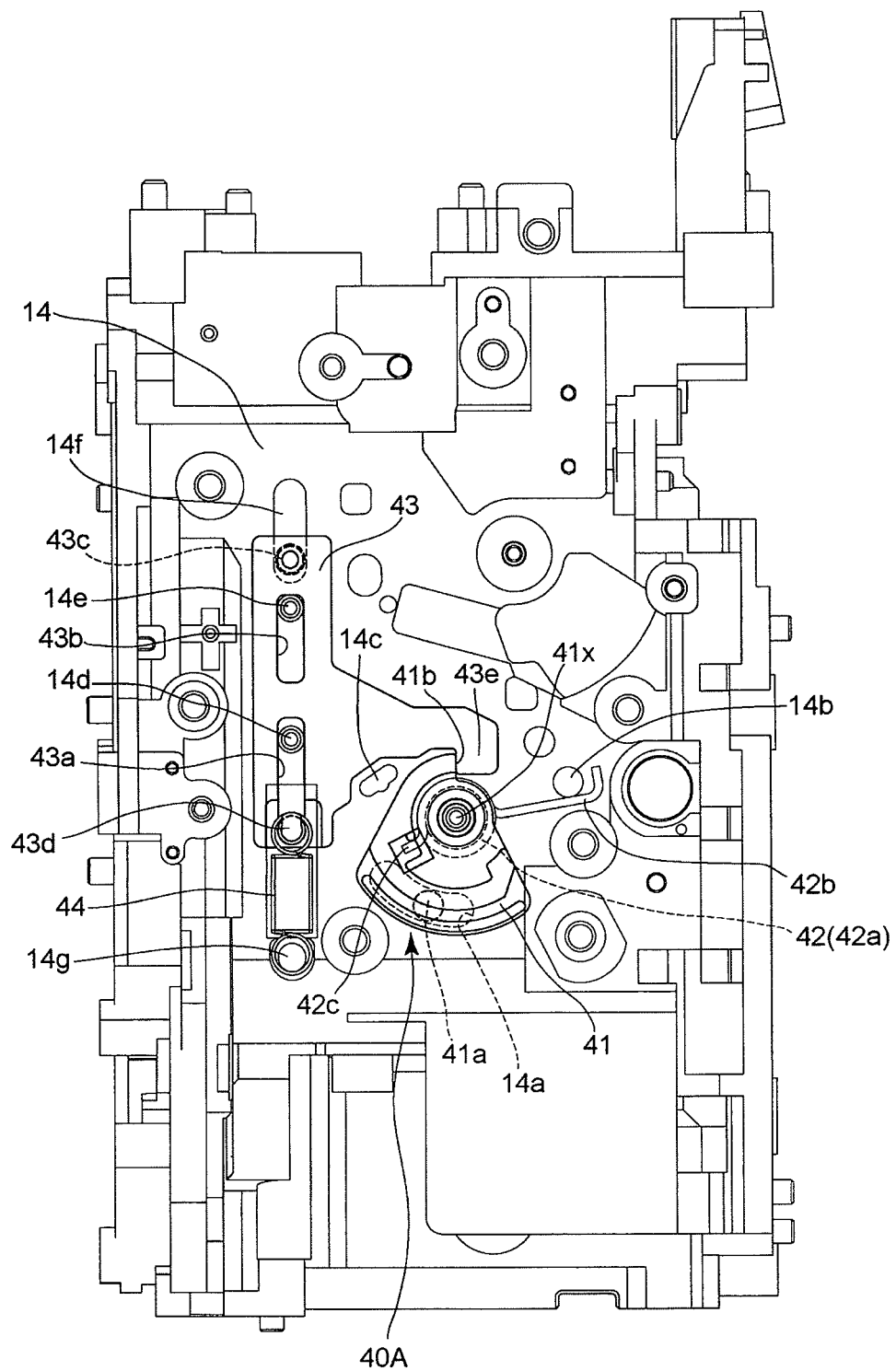
FIG. 10 is a left side elevational view of the mirror box unit with a retaining plate removed to expose the first embodiment of the mirror shock-absorbing mechanism.

An SLR camera (hereinafter referred simply to as camera) 10 shown in FIG. 1 is provided on the front of a camera body 11 with a lens mount 13, to which an interchangeable lens 12 is detachably attached. The camera 10 is provided, in the camera body 11 behind the lens mount 13, with a mirror box 14.

The camera 10 is provided inside the mirror box 14 with a movable mirror (quick-return mirror) 15. The movable mirror 15 is constructed such that a main mirror 15a is fixedly supported on a mirror seat 16, and a sub-mirror 17 is positioned behind the mirror seat 16 and rotatably supported by the mirror seat 16. A pair of mirror seat hinges 16x which project in laterally opposite directions from both sides of the mirror seat 16 are rotatably supported by both side walls of the mirror box 14, respectively. The camera 10 is provided behind the movable mirror 15 with a focal plane shutter (hereinafter referred simply to as shutter) 18, and is provided behind the shutter 18 with an image sensor (photographic light-receiving medium) 19. The present embodiment of the camera 10 is a digital camera using the image sensor 19 as a photographic light-receiving medium; however, the present invention can also be applied to a camera using silver-salt film as a photographic light-receiving medium.

The movable mirror 15 reciprocatively rotates (swings) about the pair of mirror seat hinges 16x between a mirror-down position (viewfinder light-guiding position; shown by solid lines in FIG. 1 and also shown in FIGS. 2, 5, 6, 11, 16, 18, 23, 28, 30, 35, 41 and 46)), in which the movable mirror 15 is positioned in a photographing optical path which extends from a photographing lens system 12a provided in the interchangeable lens 12 to the image sensor 19, to be inclined at an angle of approximately 45 degrees with respect to the photographing optical path, and an mirror-up position (retracted position; shown by one-dot chain lines in FIG. 1 and also shown in FIGS. 3, 4, 7, 13, 17, 19, 25, 29, 31, 38, 42 and 49), in which the movable mirror 15 is retracted upward from the photographing optical path. As shown in FIGS. 6, 7, 18, 19, 30, 31, 41 and 42, a mirror-down position defining pin (mirror positioning portion) 20 projects from an inner surface of one of the side walls of the mirror box 14 that are positioned on laterally both sides of the movable mirror 15, and the mirror-down position of the movable mirror 15 is defined by engagement of the mirror-down position defining pin 20 with a stopper 16a (see FIGS. 8, 9, 20, 21, 32, 33, 43 and 44) formed on a side of the mirror seat 16. The installation position of the mirror-down position defining pin 20 to the mirror box 14 can be finely adjusted. In addition, an upper stopper 21 is fixedly installed inside the mirror box 14. An upper surface of the mirror seat 16 comes into contact with the upper stopper 21 when the movable mirror 15 rotates to the mirror-up position. The camera 10 is provided therein, above the movable mirror 15, with a viewfinder optical system 22 that is configured of a pentagonal prism, an eyepiece lens and other optical elements. Note that all the optical elements of the viewfinder optical system are designated by the same reference numeral 22 in FIG. 1.

Light from an object (object-emanated light) which enters the mirror box 14 through the photographing lens system 12a in the interchangeable lens 12, with the interchangeable lens 12 mounted to the lens mount 13, is reflected by the main mirror 15a of the movable mirror 15 to be incident on the viewfinder optical system 22 and observable through a viewfinder window 22a formed in the back of the camera body 11. In this state, a photometering operation using a photometering unit 23 which is installed behind the pentagonal prism of the viewfinder optical system 22 can be carried out. In addition, when the movable mirror 15 is in the mirror-down position, the sub-mirror 17 projects obliquely downwards from the underside of the mirror seat 16 to reflect part of the object-emanated light downward to be incident on a distance measuring unit 24, which makes it possible to detect an object distance. On the other hand, when the movable mirror 15 is in the mirror-up position, the object-emanated light which enters the mirror box 14 through the photographing lens system 12a travels toward the shutter 18 without being reflected by the movable mirror 15, thus being capable of being made incident on the light receiving surface of the image sensor 19 by opening the shutter 18. When the movable mirror 15 is in the mirror-up position, the sub-mirror 17 is retracted at the underside of the mirror seat 16. Electronic object images obtained via the image sensor 19 and various other information can be displayed on an LCD monitor 25 provided on the back of the camera body 11.

As shown in FIGS. 2 through 5, the camera 10 is provided with a mirror drive mechanism 30, on a side (left side as viewed from front) of the mirror box 14, which drives the movable mirror 15 to rotate the movable mirror 15 up and down. The mirror drive mechanism 30 is provided with a motor 31, a reduction gear train 32 which transmits a driving force of the motor 31, a cam gear 33 to which the rotational driving force is transmitted from the reduction gear train 32 via a planetary gear mechanism, and a mirror drive lever 34, the rotational position of which is controlled by the cam gear 33. The mirror drive lever 34 is supported by the mirror box 14 to be reciprocatively rotatable (swingable) about an axis $34x$, which is substantially parallel to the axis of the pair of mirror seat hinges $16x$. The mirror drive lever 34 holds a mirror seat boss 16b which is formed on a side of the mirror seat 16. Pressing the mirror seat boss 16b downward by a holding portion of the mirror drive lever 34 which holds the mirror seat boss 16b causes the movable mirror 15 to rotate downward, toward the mirror-down position, and pressing the mirror seat boss 16b upward by the same holding portion causes the movable mirror 15 to rotate upward, toward the mirror-up position. The mirror drive lever 34 is biased to rotate in a direction to press the movable mirror 15 toward the mirror-down position. When the cam gear 33 is located at a specific rotational position, the mirror drive lever 34 is pressed and rotated toward the mirror-up position against the biasing force by a mirror control cam (peripheral surface cam) formed on the cam gear 33. More specifically, the cam gear 33 is a single-rotation cam gear which is rotated only in one direction from an initial position. When the cam gear 33 is in the initial position, the mirror control cam of the cam gear 33 does not press the mirror drive lever 34, so that the movable mirror 15 is held in the mirror-down position by a biasing force which acts on the mirror drive lever 34. A rotation of the cam gear 33 partway from the initial position causes the mirror control cam of the cam gear 33 to press and rotate the mirror drive lever 34, which causes the mirror drive lever 34 to rotate the movable mirror 15 to the mirror-up position. During the time the cam gear 33 returns to the initial position from this partway position, the mirror control cam of the cam gear 33 releases the pressure against the mirror drive lever 34, so that the movable mirror 15 returns to the mirror-down position.

The camera 10 is provided on the left side of the mirror box 14, to which the mirror drive mechanism 30 is installed, with a shutter charge lever 35 which makes the shutter 18 perform a shutter charge operation. In addition to the aforementioned mirror control cam, the cam gear 33 is further provided with a shutter charge cam for controlling the operation of the shutter charge lever 35. One rotation of the cam gear 33 from the initial position causes the shutter charge lever 35 to reciprocatively rotate to make the shutter 18 perform the shutter charge operation. The shutter charge operation is not related to the features of the present invention, and therefore the detailed description of the shutter charge operation will be omitted in the following description.

The camera 10 is provided on the other side of the mirror box 14 (the right side of the mirror box 14 as viewed from front) with a mirror shock-absorbing mechanism (movable mirror shock-absorbing mechanism) 40A, 40B, 40C, 40D, 40E or 40F which absorbs shock of the movable mirror 15 that is caused upon rotation of the movable mirror 15 to the mirror-down position or the mirror-up position to reduce bouncing (vibration) of the movable mirror 15.

Firstly, a first embodiment of the mirror shock-absorbing mechanism 40A will be hereinafter discussed with reference to FIGS. 6 through 15. The mirror shock-absorbing mechanism 40A is provided with a mirror-down shock-absorbing lever (mirror-advancing shock-absorbing member) 41, a mirror-down shock-absorbing spring (first biaser/an element of an engaging mechanism) 42, a mirror-up shock-absorbing lever (mirror-retracting shock-absorbing member) 43 and a mirror-up shock-absorbing spring (second biaser/an element of the engaging mechanism) 44. The mirror-down shock-absorbing lever 41, the mirror-down shock-absorbing spring 42, the mirror-up shock-absorbing lever 43 and the mirror-up shock-absorbing spring 44 are held so as not to come off the mirror box 14 by a retaining plate 48 (see FIG. 6) fixed to a side of the mirror box 14.

The mirror-down shock-absorbing lever 41 is rotatably supported by a shaft (rotational axis) $41x$ which projects from the mirror box 14 and is substantially parallel to the pair of mirror seat hinges $16x$. The mirror-down shock-absorbing lever 41 is substantially sector shaped with its axis of curvature coincident with the shaft $41x$. The mirror-down shock-absorbing lever 41 is provided in the vicinity of the outer edge of the sector with a shock-absorbing pin (protruded contact portion) 41a which projects into the inside of the mirror box 14, and mirror-down shock-absorbing lever 41 is provided in the vicinity of the shaft $41x$ with a rotationally restricted surface (an element of the engaging mechanism/engaging surface) 41b which extends in a radial direction of the shaft $41x$. In addition, the mirror-down shock-absorbing lever 41 is provided with a rotation allowance surface 41c in the shape of an arc about the shaft $41x$. The rotation allowance surface 41c is formed continuously with the rotationally restricted surface 41b and is positioned radially outside of the rotationally restricted surface 41b. The mirror box 14 is provided, in the right side wall as viewed from the front, with an arc-shaped through-hole 14a having axis of curvature coincident with the shaft $41x$, and the shock-absorbing pin 41a of the mirror-down shock-absorbing lever 41 is inserted into the through-hole 14a to project into the mirror box 14 (see FIGS. 2, 3, 5 and 10). The shock-absorbing pin 41a is positioned in the path of movement of a shock-absorbing contact portion 16c formed on a side of the mirror seat 16 in the vicinity of the free end thereof (i.e., in the path of rotational movement of the movable mirror 15 about the pair of mirror seat hinges $16x$) to be contactable with a lower surface of the shock-absorbing contact portion 16c.

Figure 11:
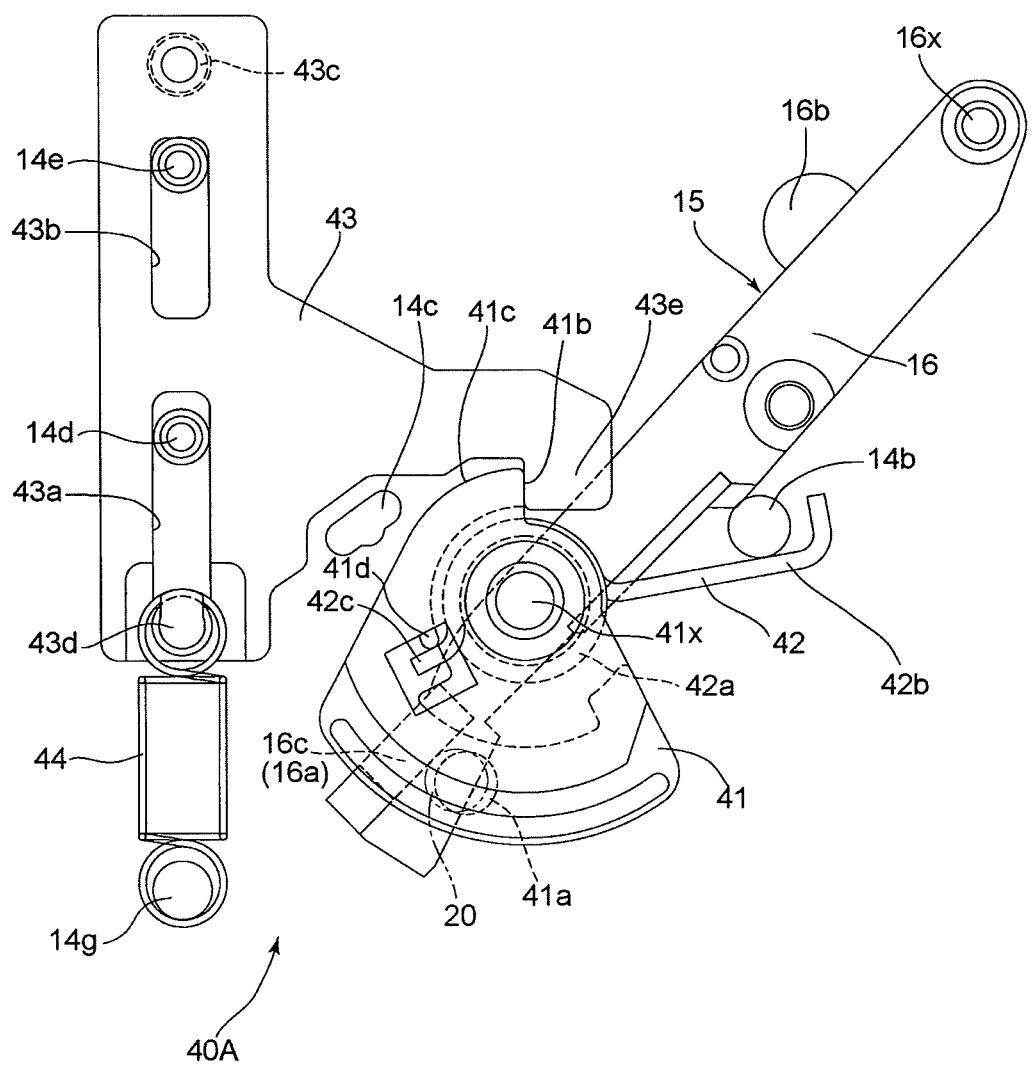
FIG. 11 is a side elevational view of the first embodiment of the mirror shock-absorbing mechanism in the mirror-down state.
Figure 14:
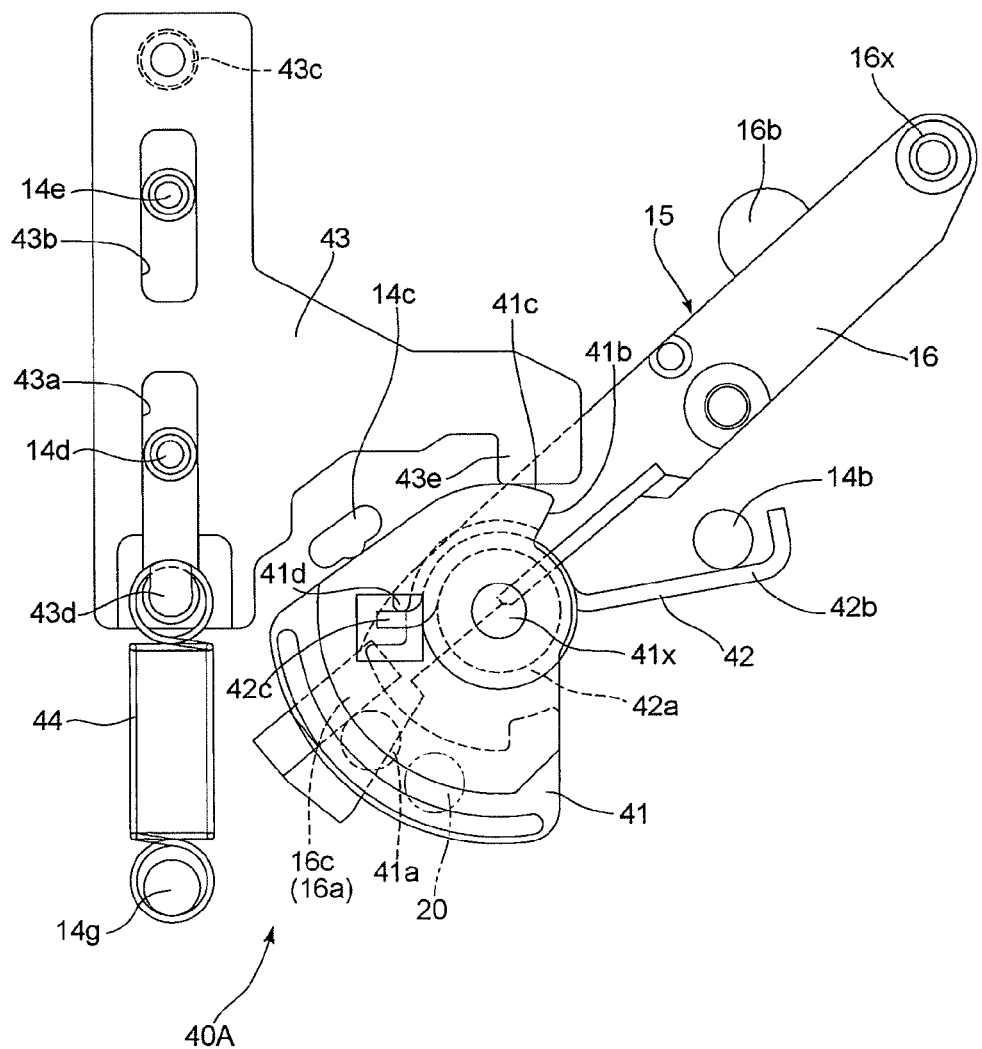
FIG. 14 is a side elevational view of the first embodiment of the mirror shock-absorbing mechanism in a state where the movable mirror is in the process of rotating to the mirror-down position from the mirror-up position.
Figure 15:
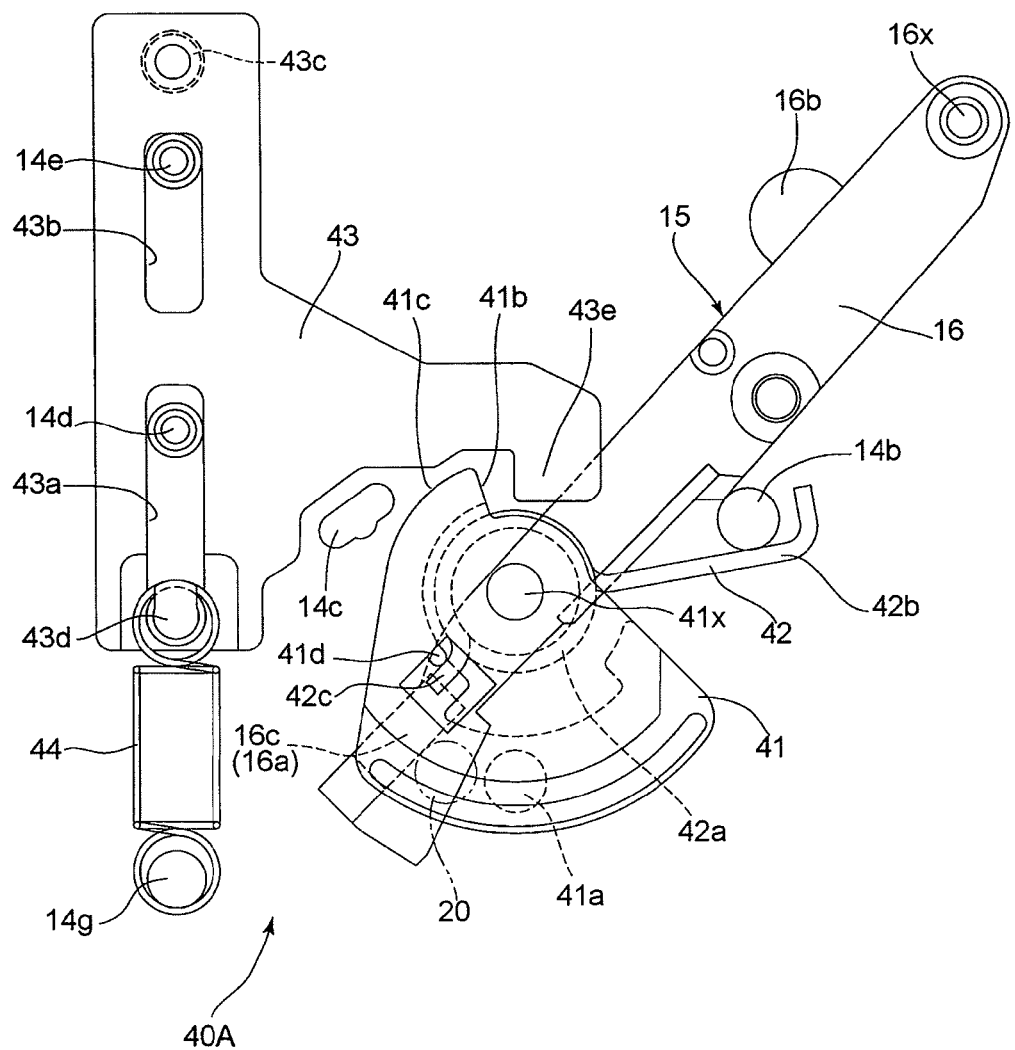
FIG. 15 is a side elevational view of the first embodiment of the mirror shock-absorbing mechanism in a state where the movable mirror has rotated from the mirror-up position to the mirror-down position and the mirror-down shock-absorbing lever has been rotated into an overrun range, ahead of a rotational limit position defined by the mirror-up shock-absorbing lever.

The mirror-down shock-absorbing spring 42 is a torsion spring which is provided with a coil portion 42a, a spring arm portion 42b and a spring arm portion 42c. The coil portion 42a surrounds the shaft $41x$, the spring arm portion 42b is engaged with a spring hook 14b formed on a side of the mirror box 14, and the spring arm portion 42c is engaged with a spring hook 41*d* formed on the mirror-down shock-absorbing lever 41. The mirror-down shock-absorbing lever 41 is biased clockwise with respect to FIGS. 10 through 15 by the mirror-down shock-absorbing spring 42. The direction of biasing the mirror-down shock-absorbing lever 41 by the mirror-down shock-absorbing spring 42 is a direction which brings the shock-absorbing pin 41*a* close to (to bring into contact with) the shock-absorbing contact portion 16*c* of the mirror seat 16, and a rotational limit projection (first limit portion) 14*c* which defines a rotational limit of the mirror-down shock-absorbing lever 41 in the aforementioned basing direction projects from a side of the mirror box 14. This rotational limit of the mirror-down shock-absorbing lever 41, in which the mirror-down shock-absorbing lever 41 comes in contact with the rotational limit projection 14*c*, will be hereinafter referred to as "shock-absorbing standby position." The mirror-down shock-absorbing lever 41 is rotatable in a direction away from the rotational limit projection 14*c* against the biasing force of the mirror-down shock-absorbing spring 42 with the shock-absorbing standby position as one of the two rotational limits of the mirror-down shock-absorbing lever 41. Until reaching a predetermined position (corresponding to the mirror-down position of the movable mirror 15) with the shock-absorbing standby position shown in FIGS. 13 and 14 as a starting point, the mirror-down shock-absorbing lever 41 is rotated against the biasing force of the mirror-down shock-absorbing spring 42 while being pressed by the shock-absorbing contact portion 16*c* of the movable mirror 15 (the mirror seat 16) rotating toward the mirror-down position. Upon the movable mirror 15 reaching the mirror-down position, the stopper 16*a* of the mirror seat 16 comes into contact with the mirror-down position defining pin 20 to thereby be prevented the movable mirror 15 from rotating further, so that no more pressing force is exerted on the mirror-down shock-absorbing lever 41 from the shock-absorbing contact portion 16*c*. This range of rotation of the mirror-down shock-absorbing lever 41, in which the mirror-down shock-absorbing lever 41 receives a pressing and moving force from the movable mirror 15, will be hereinafter referred to as "shock-absorbing moving range." The mirror-down shock-absorbing lever 41 can further rotate into an overrun range which exceeds this shock-absorbing moving range. FIGS. 11 and 15 show a state where the mirror-down shock-absorbing lever 41 is in the overrun range. In this state, the movable mirror 15 is prevented from rotating further from the mirror-down position by engagement with the mirror-down position defining pin 20, whereas the mirror-down shock-absorbing lever 41 is disengaged at the shock-absorbing pin 41*a* thereof from the shock-absorbing contact portion 16*c* of the mirror seat 16, thus being released from the contact engagement with the movable mirror 15.

The mirror-up shock-absorbing lever 43 is provided with two guide holes 43*a* and 43*b* into which two guide pins, i.e., an upper guide pin 14*d* and a lower guide pin (second limit portion) 14*e* which are formed on a side of the mirror box 14 to project therefrom, are respectively inserted. The mirror-up shock-absorbing lever 43 is supported and guided linearly in the vertical direction by the engagement of the guide pins 14*d* and 14*e* with the guide holes 43*a* and 43*b*, respectively. This linear moving direction of the mirror-up shock-absorbing lever 43 is set in a plane substantially orthogonal to the axis of the shaft 41*x* of the mirror-down shock-absorbing lever 41. In other words, the mirror-down shock-absorbing lever 41 and the mirror-up shock-absorbing lever 43 are supported to be rotatable and movable along mutually parallel planes, respectively. The mirror-up shock-absorbing lever 43 is provided in the vicinity of the upper end thereof with a shock-absorbing pin (protruded contact portion) 43*c* which projects into the mirror box 14 and is further provided in the vicinity of the lower end of the mirror-up shock-absorbing lever 43 with a spring hook 43*d*. The mirror box 14 is provided, in the right side wall as viewed from the front, with a through-hole 14*f* elongated in the vertical direction, and the shock-absorbing pin 43*c* of the mirror-up shock-absorbing lever 43 is inserted into the through-hole 14*f* to project into the mirror box 14 (see FIGS. 2, 3, 4 and 10). The shock-absorbing pin 43*c* is positioned in the movement path of the shock-absorbing contact portion 16*c* of the mirror seat 16 (i.e., in the path of the rotational movement of the movable mirror 15 about the pair of mirror seat hinges 16*x*) to be contactable with an upper surface of the shock-absorbing contact portion 16*c*. The mirror-up shock-absorbing lever 43 is provided on a side thereof with a rotation-restricting arm (rotation-restricting portion/an element of the engaging mechanism/movement restricting portion) 43*e* which projects rearwardly. The rotation-restricting arm 43*e* projects in a direction substantially orthogonal to the vertical direction, i.e., the moving direction of the mirror-up shock-absorbing lever 43, and a portion of the rotation-restricting arm 43*e* in the vicinity of the rear end (right end with respect to FIG. 10) thereof is bent downward and shaped into a hook.

The mirror-up shock-absorbing spring 44 is configured from an extension spring. The mirror-up shock-absorbing spring 44 is hooked at one end and the other end thereof onto the spring hook 43*d*, which is formed on the mirror-up shock-absorbing lever 43, and a spring hook 14*g*, which is formed on a side of the mirror box 14, respectively, to bias the mirror-up shock-absorbing lever 43 downward. This direction of biasing the mirror-up shock-absorbing lever 43 by the mirror-up shock-absorbing spring 44 is a direction which brings the shock-absorbing pin 43*c* close to (to bring into contact with) the shock-absorbing contact portion 16*c* of the mirror seat 16, and the engagement of the upper end of the guide hole 43*b* with the guide pin 14*e* prevents the mirror-up shock-absorbing lever 43 from moving further in the biasing direction of the mirror-up shock-absorbing spring 44. This movement limit of the mirror-up shock-absorbing lever 43 in the biasing direction of the mirror-up shock-absorbing spring 44 (in the downward direction) will be hereinafter referred to as "shock-absorbing standby position." When the mirror-up shock-absorbing lever 43 is in the shock-absorbing standby position, the rotation-restricting arm 43*e* has moved into the rotational movement path of the rotationally restricted surface 41*b* of the mirror-down shock-absorbing lever 41 about the shaft 41*x* and prevents the mirror-down shock-absorbing lever 41 from rotating in the biasing direction of the mirror-down shock-absorbing spring 42 by engagement of a side of the rotation-restricting arm 43*e* with the rotationally restricted surface 41*b* (see FIGS. 11 and 12). More specifically, it is possible for the rotationally restricted surface 41*b* of the mirror-down shock-absorbing lever 41 and a side of the rotation-restricting arm 43*e* of the mirror-up shock-absorbing lever 43 which face each other to come in contact with each other only when the mirror-up shock-absorbing lever 43 and the mirror-down shock-absorbing lever 41 are in the shock-absorbing standby position and the aforementioned overrun range, respectively. Accordingly, when the mirror-down shock-absorbing lever 41 is prevented from rotating by engagement of the rotationally restricted surface 41*b* with the rotation-restricting arm 43*e* of the mirror-up shock-absorbing lever 43, the mirror-down shock-absorbing lever 41 is held in the overrun range, in which the shock-absorbing pin 41*a* is disengaged from the shock-absorbing contact portion 16*c* of the mirror seat 16. Whereas, in a state (shown in FIG. 13) where the end of the rotation-restricting arm 43*e* is positioned out of the path of rotational movement of the rotationally restricted surface 41b, the holding of the mirror-down shock-absorbing lever 41 in the overrun range is released, which enables the mirror-down shock-absorbing lever 41 to rotate by the mirror-down shock-absorbing spring 42 in the biasing direction thereof (toward the shock-absorbing standby position of the mirror-down shock-absorbing lever 41). In addition, in a state (shown in FIG. 14) where the end of the rotation-restricting arm 43e abuts against the rotation allowance surface 41c, the mirror-down shock-absorbing lever 41 is allowed to rotate with the rotation allowance surface 41c that is in slidable contact with the rotation-restricting arm 43e.

Operations of the mirror shock-absorbing mechanism 40A will be hereinafter discussed with reference to FIGS. 11 through 15. FIG. 11 shows a state where the movable mirror 15 is in the mirror-down position. In this state, the movable mirror 15 is held in the mirror-down position with the mirror seat boss 16b pressed downward by the mirror drive lever 34, which serves as an element of the mirror drive mechanism 30, to make the stopper 16a of the mirror seat 16 abut against the mirror-down position defining pin 20. The mirror-up shock-absorbing lever 43 is held in the shock-absorbing standby position by the biasing force of the mirror-up shock-absorbing spring 44, and prevents the mirror-down shock-absorbing lever 41 from rotating in the biasing direction of the mirror-down shock-absorbing spring 42 (i.e., in the clockwise direction with respect to FIGS. 10 through 15) by making the rotation-restricting arm 43e contact the rotationally restricted surface 41b. At this stage, the mirror-down shock-absorbing lever 41 is positioned in the overrun range, in which the shock-absorbing pin 41a is disengaged from the shock-absorbing contact portion 16c of the mirror seat 16 in a mirror-down direction (counterclockwise direction with respect to FIG. 11). Accordingly, the mirror-down shock-absorbing lever 41 does not play a role in the positioning of the mirror seat 16, thus not interfering with the positioning of the mirror seat 16, which is defined by the engagement of the mirror-down position defining pin 20 with the stopper 16a. More specifically, the stopper 16a and the shock-absorbing contact portion 16c, which are respectively formed on the laterally opposite sides of the mirror seat 16, are positioned to be substantially bilaterally symmetrical in the widthwise direction of the mirror seat 16, and hence are shown overlaying each other as viewed from a side of the mirror seat 16 in FIGS. 11 through 15. In addition, the mirror-down shock-absorbing lever 41, which is prevented from rotating by the mirror-up shock-absorbing lever 43, locates the shock-absorbing pin 41a at a position advanced from the position of the mirror-down position defining pin 20 in a mirror-down direction (counterclockwise direction with respect to FIG. 11). With this relative positional relationship between the mirror-down position defining pin 20 and the shock-absorbing pin 41a, a state in which the mirror-down position defining pin 20 is in contact with the stopper 16a while the shock-absorbing pin 41a is not in contact with the shock-absorbing contact portion 16c (a state in which the mirror-down shock-absorbing lever 41 is in the overrun range) is obtained.

Figure 12:
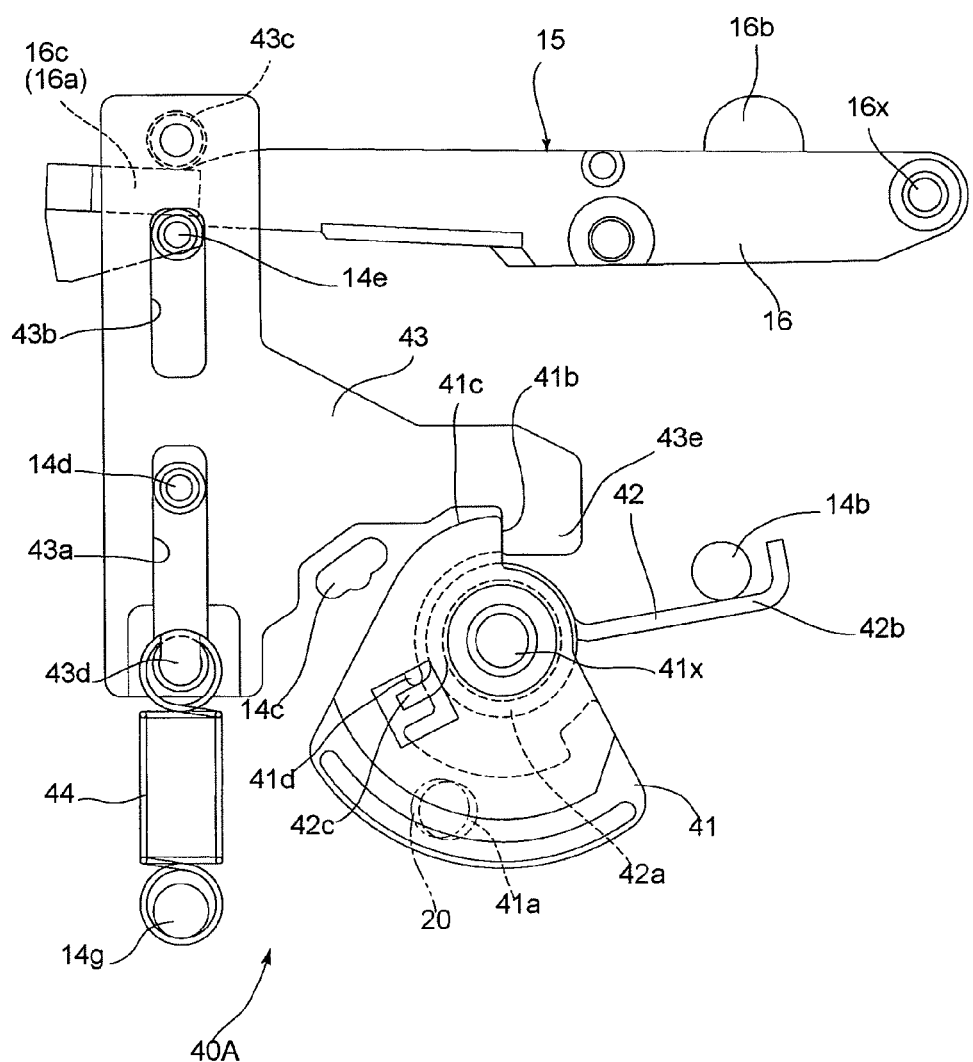
FIG. 12 is a side elevational view of the first embodiment of the mirror shock-absorbing mechanism in a state where the movable mirror is in the process of rotating to the mirror-up position from the mirror-down position.

When the movable mirror 15 is rotated from the mirror-down position toward the mirror-up position by the mirror drive lever 34 of the mirror drive mechanism 30, this rotation of the movable mirror 15 causes an upper surface of the shock-absorbing contact portion 16c of the mirror seat 16 to come into contact with the shock-absorbing pin 43c of the mirror-up shock-absorbing lever 43 as shown in FIG. 12. At the instance shown in FIG. 12, the movable mirror 15 has not yet reached the mirror-up position; during the rotation of the movable mirror 15 to the mirror-up position shown in FIG. 13, the shock-absorbing contact portion 16c of the mirror seat 16 lifts the shock-absorbing pin 43c to press and move the mirror-up shock-absorbing lever 43 upward from the shock-absorbing standby position against the biasing force of the mirror-up shock-absorbing spring 44. Namely, the spring load of the mirror-up shock-absorbing spring 44 is exerted on rotation of the movable mirror 15, and the movable mirror 15 reaches the mirror-up position while being shock-absorbed (cushioned) by the mirror-up shock-absorbing lever 43 and the mirror-up shock-absorbing spring 44. This suppresses the occurrence of bouncing (vibrations) of the movable mirror 15 when the movable mirror 15 rotates from the mirror-down position to the mirror-up position. Specifically, the duration of the bouncing of the movable mirror 15 is reduced and the number of bounces (vibrations) of the movable mirror 15 becomes small. When the movable mirror 15 is in the mirror-up position, the engagement of an upper surface of the mirror seat 16 with the upper stopper 21 prevents the movable mirror 15 from moving further upward (see FIG. 1). Although the mirror-up shock-absorbing lever 43 can move up to a position (upper movement limit thereof) where the lower end of the guide hole 43a comes into contact with the guide pin 14d, the movable mirror 15 comes into contact with the upper stopper 21 before the mirror-up shock-absorbing lever 43 reaches the upper movement limit. Namely, similar to the mirror-down shock-absorbing lever 41, the mirror-up shock-absorbing lever 43 also has an overrun range exceeding the aforementioned shock-absorbing moving range (in which the shock-absorbing pin 43c is pressed by the shock-absorbing contact portion 16c of the movable mirror 15 (the mirror seat 16)) in which the shock-absorbing pin 43c is disengaged from the shock-absorbing contact portion 16c of the movable mirror 15 suspended in the mirror-up position by the upper stopper 21.

Figure 13:
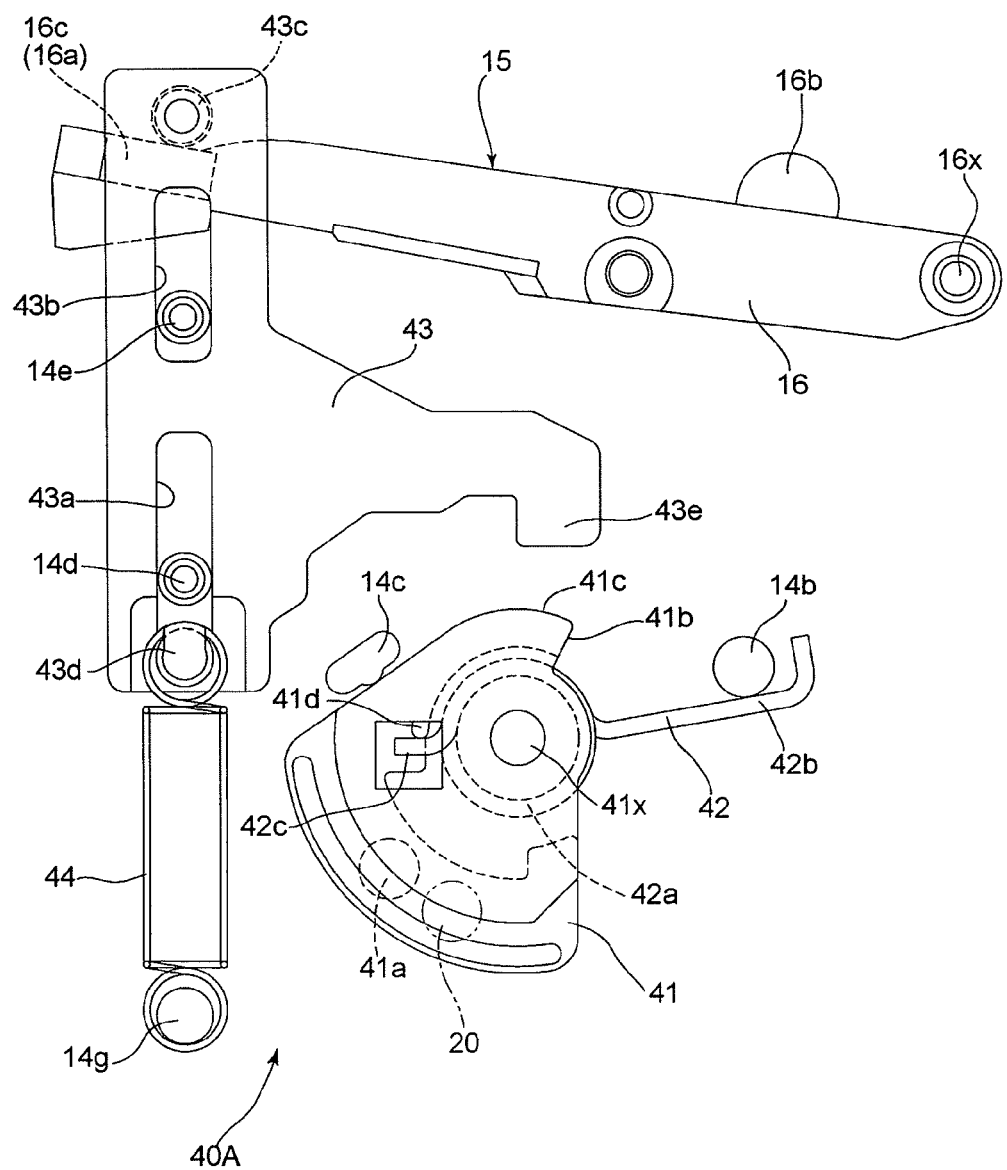
FIG. 13 is a side elevational view of the first embodiment of the mirror shock-absorbing mechanism in the mirror-up state.

When the movable mirror 15 rotates toward the mirror-up position, the mirror-up shock-absorbing lever 43 is pressed and moved upward from the shock-absorbing standby position by the shock-absorbing contact portion 16c of the mirror seat 16, which causes the rotation-restricting arm 43e to retract upward from the path of rotational movement of the rotationally restricted surface 41b. This releases the prevention of rotation of the mirror-down shock-absorbing lever 41, so that the mirror-down shock-absorbing lever 41 rotates to the shock-absorbing standby position, in which the mirror-down shock-absorbing lever 41 contacts the rotational limit projection 14c, by the biasing force of the mirror-down shock-absorbing spring 42 as shown in FIG. 13. When the mirror-down shock-absorbing lever 41 is in the shock-absorbing standby position, the shock-absorbing pin 41a is positioned above the mirror-down position defining pin 20, namely, at a position advanced in a mirror-up direction (clockwise direction with respect to FIG. 13) of the movable mirror 15 (at a position where the shock-absorbing contact portion 16c of the mirror seat 16 and the shock-absorbing pin 41a come in contact with each other before the stopper 16a and the mirror-down position defining pin 20 come in contact with each other when the movable mirror 15 rotates to the mirror-down position). In addition, when the mirror-down shock-absorbing lever 41 is in the shock-absorbing standby position, the rotation allowance surface 41c is positioned downwardly away from the rotation-restricting arm 43e of the mirror-up shock-absorbing lever 43.

When the movable mirror 15 rotates from the mirror-up position to the mirror-down position by an operation of the mirror drive lever 34 of the mirror drive mechanism 30, the mirror-up shock-absorbing lever 43 moves down toward the shock-absorbing standby position by the biasing force of the mirror-up shock-absorbing spring 44 in accordance with the movement of the shock-absorbing contact portion 16c of the mirror seat 16. As shown in FIG. 14, upon the mirror-up shock-absorbing lever 43 moving down by a predetermined moving amount, the lower end of the rotation-restricting arm 43e comes into contact with the rotation allowance surface 41c of the mirror-down shock-absorbing lever 41, which stops further downward movement of the mirror-up shock-absorbing lever 43 on its way down. Subsequently, as the movable mirror 15 approaches the mirror-down position, the shock-absorbing contact portion 16c of the mirror seat 16 comes into contact with the shock-absorbing pin 41a of the mirror-down shock-absorbing lever 41, as shown in FIG. 14, before the stopper 16a of the mirror seat 16 comes into contact with the mirror-down position defining pin 20. At this stage, the mirror-down shock-absorbing lever 41 is held in the shock-absorbing standby position by the biasing force of the mirror-down shock-absorbing spring 42, and during the rotation of the movable mirror 15 to the mirror-down position shown in FIG. 15, the shock-absorbing contact portion 16c of the mirror seat 16 depresses the shock-absorbing pin 41a of the mirror-down shock-absorbing lever 41 to rotate the mirror-down shock-absorbing lever 41 counterclockwise with respect to FIG. 14 from the shock-absorbing standby position against the biasing force of the mirror-down shock-absorbing spring 42. At this stage, the mirror-down shock-absorbing lever 41 can rotate with the rotation allowance surface 41c in sliding contact with the end of the rotation-restricting arm 43e without being restricted by the mirror-up shock-absorbing lever 43. Accordingly, during rotation of mirror-down shock-absorbing lever 41 in the shock-absorbing moving range that starts from the shock-absorbing standby position, the spring load of the mirror-down shock-absorbing spring 42 is exerted on the rotation of the movable mirror 15, and the movable mirror 15 reaches the mirror-down position while being shock-absorbed (cushioned) by the mirror-down shock-absorbing lever 41 and the mirror-down shock-absorbing spring 42. Consequently, the occurrence of bouncing (vibrations) of the movable mirror 15 when the movable mirror 15 rotates from the mirror-up position to the mirror-down position is suppressed (the duration of the bouncing becomes reduced and the number of bounces of the movable mirror 15 becomes small).

FIG. 15 shows a state immediately after the movable mirror 15 is rotated to the mirror-down position. Similar to the state shown in FIG. 11, the stopper 16a of the mirror seat 16 comes into contact with the mirror-down position defining pin 20 to thereby prevent the movable mirror 15 from rotating any further in the mirror-down direction (counterclockwise direction with respect to FIG. 15). As a result of the mirror-down shock-absorbing lever 41 having been pressed and rotated from the shock-absorbing standby position, the prevention of movement of the mirror-up shock-absorbing lever 43 by engagement of the rotation allowance surface 41c with the rotation-restricting arm 43e is released, so that the mirror-up shock-absorbing lever 43 has been moved down to the shock-absorbing standby position by the biasing force of the mirror-up shock-absorbing spring 44. This causes the rotation-restricting arm 43e to move into the path of rotational movement of the rotationally restricted surface 41b to again prevent the mirror-down shock-absorbing lever 41 from rotating toward the shock-absorbing standby position (clockwise direction with respect to FIG. 15). More specifically, when the movable mirror 15 rotates to the mirror-down position, the mirror-down shock-absorbing lever 41 rotates by inertia to a position to disengage the rotationally restricted surface 41b from the rotation-restricting arm 43e beyond the shock-absorbing standby position, i.e., up to the overrun range as shown in FIG. 15. Subsequently, the biasing force of the mirror-down shock-absorbing spring 42 causes the mirror-down shock-absorbing lever 41 to return to the position shown in FIG. 11, in which the rotationally restricted surface 41b is brought into contact with the rotation-restricting arm 43e of the mirror-up shock-absorbing lever 43. As described above, as well as the position of the mirror-down shock-absorbing lever 41 shown in FIG. 15, the position of the mirror-down shock-absorbing lever 41 shown in FIG. 11 is also in the overrun position, in which the shock-absorbing pin 41a is disengaged from the shock-absorbing contact portion 16c, and the mirror-down position of the movable mirror 15 is defined by the mirror-down position defining pin 20. Accordingly, the mirror-down shock-absorbing lever 41 serves as a shock-absorbing member in the shock-absorbing moving range, in which the shock-absorbing pin 41a is brought into contact with the shock-absorbing contact portion 16c, when the movable mirror 15 rotates toward the mirror-down position; in addition, in a state where the movable mirror 15 has reached the mirror-down position, the mirror-down shock-absorbing lever 41 is held in a non-contact position (overrun range) so as not to be in contact with the mirror seat 16, thus not interfering with the positioning of the movable mirror 15 that is defined by engagement of the mirror-down position defining pin 20 with the stopper 16a.

As described above, in the mirror shock-absorbing mechanism 40A, bouncing of the movable mirror 15 is suppressed by bringing the mirror-down shock-absorbing lever 41 and the mirror-up shock-absorbing lever 43 into contact with the shock-absorbing contact portion 16c of the mirror seat 16 when the movable mirror 15 rotates between the mirror-down position and the mirror-up position, respectively. This makes it possible to prevent the occurrence of image shake when a user/photographer views object images through the viewfinder optical system 22 and also to prevent the occurrence of delay in arithmetic processing using the photometering unit 23 and the distance measuring unit 24, thus making it possible to improve the viewing performance of the viewfinder and the sequential photographing performance of the camera 10. Additionally, in the mirror shock-absorbing mechanism 40A, the mirror-up shock-absorbing lever 43, which is used to absorb shock of the movable mirror 15 when the movable mirror 15 moves to the mirror-up position, is also used as a holder which holds the mirror-down shock-absorbing lever 41 (the shock-absorbing pin 41a) in a non-contact state with respect to the mirror seat 16 (i.e., holds the mirror-down shock-absorbing lever 41 in the overrun range, in which the mirror-down shock-absorbing lever 41 is not in contact with the mirror seat 16) and which ensures the positioning of the movable mirror 15 with high precision that is defined using the mirror-down position defining pin 20. Namely, the mirror-down shock-absorbing lever 41 is made to function securely as a shock-absorbing member when the movable mirror 15 rotates to the mirror-down position, whereas the mirror-down shock-absorbing lever 41 can be held in a non-contact state with respect to the movable mirror 15 upon the movable mirror 15 reaching the mirror-down position with no need to provide any special holding member other than the mirror-up shock-absorbing lever 43. Additionally, the biasing forces of the mirror-down shock-absorbing spring 42 and the mirror-up shock-absorbing spring 44 are used not only for absorbing shock of the movable mirror 15 but also for engaging the mirror-down shock-absorbing lever 41 and the mirror-up shock-absorbing lever 43 with each other. The above described structure contributes to achieving the mirror shock-absorbing mechanism 40A that is configured of a reduced number of elements and simple in structure.

Figure 16:
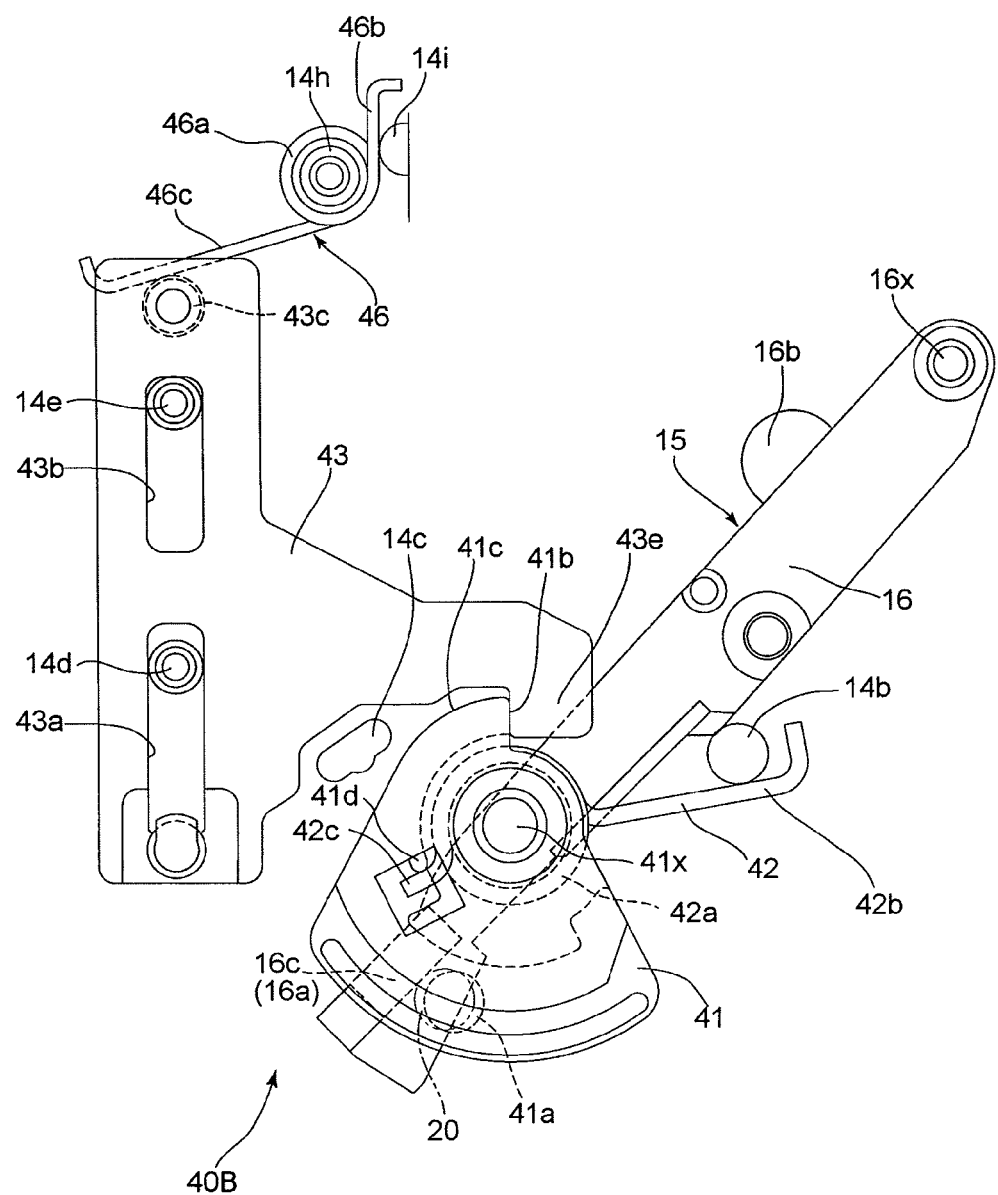
FIG. 16 is a side elevational view of a second embodiment of the mirror shock-absorbing mechanism in the mirror-down state.
Figure 17:
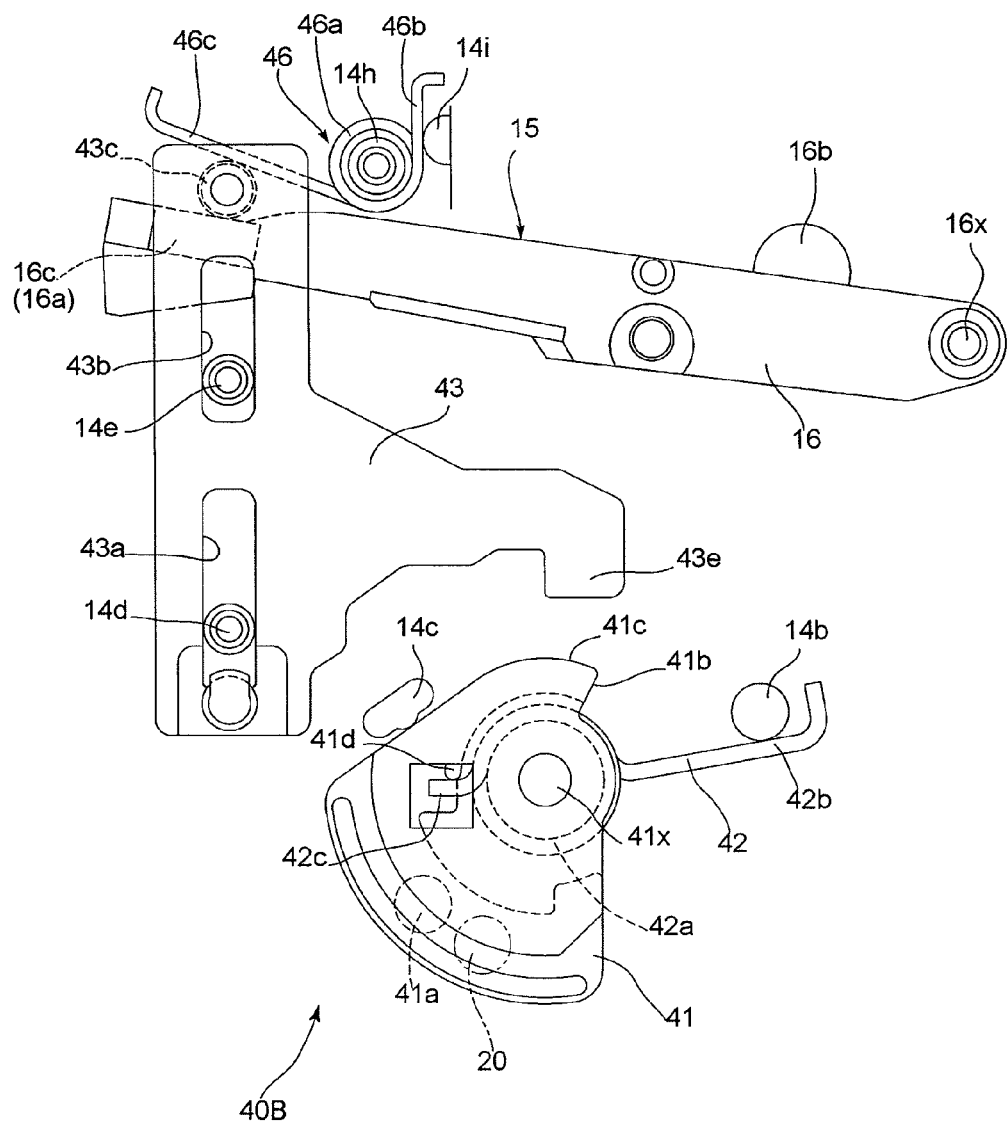
FIG. 17 is a side elevational view of the second embodiment of the mirror shock-absorbing mechanism in the mirror-up state.
Figure 18:
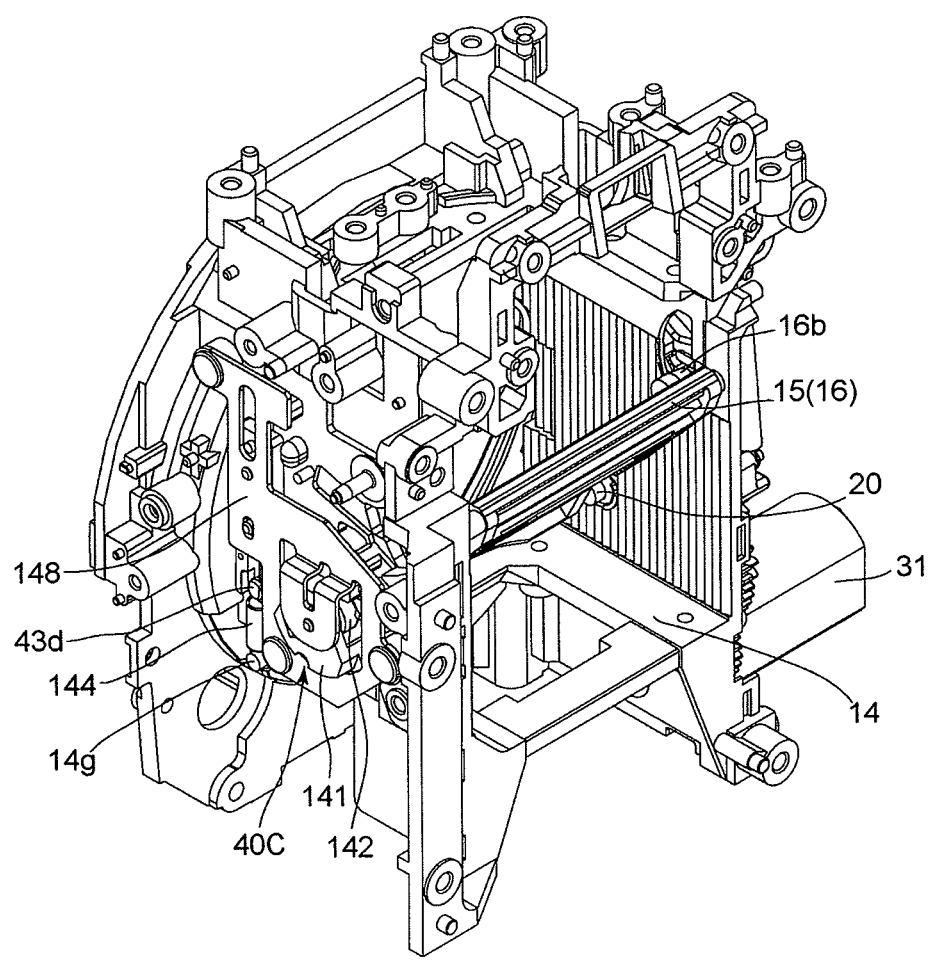
FIG. 18 is a rear perspective view of the mirror box unit in the mirror-down state which is equipped with a third embodiment of the mirror shock-absorbing mechanism.
Figure 19:
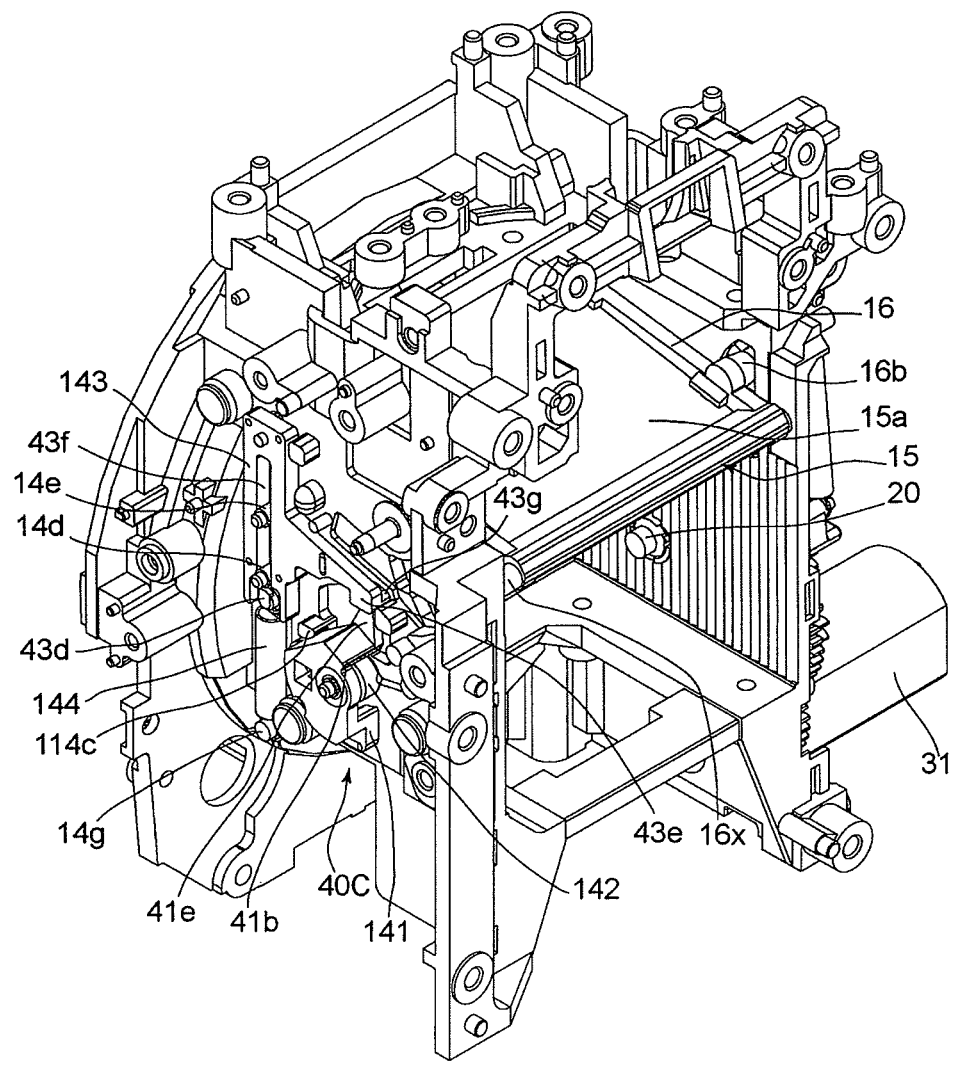
FIG. 19 is a rear perspective view of the mirror box unit in the mirror-up state which is equipped with the third embodiment of the mirror shock-absorbing mechanism.

A second embodiment of the mirror shock-absorbing mechanism 40B will be hereinafter discussed with reference to FIGS. 16 and 17. In the mirror shock-absorbing mechanism 40B, the mirror-up shock-absorbing spring 44 in the first embodiment of the mirror shock-absorbing mechanism 40A is replaced by a mirror-up shock-absorbing spring 46 configured from a torsion spring which is used as a member (second biaser/an element of the engaging mechanism) for biasing the mirror-up shock-absorbing lever 43 toward the shock-absorbing standby position. The mirror-up shock-absorbing spring 46 is a torsion spring which is provided with a coil portion 46a, a spring arm portion 46b and a spring arm portion 46c. The coil portion 46a surrounds a support projection 14h formed on a side of the mirror box 14, the spring arm portion 46b is engaged with a spring hook 14i formed on a side of the mirror box 14, and the spring arm portion 46c is engaged with the base of the shock-absorbing pin 43c of the mirror-up shock-absorbing lever 43. The mirror-up shock-absorbing spring 46 biases the mirror-up shock-absorbing lever 43 downward. Similar to the first embodiment of the mirror shock-absorbing mechanism 40A, when the movable mirror 15 is in the mirror-down position that is shown in FIG. 16, the mirror-up shock-absorbing lever 43 is held in the shock-absorbing standby position, in which the upper end of the guide hole 43b is engaged with the guide pin 14e, by the biasing force of the mirror-up shock-absorbing spring 46. When the movable mirror 15 rotates to the mirror-up position as shown in FIG. 17, this rotation of the movable mirror 15 causes the shock-absorbing contact portion 16c of the mirror seat 16 to press the shock-absorbing pin 43c, which causes the mirror-up shock-absorbing lever 43 to move upward from the shock-absorbing standby position against the biasing force of the mirror-up shock-absorbing spring 46, and thereupon, the mirror-up shock-absorbing lever 43 absorbs shock of the movable mirror 15 and releases the prevention of rotation of the mirror-down shock-absorbing lever 41. The operating noise of the movable mirror 15 that is caused when it is driven between the mirror-down position and the mirror-up position can be reduced using the mirror-up shock-absorbing spring 46 that is configured from a torsion spring.

Although the first embodiment of the mirror shock-absorbing mechanism 40A and the second embodiment of the mirror shock-absorbing mechanism 40B have each been illustrated as a mechanism for holding the mirror-down shock-absorbing lever 41 in a position (in the overrun range) that is not in contact with the movable mirror 15 when it is in the mirror-down position, the first embodiment of the mirror shock-absorbing mechanism 40A and the second embodiment of the mirror shock-absorbing mechanism 40B can also be each constructed as a mechanism for holding a shock-absorbing member (the mirror-up shock-absorbing lever 43) which absorbs shock of the movable mirror 15 when the movable mirror 15 moves to the mirror-up position in a position (in the overrun range) that is not in contact with the movable mirror 15 when the movable mirror 15 is in the mirror-up position if the above descriptions of the first embodiment of the mirror shock-absorbing mechanism 40A and the second embodiment of the mirror shock-absorbing mechanism 40B are read with the terms "the mirror-up position" and "the mirror-down position" reversed. Namely, the present invention can be applied to the holding of the shock-absorbing member at either of the mirror-down position (viewfinder light-guiding position) and the mirror-up position (retracted position) of the movable mirror.

Additionally, the mirror shock-absorbing mechanism according to the present invention can also be structured to be capable of holding each shock-absorbing member in a position (in the overrun range) so as not contact the movable mirror at each of the mirror-down position (viewfinder light-guiding position) and the mirror-up position (retracted position) of the movable mirror. In the first and second embodiments of the mirror shock-absorbing mechanisms, the mirror-up shock-absorbing lever 43 has an overrun range similar to that of the mirror-down shock-absorbing lever 41, as described above. More specifically, although the position where the lower end of the guide hole 43a comes in contact with the guide pin 14d corresponds to the upper movement limit of the mirror-up shock-absorbing lever 43, the movable mirror 15 comes in contact with the upper stopper 21 before the mirror-up shock-absorbing lever 43 reaches the upper movement limit, and accordingly, moving the mirror-up shock-absorbing lever 43 to a position in the vicinity of the upper movement limit causes the shock-absorbing pin 43c to be disengaged from the shock-absorbing contact portion 16c of the mirror seat 16. Furthermore, by additionally providing the mirror-down shock-absorbing lever 41 with an engaging portion for holding the mirror-up shock-absorbing lever 43 in the aforementioned position in the vicinity of the upper movement limit (in the overrun range) when the movable mirror 15 rotates to the mirror-up position, the mirror-up shock-absorbing lever 43 can be held in a non-contact state with respect to the movable mirror 15 when the movable mirror 15 is in the mirror-up position. In this case, the mirror-down shock-absorbing lever 41 and the mirror-down shock-absorbing spring 42, each of which serves as a shock-absorbing member when the movable mirror 15 rotates to the mirror-down position, also serve as a holder which holds the mirror-up shock-absorbing lever 43 in the overrun range so that the mirror shock-absorbing mechanism can be structured to have a small number of components and be simple in structure, similar to the mechanism for holding the mirror-down shock-absorbing lever 41 in the overrun range when the movable mirror 15 is in the mirror-down position.

A third embodiment of the mirror shock-absorbing mechanism 40C will be hereinafter discussed with reference to FIGS. 18 through 27. The mirror shock-absorbing mechanism 40C is provided with a mirror-down shock-absorbing lever (mirror-advancing shock-absorbing member) 141, a mirror-down shock-absorbing spring (first biaser) 142, a mirror-up shock-absorbing lever (mirror-retracting shock-absorbing member) 143 and a mirror-up shock-absorbing spring (second biaser) 144. The mirror-down shock-absorbing lever 141, the mirror-down shock-absorbing spring 142, the mirror-up shock-absorbing lever 143 and the mirror-up shock-absorbing spring 144 are held so as not to come off the mirror box 14 by a retaining plate 148 (see FIG. 18) that is fixed to a side of the mirror box 14. The mirror-down shock-absorbing lever 141, the mirror-down shock-absorbing spring 142, the mirror-up shock-absorbing lever 143 and the mirror-up shock-absorbing spring 144 correspond to the mirror-down shock-absorbing lever 41, the mirror-down shock-absorbing spring 42, the mirror-up shock-absorbing lever 43 and the mirror-up shock-absorbing spring 44 of the first embodiment of the mirror shock-absorbing mechanism 40A, respectively, and elements of the third embodiment of the mirror shock-absorbing mechanism 40C which are the same as those of the first embodiment of the mirror shock-absorbing mechanism 40A are designated by the same reference numerals and the detailed description thereof are omitted.

Figure 21:
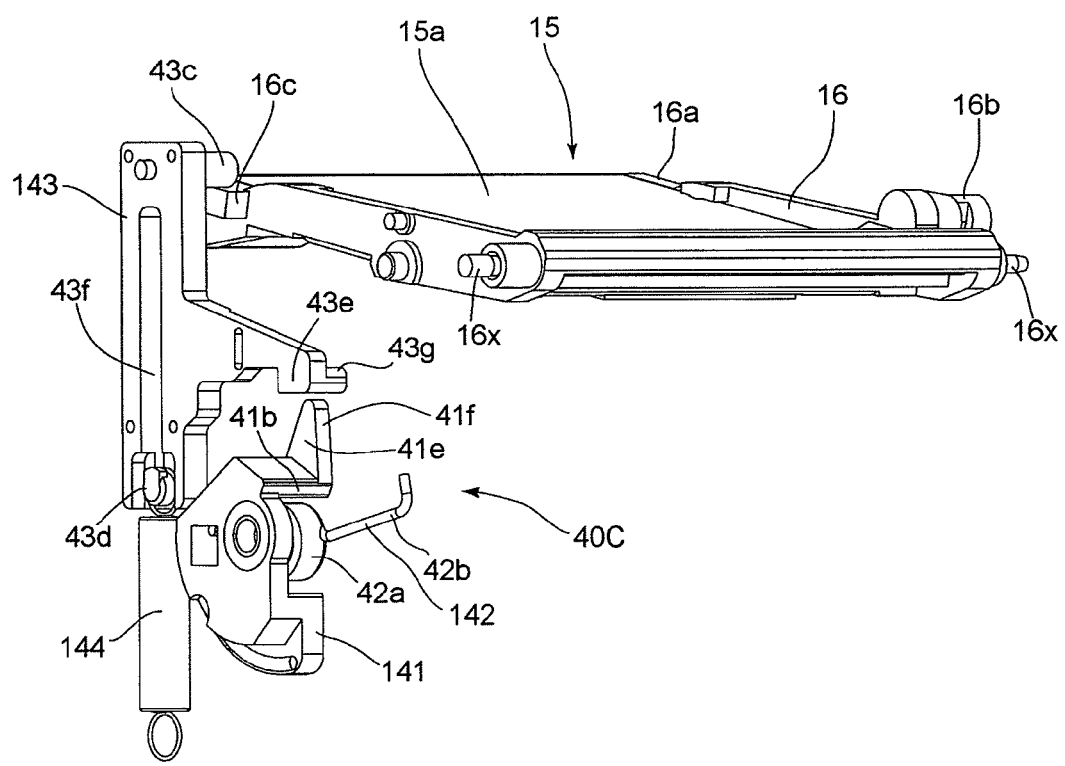
FIG. 21 is a rear perspective view of the third embodiment of the mirror shock-absorbing mechanism, showing a state where the contact portion of the mirror seat is in contact with the shock-absorbing pin of the mirror-up shock-absorbing lever.
Figure 22:
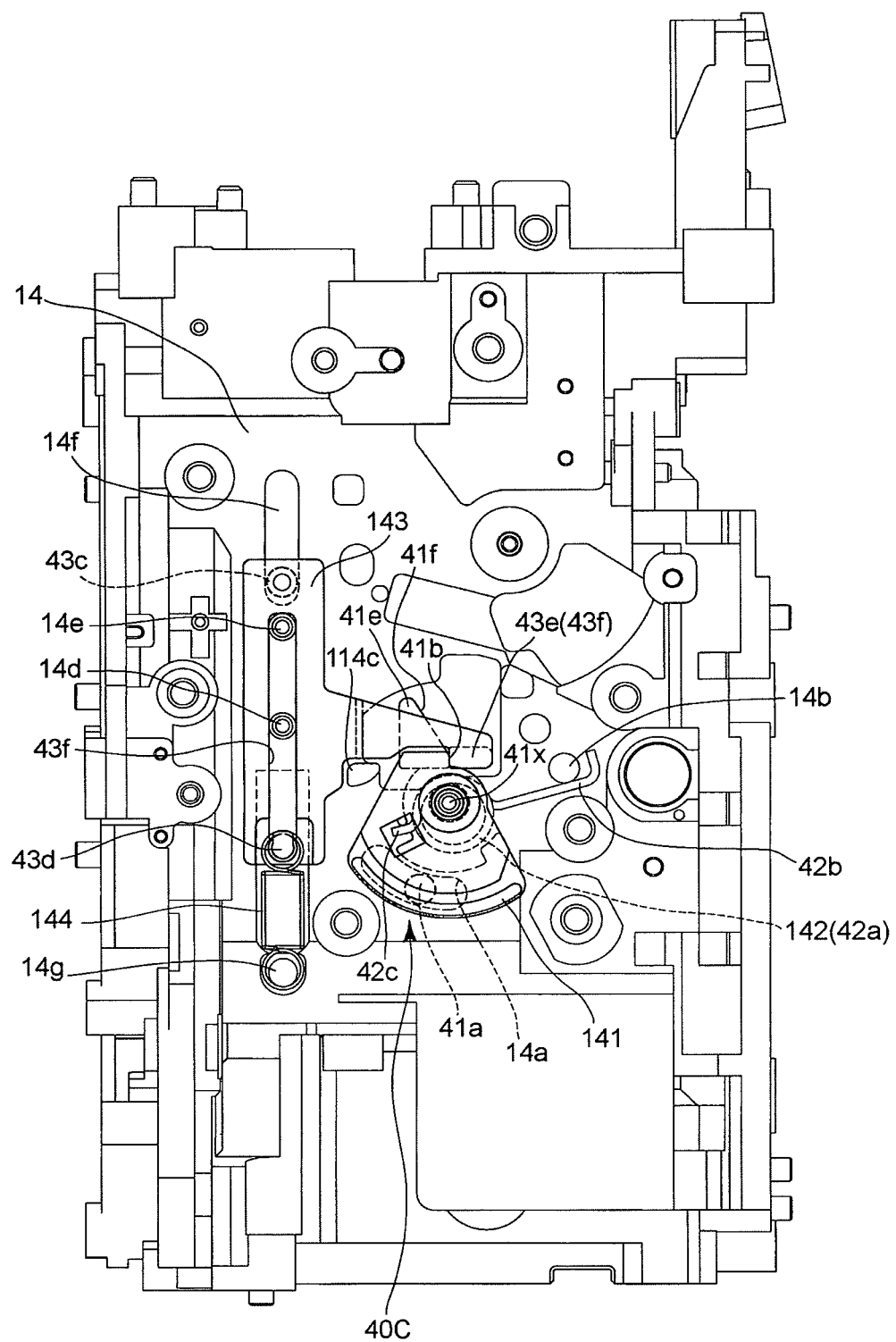
FIG. 22 is a left side elevational view of the mirror box unit shown in FIGS. 18 and 19 with the retaining plate removed to expose the third embodiment of the mirror shock-absorbing mechanism.

The mirror-down shock-absorbing lever 141 is identical in basic structure to the mirror-down shock-absorbing lever 41 of each of the first and second embodiments of the mirror shock-absorbing mechanisms. The mirror-down shock-absorbing lever 141 is additionally provided with a downward movement restricting arm (movement restricting portion) 41e which projects in a radially outward direction away from the shaft 41x. As shown in FIG. 21, the downward movement restricting arm 41e is shaped into a triangular protrusion which extends in a radially outward direction from a portion of the rotationally restricted surface 41b, which constitutes as a base end of the downward movement restricting arm 41e which is located in close vicinity of a side (interior side of the mirror box 14) of the mirror box 14. The downward movement restricting arm 41e is provided, on one side thereof adjacent to the rotationally restricted surface 41b, with an inclined surface (slide contact surface) 41f which is inclined to a radial direction of the shaft 41x.

The mirror-down shock-absorbing spring 142 is a torsion spring similar to the mirror-down shock-absorbing spring 42 of each of the first and second embodiments of the mirror shock-absorbing mechanisms. The mirror-down shock-absorbing spring 142 biases the mirror-down shock-absorbing lever 141 in a direction to rotate toward a shock-absorbing standby position (limit position) in which the mirror-down shock-absorbing lever 141 comes in contact with a rotational limit projection (rotational limit portion) 114c which projects from a side of the mirror box 14. Although the rotational limit projection 114c is different in shape from the rotational limit projection 14c of each of the first and second embodiments of the mirror shock-absorbing mechanisms, the rotational limit projection 114c is identical to the rotational limit projection 14c in capability of defining the shock-absorbing standby position of the mirror-down shock-absorbing lever (41/141).

The mirror-up shock-absorbing lever 143 has the same basic structure to that of the mirror-up shock-absorbing lever 43 of the first and second embodiments; however, the mirror-up shock-absorbing lever 143 is different from the mirror-up shock-absorbing lever 43 in that the upper guide pin 14d and the lower guide pin 14e, which are formed to project from a side of the mirror box 14, are inserted into an elongated guide hole 43f which is formed through the mirror-up shock-absorbing lever 143. Accordingly, a shock-absorbing standby position (limit position) of the mirror-up shock-absorbing lever 143 is defined by engagement of the upper end of the guide hole 43f with the guide pin 14e. The mirror-up shock-absorbing spring 144 is an extension spring similar to the mirror-up shock-absorbing spring 44 of the first embodiment of the mirror shock-absorbing mechanism. The mirror-up shock-absorbing spring 144 biases the mirror-up shock-absorbing lever 143 toward the aforementioned shock-absorbing standby position, which is defined by engagement of the upper end of the guide hole 43f with the guide pin 14e.

Figure 20:
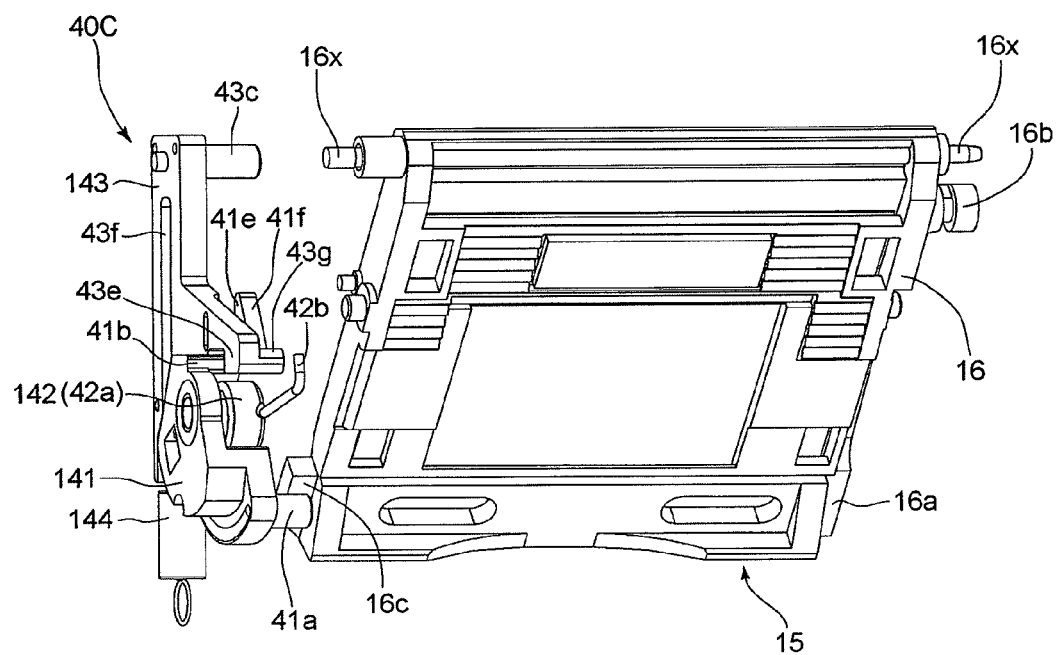
FIG. 20 is a rear perspective view of the third embodiment of the mirror shock-absorbing mechanism, showing a state where the contact portion of the mirror seat is in contact with the shock-absorbing pin of the mirror-down shock-absorbing lever.

As shown in FIGS. 20 and 21, the mirror-up shock-absorbing lever 143 is further provided with a downward movement restricted projection (restricted portion) 43g which projects from the end of the rotation-restricting arm 43e in a direction to approach a side of the mirror box 14 (toward the inside of the mirror box 14). The downward movement restricted projection 43g lies in a plane in which the downward movement restricting arm 41e of the mirror-down shock-absorbing lever 141 lies. The downward movement restricted projection 43g can come into contact with the downward movement restricting arm 41e of the mirror-down shock-absorbing lever 141 without interfering with any other part of the mirror-down shock-absorbing lever 141 (such as the rotationally restricted surface 41b). Although the downward movement restricted projection 43g and the downward movement restricting arm 41e are formed to be offset in an inner lateral direction of the mirror box 14 from a plane in which the rotation-restricting arm 43e lies in the above described embodiment shown in FIGS. 20 and 21, it is possible for the downward movement restricted projection 43g and the downward movement restricting arm 41e be formed outside of the rotation-restricting arm 43e (i.e., to be offset in an outer lateral direction of the mirror box 14).

Figure 25:
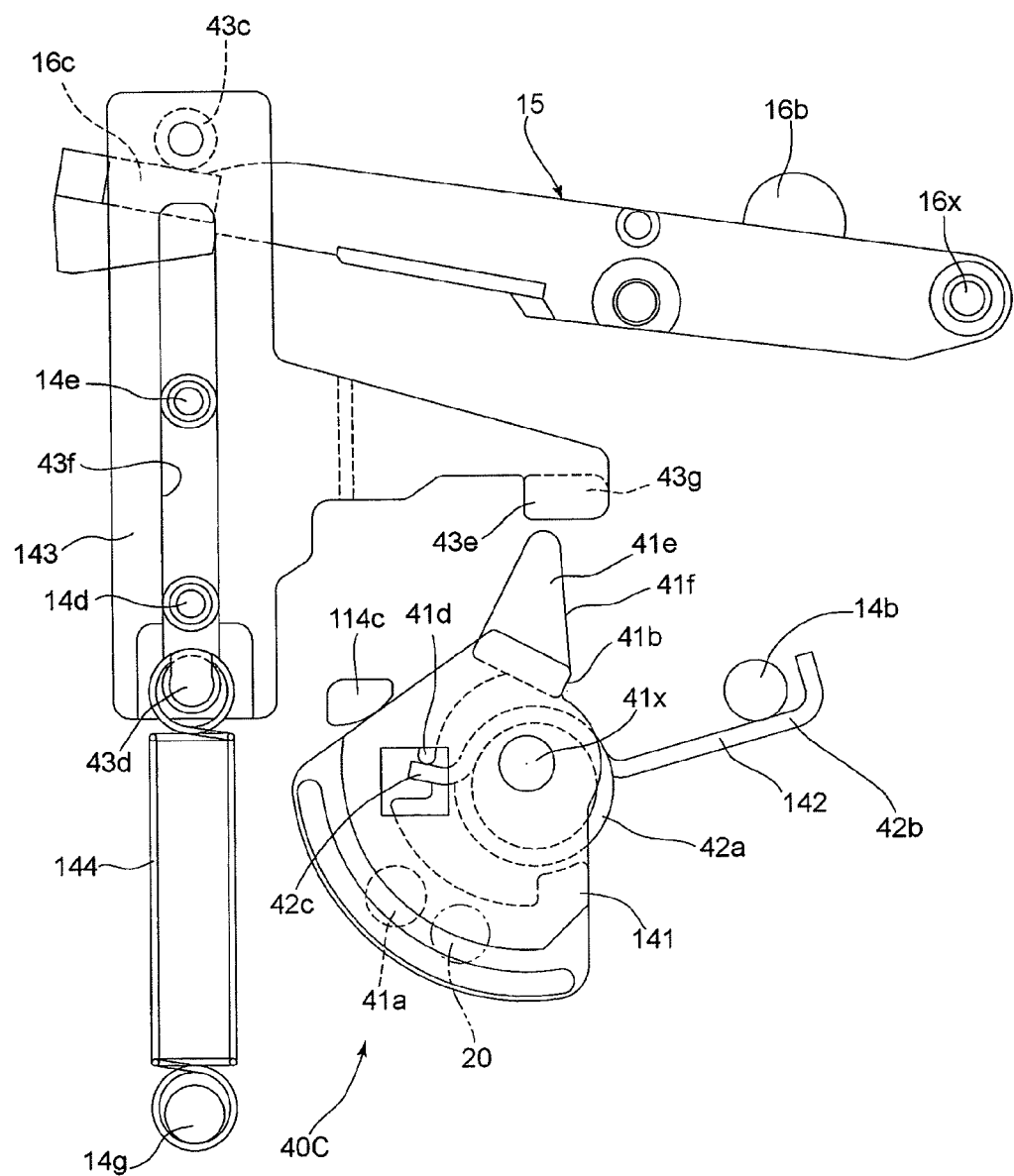
FIG. 25 is a side elevational view of the third embodiment of the mirror shock-absorbing mechanism in the mirror-up state.
Figure 26:
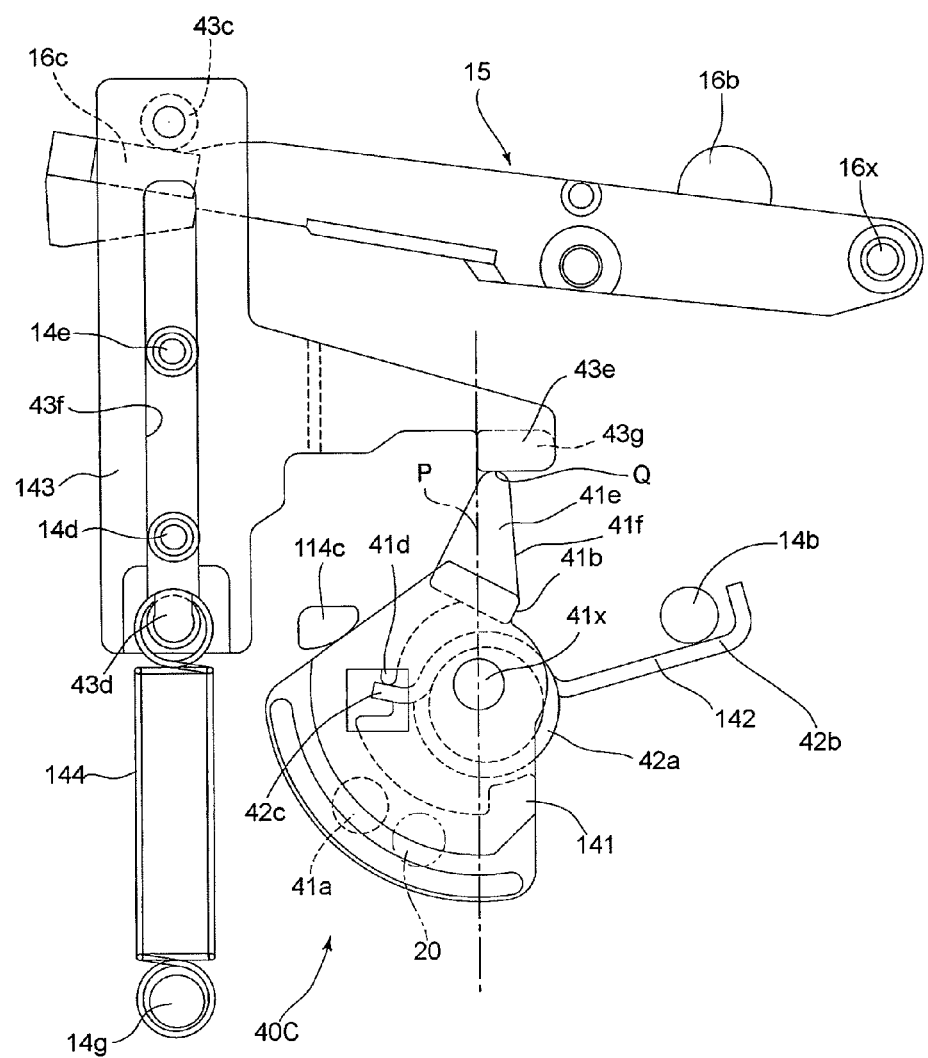
FIG. 26 is a side elevational view of the third embodiment of the mirror shock-absorbing mechanism in a state where the mirror-up shock-absorbing lever is prevented from moving down by the mirror-down shock-absorbing lever.

When the mirror-down shock-absorbing lever 141 is in the shock-absorbing standby position shown in FIGS. 25 and 26, the rotational restricting arm 41e has moved into the path of movement of the downward movement restricted projection 43g and prevents the mirror-up shock-absorbing lever 143 from moving in the biasing direction of the mirror-up shock-absorbing spring 144 by engagement of the end (tip) of the downward movement restricting arm 41e with the downward movement restricted projection 43g (see FIG. 26). In a state where the rotational restricting arm 41e and the downward movement restricted projection 43g are engaged with each other, the mirror-down shock-absorbing lever 141 can rotate in a direction opposite to the biasing direction of the mirror-down shock-absorbing spring 142 (in the counterclockwise direction with respect to FIG. 26).

Figure 23:
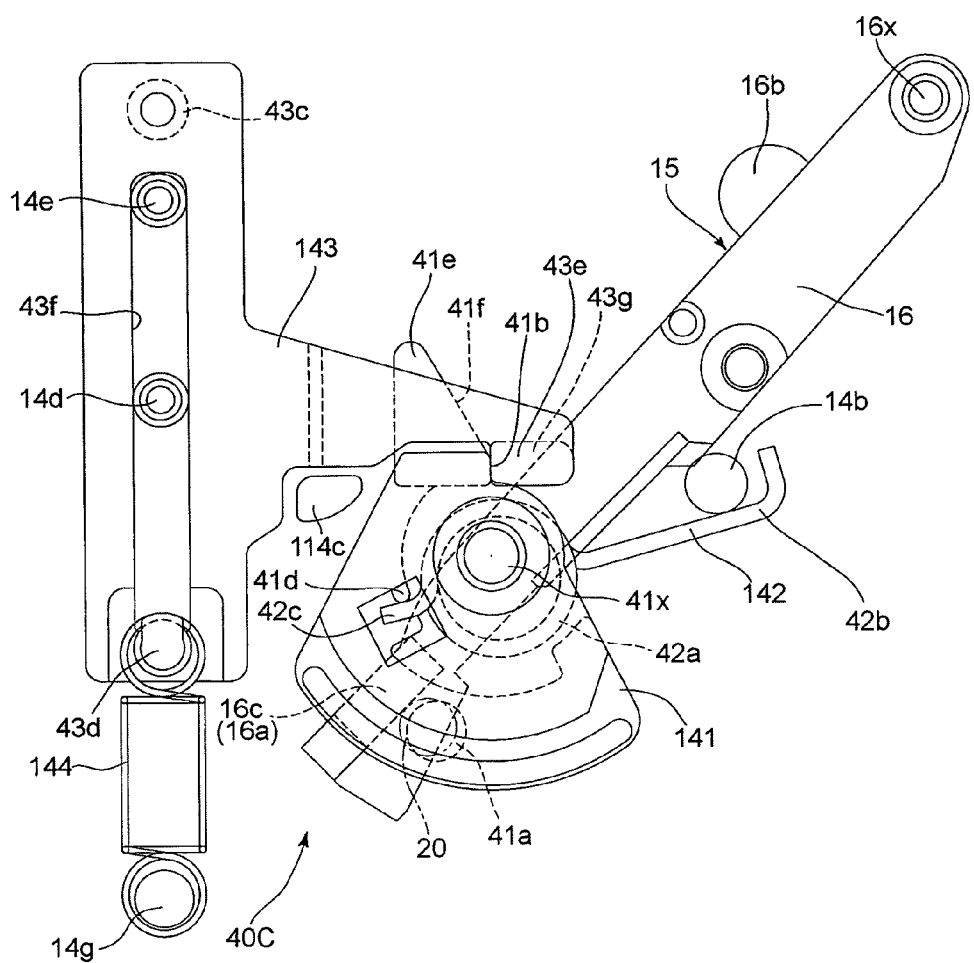
FIG. 23 is a side elevational view of the third embodiment of the mirror shock-absorbing mechanism in the mirror-down state.

Operations of the mirror shock-absorbing mechanism 40C will be hereinafter discussed with reference to FIGS. 23 through 27. FIG. 23 shows a state where the movable mirror is in the mirror-down position. The mirror-up shock-absorbing lever 143 is held in the shock-absorbing standby position by the biasing force of the mirror-up shock-absorbing spring 144, and prevents the mirror-down shock-absorbing lever 141 from rotating in the biasing direction of the mirror-down shock-absorbing spring 142 (i.e., in the clockwise direction with respect to FIG. 23) by bringing the rotation-restricting arm 43e into contact with the rotationally restricted surface 41b. At this stage, the mirror-down shock-absorbing lever 141 is held at a position in the overrun range, in which the shock-absorbing pin 41a is disengaged from the shock-absorbing contact portion 16c of the mirror seat 16 in a mirror-down direction (counterclockwise direction with respect to FIG. 23).

Figure 24:
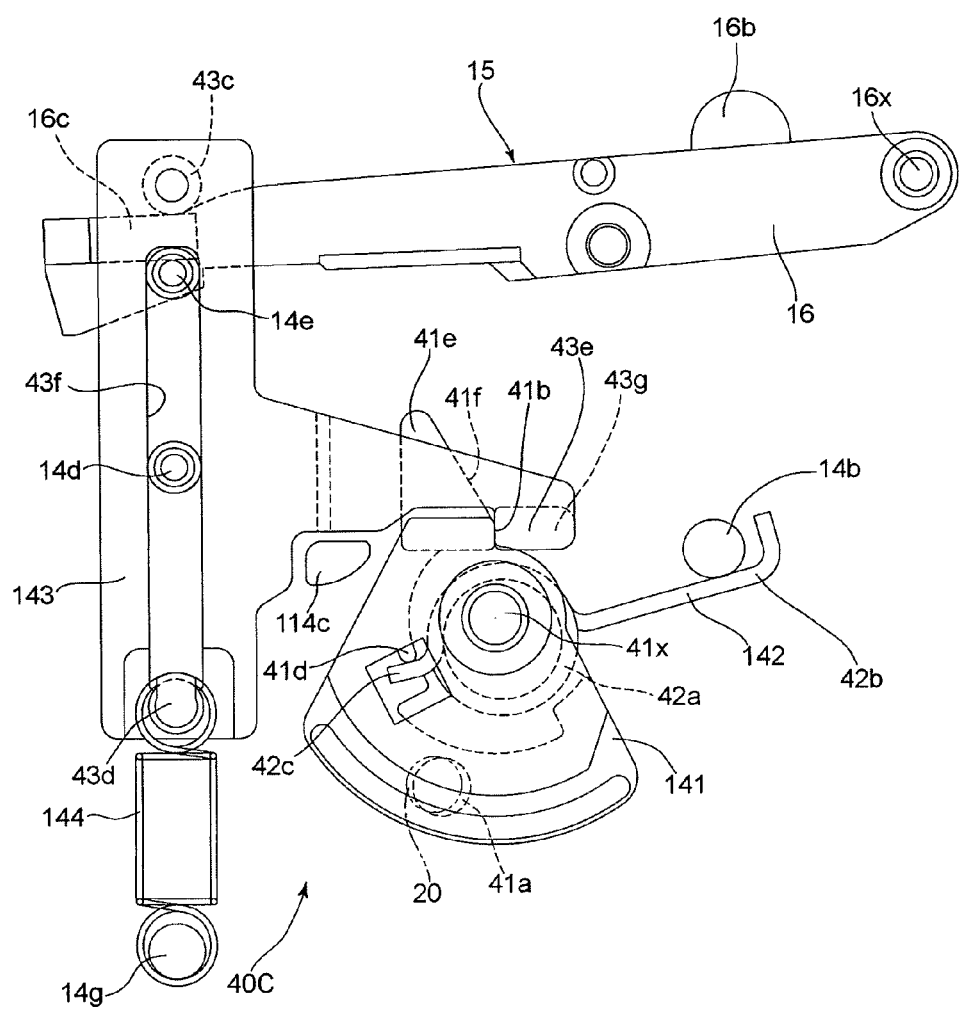
FIG. 24 is a side elevational view of the third embodiment of the mirror shock-absorbing mechanism in a state where the movable mirror is in the process of rotating to the mirror-up position from the mirror-down position.

When the movable mirror 15 is rotated from the mirror-down position toward the mirror-up position to thereby bring an upper surface of the shock-absorbing contact portion 16c of the mirror seat 16 into contact with the shock-absorbing pin 43c of the mirror-up shock-absorbing lever 143 as shown in FIG. 24, and the mirror-up shock-absorbing lever 143 is pressed and moved upward from the shock-absorbing standby position against the biasing force of the mirror-up shock-absorbing spring 144. This suppresses the occurrence of bouncing (vibrations) of the movable mirror 15 when the movable mirror 15 rotates to the mirror-up position that is shown in FIG. 25. In a state where the movable mirror 15 is in the mirror-up position by engagement with the upper stopper 21, the mirror-up shock-absorbing lever 143 has not reached the upper movement limit thereof, at which the lower end of the guide hole 43f comes in contact with the guide pin 14d, so that there is still room for the mirror-up shock-absorbing lever 143 to move further up into the overrun range (i.e., to a position to disengage the shock-absorbing pin 43c from the shock-absorbing contact portion 16c of the movable mirror 15).

When the mirror-up shock-absorbing lever 143 is pressed and moved upward from the shock-absorbing standby position, the rotation-restricting arm 43e retracts upward from the path of rotational movement of the rotationally restricted surface 41b. This releases the prevention of rotation of the mirror-down shock-absorbing lever 141. However, the mirror-down shock-absorbing lever 141 does not rotate to the shock-absorbing standby position by the biasing force of the mirror-down shock-absorbing spring 142 immediately after the rotation-restricting arm 43e and the rotationally restricted surface 41b are disengaged from each other, rather, the mirror-down shock-absorbing lever 141 is stopped with the inclined surface 41f of the downward movement restricting arm 41e abutting on a side of the downward movement restricted projection 43g of the mirror-up shock-absorbing lever 143. In addition, the mirror-up shock-absorbing lever 143 moves upward while making a side of the downward movement restricted projection 43g slide on the inclined surface 41f. In this sliding operation, a holding force produced via the mirror-down shock-absorbing lever 141 (the biasing force of the mirror-down shock-absorbing spring 142) acts on the mirror-up shock-absorbing lever 143, so that backlash between the guide hole 43f and the guide pins 14d and 14e is absorbed, which allows smooth movement of the mirror-up shock-absorbing lever 143 without play and assists shock absorption for the mirror seat 16. Upon the mirror-up shock-absorbing lever 143 being moved to a position to make the downward movement restricted projection 43g disengaged upwardly from the downward movement restricting arm 41e, the sliding movement of the downward movement restricted projection 43g on the inclined surface 41f is cancelled, and the mirror-down shock-absorbing lever 141 rotates to the shock-absorbing standby position, in which the mirror-down shock-absorbing lever 141 contacts the rotational limit projection 114c, by the biasing force of the mirror-down shock-absorbing spring 142. When the mirror-down shock-absorbing lever 141 is in the shock-absorbing standby position, the shock-absorbing pin 41a is positioned above the mirror-down position defining pin 20, namely, at a position advanced in a mirror-up direction (clockwise direction with respect to FIG. 25) of the movable mirror 15.

As shown in FIG. 25, when the mirror-down shock-absorbing lever 141 is rotated to the shock-absorbing standby position, the downward movement restricting arm 41e is positioned immediately below the downward movement restricted projection 43g of the mirror-up shock-absorbing lever 143. FIG. 25 shows a state where the mirror-up shock-absorbing lever 143 has been moved up by the movable mirror 15 that has rotated to the mirror-up position to thereby create a slight gap between the end of the downward movement restricting arm 41e and the downward movement restricted projection 43g. From this state, a downward movement of the mirror-up shock-absorbing lever 143 causes the downward movement restricted projection 43g to come into contact with the end (tip) of the downward movement restricting arm 41e as shown in FIG. 26. Assuming a plane P (shown by a one-dot chain line in FIG. 26) which passes through the center (rotational center) of the shaft 41x of the mirror-down shock-absorbing lever 141 and is substantially parallel to the moving direction of the mirror-up shock-absorbing lever 143, a contact point Q (shown in FIG. 26) between the downward movement restricted projection 43g and the downward movement restricting arm 41e is offset rightward from the plane P with respect to FIG. 26. Accordingly, the force of the downward movement restricted projection 43g that presses the downward movement restricting arm 41e acts on the mirror-down shock-absorbing lever 141 as a force urging the mirror-down shock-absorbing lever 141 to rotate clockwise with respect to FIG. 26 (in the biasing direction of the mirror-down shock-absorbing spring 142). Since the mirror-down shock-absorbing lever 141 is prevented from rotating in this direction by the rotational limit projection 114c, the mirror-down shock-absorbing lever 141 is held in the position shown in FIG. 26. Namely, the position of the downward movement restricting arm 41e of the mirror-down shock-absorbing lever 141 does not change, and engagement of the downward movement restricted projection 43g with the downward movement restricting arm 41e prevents the mirror-up shock-absorbing lever 143 from moving downward.

As described above, when the movable mirror 15 rotates from the mirror-down position to the mirror-up position, the spring load of the mirror-up shock-absorbing spring 144 is exerted on the rotation of the movable mirror 15 to absorb shock of the movable mirror 15 by engagement of the shock-absorbing contact portion 16c of the mirror seat 16 with the shock-absorbing pin 43c of the mirror-up shock-absorbing lever 143. Additionally, the range of movement (the amount of downward movement) of the mirror-up shock-absorbing lever 143 in a state where the movable mirror 15 has reached the mirror-up position is limited to an extremely small range by the downward movement restricting arm 41e of the mirror-down shock-absorbing lever 141. This reduces the degree of rebounding movement of the mirror-up shock-absorbing lever 143, shortens the duration of bouncing (vibration) of the movable mirror 15 and reduces the number of bounces thereof when the movable mirror 15 rotates to the mirror-up position. Hence, the shock-absorbing capability for the movable mirror is enhanced.

In a reverse operation to the above described mirror-up operation, when the movable mirror 15 approaches the mirror-down position while rotating from the mirror-up position, the shock-absorbing contact portion 16c of the mirror seat 16 comes into contact with the shock-absorbing pin 41a of the mirror-down shock-absorbing lever 141 before the stopper 16a of the mirror seat 16 comes into contact with the mirror-down position defining pin 20. At this stage, the mirror-down shock-absorbing lever 141 is held at the shock-absorbing standby position by the biasing force of the mirror-down shock-absorbing spring 142, and during the time the movable mirror 15 rotates to the mirror-down position shown in FIG. 27, the shock-absorbing contact portion 16c of the mirror seat 16 depresses the shock-absorbing pin 41a of the mirror-down shock-absorbing lever 141 to rotate the mirror-down shock-absorbing lever 141 counterclockwise with respect to FIGS. 25 and 26 from the shock-absorbing standby position against the biasing force of the mirror-down shock-absorbing spring 142. Accordingly, during rotation of the mirror-down shock-absorbing lever 141 in the shock-absorbing moving range that starts from the shock-absorbing standby position, the spring load of the mirror-down shock-absorbing spring 142 is exerted on rotation of the movable mirror 15, and the movable mirror 15 reaches the mirror-down position while being shock-absorbed (cushioned) by the mirror-down shock-absorbing lever 141 and the mirror-down shock-absorbing spring 142.

When the mirror-down shock-absorbing lever 141 is pressed and rotated counterclockwise with respect to FIGS. 25 and 26 from the shock-absorbing standby position by a rotation of the movable mirror 15 from the mirror-up position to the mirror-down position, the downward movement restricting arm 41e retracts from the path of movement of the downward movement restricted projection 43g, which releases the restriction applied to the range of movement of the mirror-up shock-absorbing lever 143 by the mirror-down shock-absorbing lever 141. Therefore, when the movable mirror 15 rotates to the mirror-down position, the mirror-up shock-absorbing lever 143 is moved down to the shock-absorbing standby position by the biasing force of the mirror-up shock-absorbing spring 144 (see FIG. 27).

Figure 27:
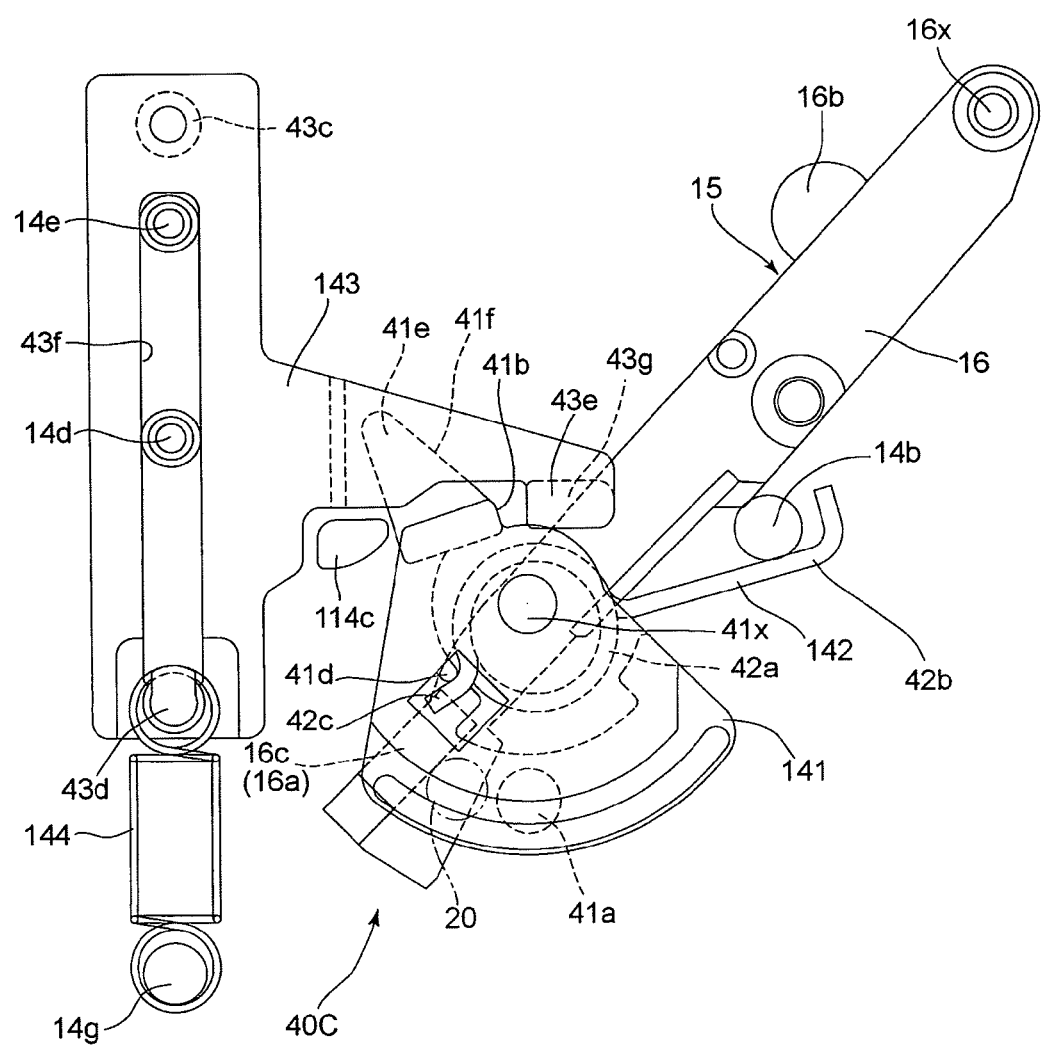
FIG. 27 is a side elevational view of the third embodiment of the mirror shock-absorbing mechanism in a state where the movable mirror has rotated from the mirror-up position to the mirror-down position and the mirror-down shock-absorbing lever has been rotated to a position within an overrun range, which exceeds a rotational limit position defined by the mirror-up shock-absorbing lever.

FIG. 27 shows a state immediately after the movable mirror 15 is rotated to the mirror-down position. Similar to the state shown in FIG. 23, the stopper 16a of the mirror seat 16 comes into contact with the mirror-down position defining pin 20 to thereby prevent the movable mirror 15 from rotating in the mirror-down direction (counterclockwise direction with respect to FIG. 27). As a result of the mirror-down shock-absorbing lever 141 having been pressed and rotated from the shock-absorbing standby position, the restriction applied to the range of movement of the mirror-up shock-absorbing lever 143 by the mirror-down shock-absorbing lever 141 is released, and the mirror-up shock-absorbing lever 143 has been moved down to the shock-absorbing standby position by the biasing force of the mirror-up shock-absorbing spring 144 as described above. This causes the rotation-restricting arm 43e to move into the path of rotational movement of the rotationally restricted surface 41b to prevent the mirror-down shock-absorbing lever 141 from rotating toward the shock-absorbing standby position (clockwise direction with respect to FIG. 27). Similar to the mirror-down shock-absorbing lever 41 of the first embodiment of the mirror shock-absorbing mechanism, when the movable mirror 15 rotates to the mirror-down position, the mirror-down shock-absorbing lever 141 rotates by inertia to the position shown in FIG. 27, and subsequently returns, by the biasing force of the mirror-down shock-absorbing spring 142, to the position shown in FIG. 23 (into the overrun range, in which the shock-absorbing pin 41a is disengaged from the shock-absorbing contact portion 16c of the mirror seat 16), in which the rotationally restricted surface 41b of the mirror-down shock-absorbing lever 141 is brought into contact with the rotation-restricting arm 43e of the mirror-up shock-absorbing lever 143.

As described above, in the mirror shock-absorbing mechanism 40C, the mirror-down shock-absorbing lever 141 that absorbs shock of the movable mirror 15 when the movable mirror 15 rotates to the mirror-down position also serves as a device which limits the range of movement of the mirror-up shock-absorbing lever 143 that absorbs shock of the movable mirror 15 when the movable mirror 15 rotates to the mirror-up position. Accordingly, it is not necessary to provide any additional member which limits the range of movement of the mirror-up shock-absorbing lever 143, so that the mirror shock-absorbing mechanism 40C can be structured to have a small number of components and be simple in structure, and can efficiently reduce shock when the movable mirror 15 rotates to the mirror-up position.

Figure 28:
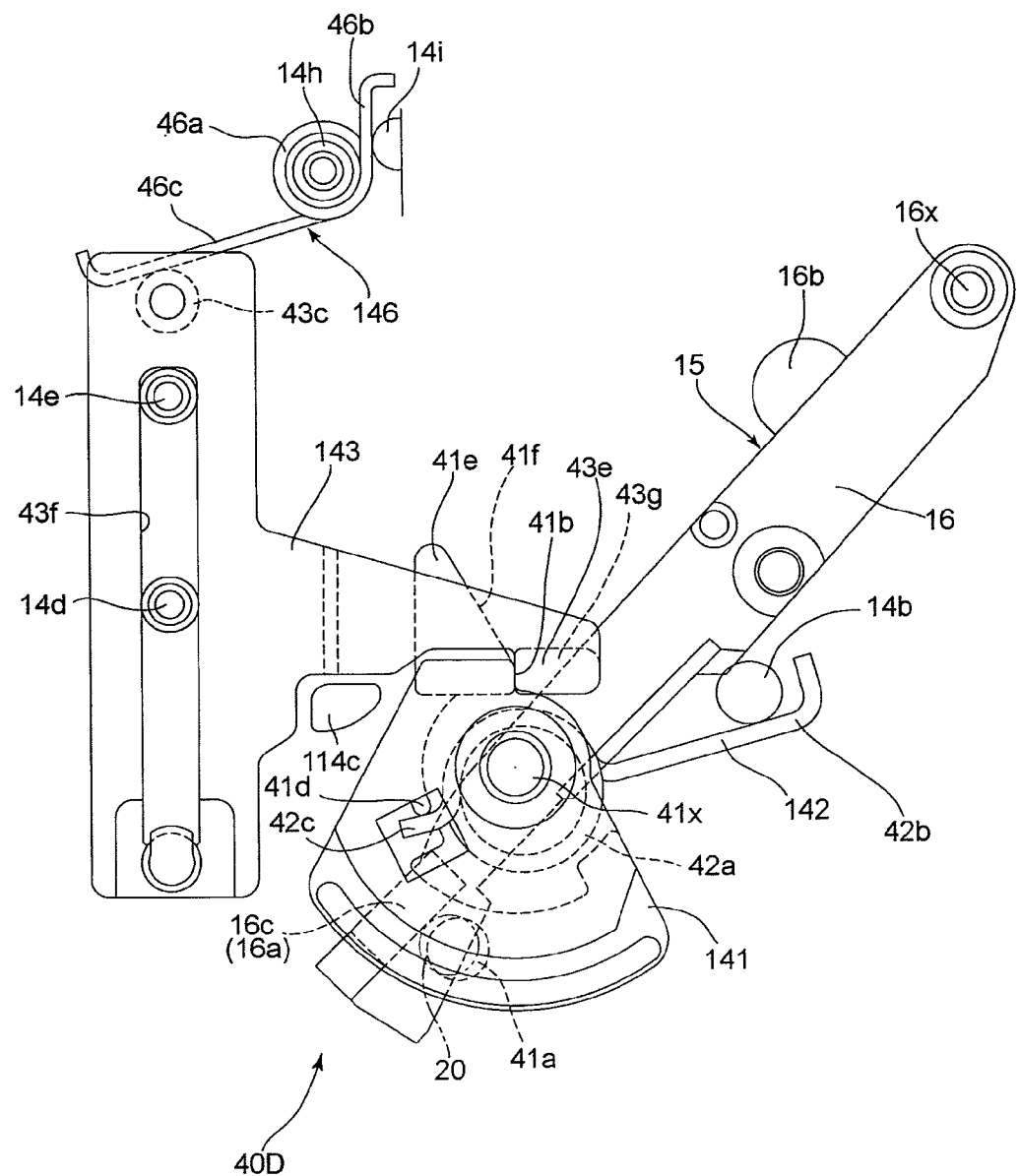
FIG. 28 is a side elevational view of a fourth embodiment of the mirror shock-absorbing mechanism in the mirror-down state.
Figure 29:
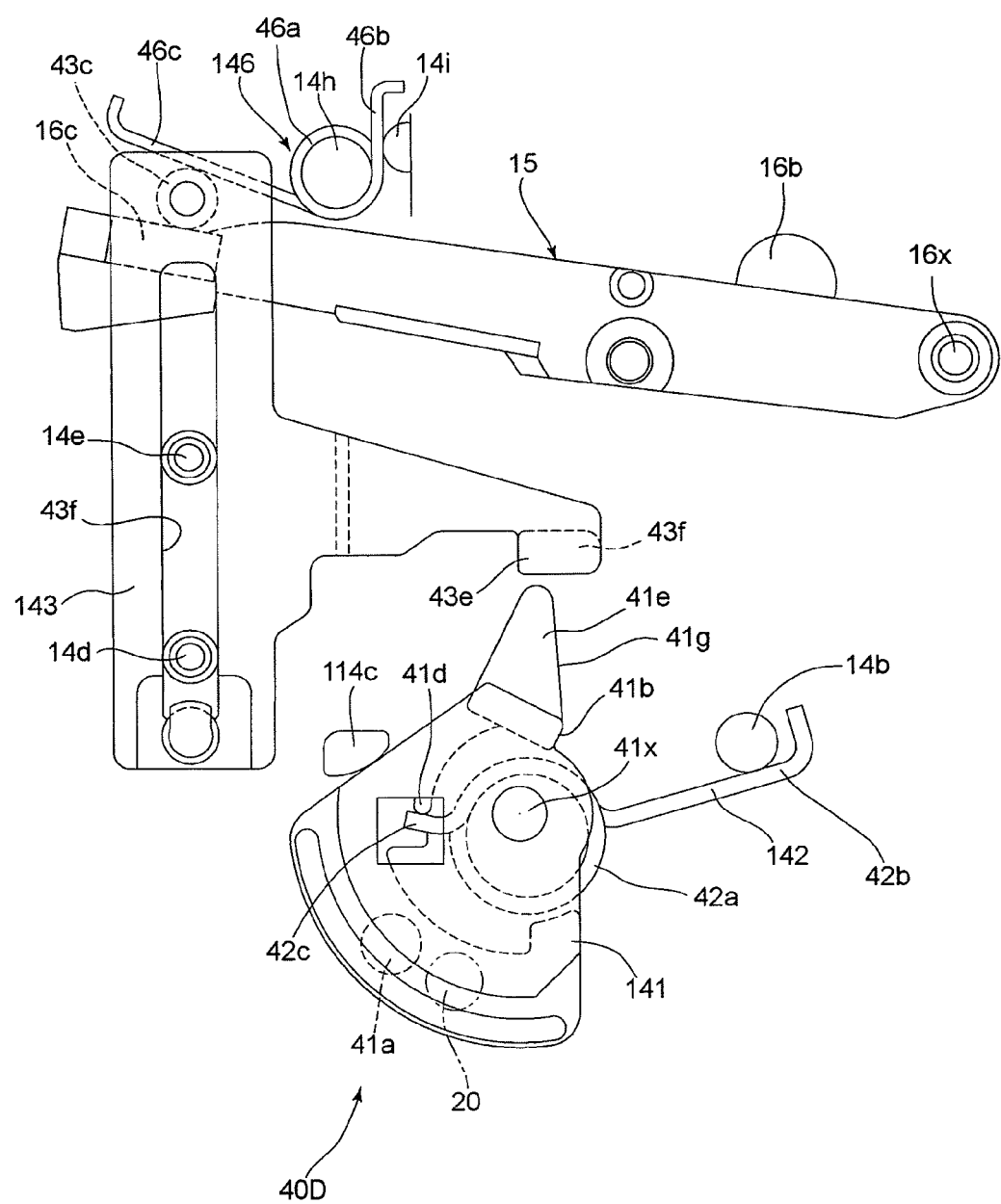
FIG. 29 is a side elevational view of the fourth embodiment of the mirror shock-absorbing mechanism in the mirror-up state.
Figure 30:
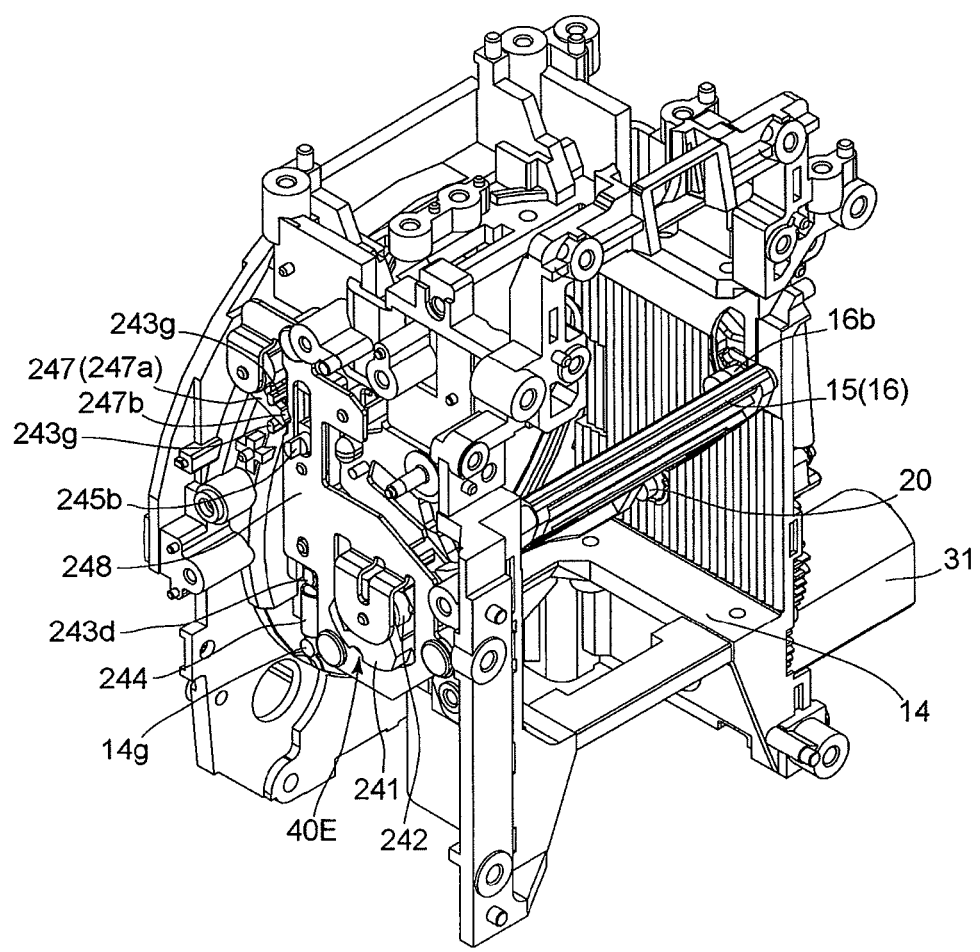
FIG. 30 is a rear perspective view of the mirror box unit in the mirror-down state which is equipped with a fifth embodiment of the mirror shock-absorbing mechanism.
Figure 31:
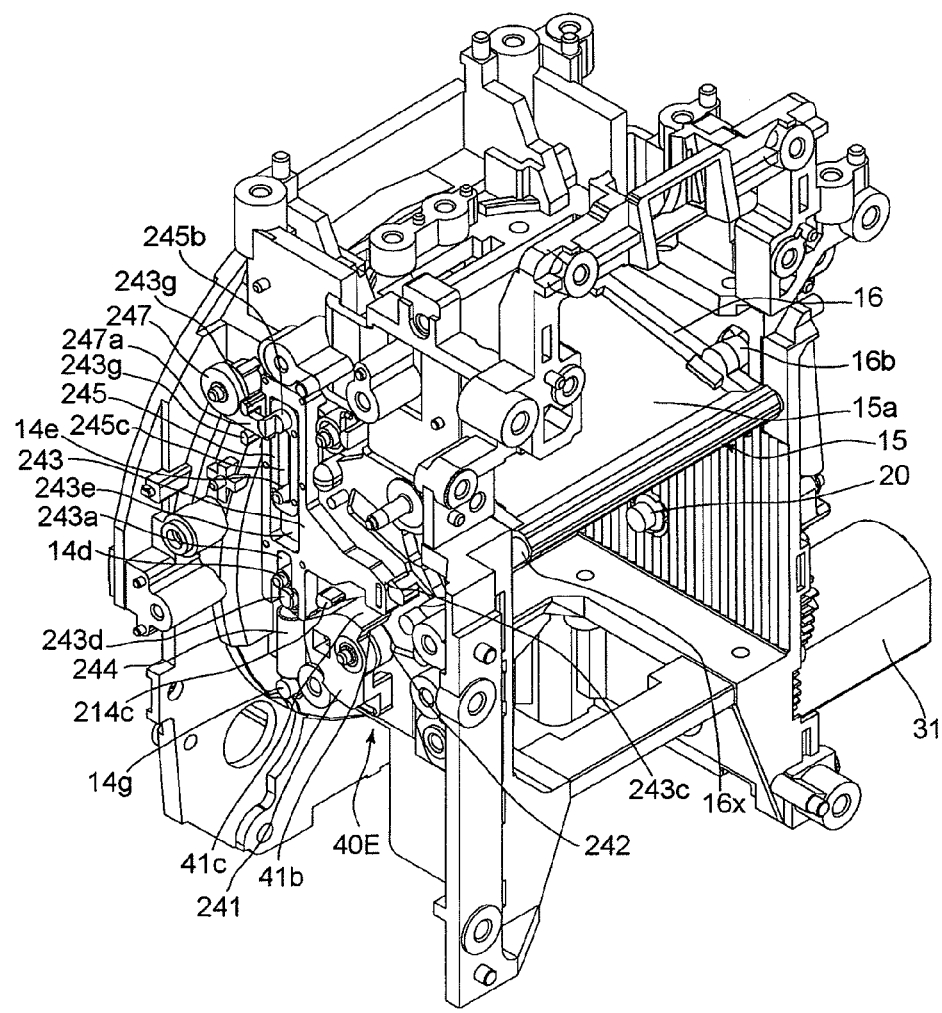
FIG. 31 is a rear perspective view of the mirror box unit in the mirror-up state which is equipped with the fifth embodiment of the mirror shock-absorbing mechanism.
Figure 32:
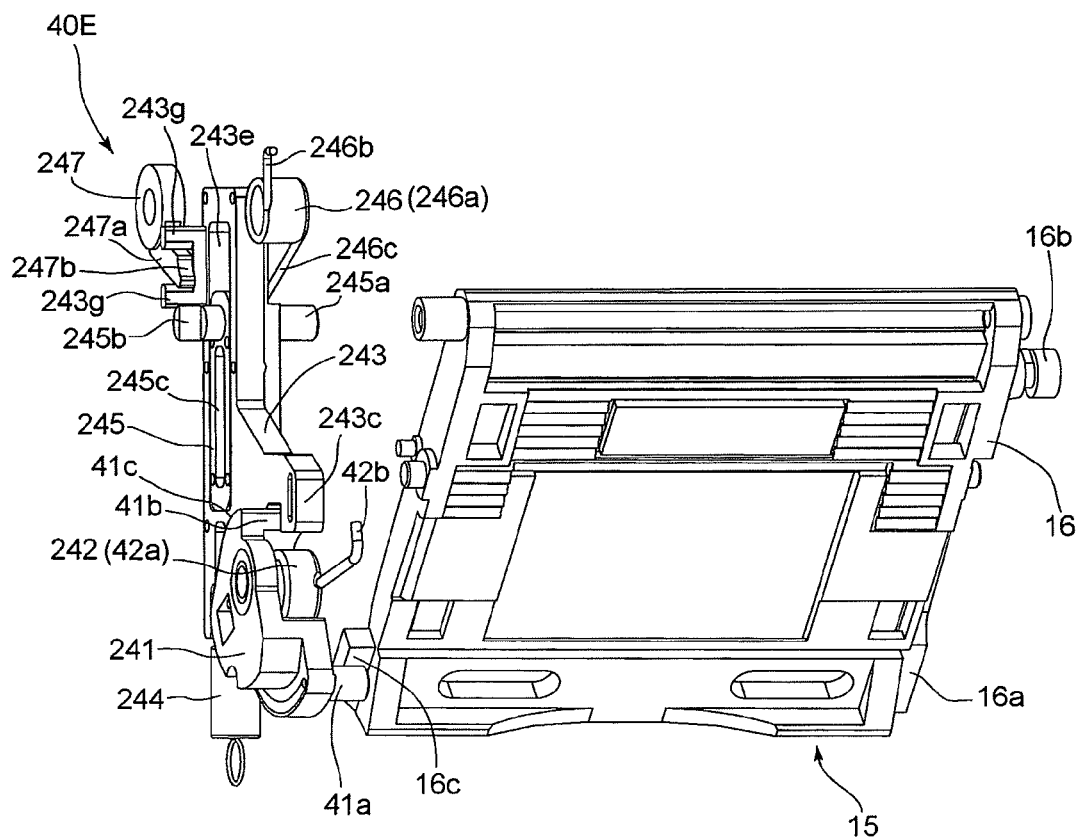
FIG. 32 is a rear perspective view of the fifth embodiment of the mirror shock-absorbing mechanism, showing a state where the contact portion of the mirror seat is in contact with the shock-absorbing pin of the mirror-down shock-absorbing lever.
Figure 33:
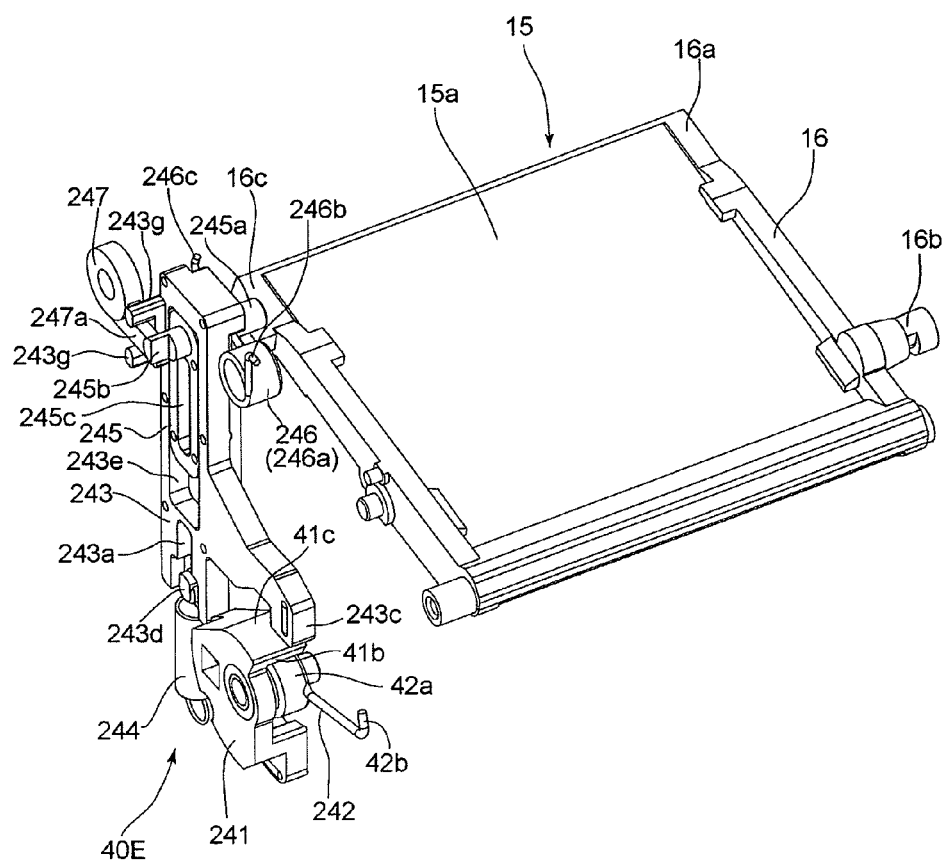
FIG. 33 is a rear perspective view of the fifth embodiment of the mirror shock-absorbing mechanism, showing a state where the contact portion of the mirror seat is in contact with the shock-absorbing pin of the mirror-up shock-absorbing lever.
Figure 34:
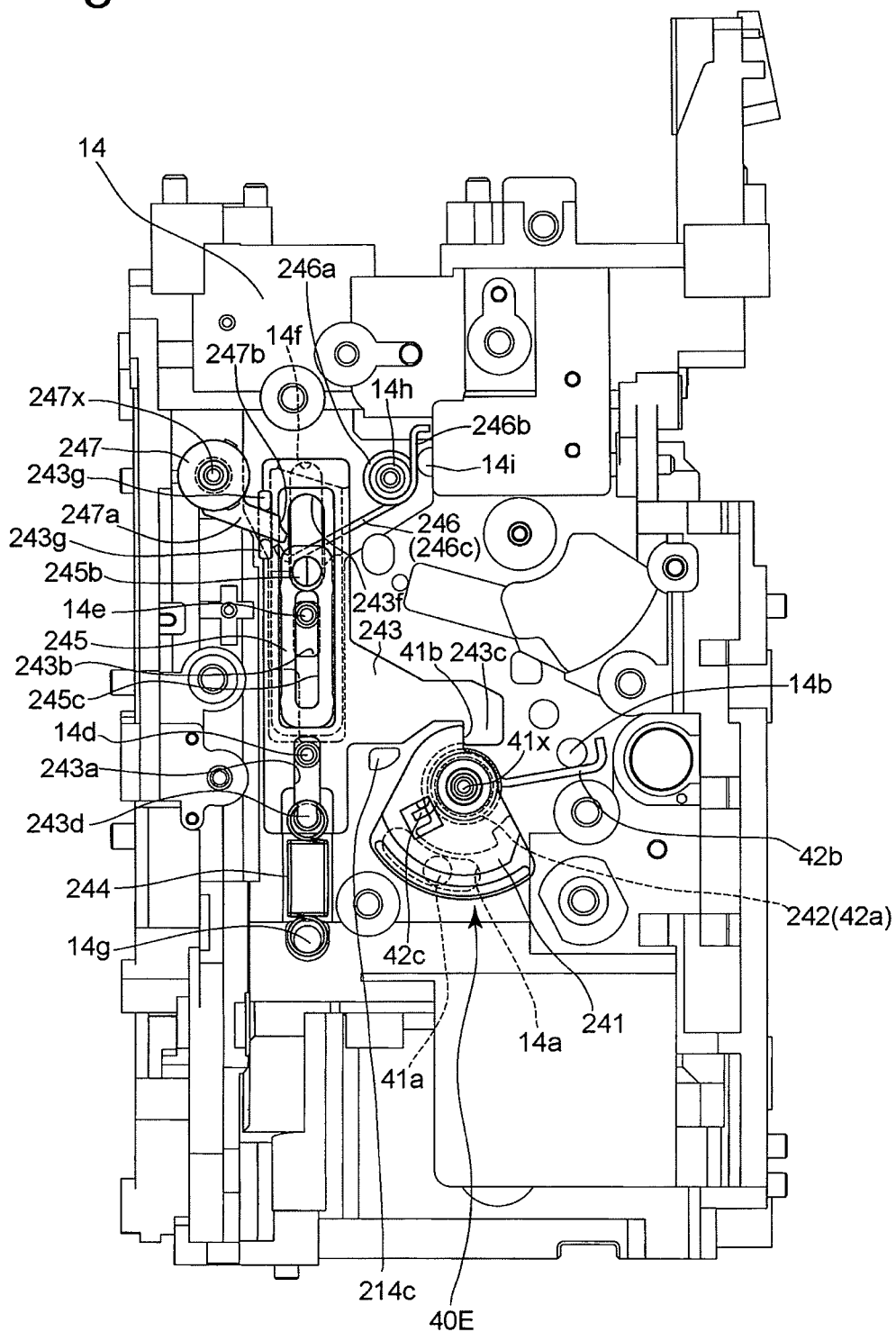
FIG. 34 is a left side elevational view of the mirror box unit shown in FIGS. 30 and 31 with the retaining plate removed to expose the fifth embodiment of the mirror shock-absorbing mechanism.

A fourth embodiment of the mirror shock-absorbing mechanism 40D will be hereinafter discussed with reference to FIGS. 28 and 29. In the mirror shock-absorbing mechanism 40D, the mirror-up shock-absorbing spring 144 in the third embodiment of the mirror shock-absorbing mechanism 40C is replaced by a mirror-up shock-absorbing spring 146 which is configured from a torsion spring, similar to the mirror-up shock-absorbing spring 46 of the second embodiment of the mirror shock-absorbing mechanism 40B, that is used as a member (second biaser) which biases the mirror-up shock-absorbing lever 143 toward the shock-absorbing standby position. Although the detailed description of the mirror-up shock-absorbing spring 146 will be omitted since the detailed description of the mirror-up shock-absorbing spring 146 is identical to that of the mirror-up shock-absorbing spring 46, the mirror-up shock-absorbing spring 146 biases the mirror-up shock-absorbing lever 143 downward, and with this biasing force the mirror-up shock-absorbing lever 143 is held in the shock-absorbing standby position, in which the upper end of the guide hole 43f is engaged with the guide pin 14e, in the mirror-down state shown in FIG. 28. When the movable mirror 15 rotates to the mirror-up position as shown in FIG. 29, this rotation of the movable mirror 15 causes the mirror-up shock-absorbing lever 143 to move upward from the shock-absorbing standby position against the biasing force of the mirror-up shock-absorbing spring 146, and thereupon, the mirror-up shock-absorbing lever 143 absorbs shock of the movable mirror 15 and releases the prevention of rotation of the mirror-down shock-absorbing lever 141.

Although the third embodiment of the mirror shock-absorbing mechanism 40C and the fourth embodiment of the mirror shock-absorbing mechanism 40D have each been illustrated as a mechanism for limiting the range of movement of the mirror-up shock-absorbing lever 143 by the mirror-down shock-absorbing lever 141 when the movable mirror 15 is in the mirror-up position, the third embodiment of the mirror shock-absorbing mechanism 40C and the fourth embodiment of the mirror shock-absorbing mechanism 40D can also each be constructed as a mechanism for limiting the range of movement of a mirror-down shock-absorbing member (mirror-advancing shock-absorbing member) by a mirror-up shock-absorbing member (mirror-retracting shock-absorbing member) when the movable mirror 15 is in the mirror-down position (viewfinder light-guiding position) if the above descriptions of the mirror shock-absorbing mechanism 40C and the second embodiment of the mirror shock-absorbing mechanism 40D are read with the terms "the mirror-up position" and "the mirror-down position" reversed.

A fifth embodiment of the mirror shock-absorbing mechanism 40E will be hereinafter discussed with reference to FIGS. 30 through 40. Elements of the fifth embodiment of the mirror shock-absorbing mechanism which are the same as those of each of the above described embodiments of the mirror shock-absorbing mechanisms are designated by the same reference numerals and the detailed description of the same elements will be omitted. The mirror shock-absorbing mechanism 40E is provided with a mirror-down shock-absorbing lever (holder/mirror-advancing shock-absorbing member/third shock-absorbing member) 241, a mirror-down shock-absorbing spring (rotational biaser) 242, a release lever (second mirror-retracting shock-absorbing member/second shock-absorbing member) 243, a release spring (biaser/second spring) 244, a mirror-up shock-absorbing slider (first mirror-retracting shock-absorbing member/first shock-absorbing member) 245, a mirror-up shock-absorbing spring (biaser/first spring) 246 and a lock lever (holder/interlocking lock member) 247. Each of these members is held so as not to come off the mirror box 14 by a retaining plate 248 (see FIG. 30) that is fixed to a side of the mirror box 14.

The mirror-down shock-absorbing lever 241 and the mirror-down shock-absorbing spring 242 correspond to the mirror-down shock-absorbing lever 41 and the mirror-down shock-absorbing spring 42, respectively, of each of the first and second embodiments of the mirror shock absorbing mechanisms 40A and 40B. The mirror-down shock-absorbing spring 242 that is configured from a torsion spring biases and rotates the mirror-down shock-absorbing lever 241 in the clockwise direction with respect to FIGS. 34 through 40, and the rotational limit of the mirror-down shock-absorbing lever 241 in the biasing direction of the mirror-down shock-absorbing spring 242 is defined by the engagement of the mirror-down shock-absorbing lever 241 with a rotational limit projection 214c which projects from the mirror box 14. The rotational limit projection 214c has the same function as each of the rotational limit projections 14c and 114c of the first through fourth embodiments of the mirror shock-absorbing mechanisms, and the rotational limit of the mirror-down shock-absorbing lever 241, in which the mirror-down shock-absorbing lever 241 is engaged with the rotational limit projection 214c, is a shock-absorbing standby position of the mirror-down shock-absorbing lever 241 (movement limit position at which movement of the release lever 243 in the biasing direction of the release spring 244 is limited).

The release lever 243 is provided with a guide hole 243a and a guide hole (locking portion) 243b into which the upper guide pin 14d and the lower guide pin (fixed member) 14e that are formed on a side of the mirror box 14 to project therefrom are inserted, respectively. The release lever 243 is supported and guided linearly in the vertical direction by the engagement of the guide pins 14d and 14e with the guide holes 243a and 243b, respectively. This linear moving direction of the release lever 243 is set in a plane substantially orthogonal to the axis of the shaft 41x of the mirror-down shock-absorbing lever 241. In other words, the mirror-down shock-absorbing lever 241 and the release lever 243 are supported to be rotatable and movable along mutually parallel planes, respectively. The release lever 243 is provided on a side thereof with a rotation-restricting arm (rotation-restricting portion) 243c which projects rearwardly. The rotation-restricting arm 243c projects in a direction substantially orthogonal to the vertical direction, i.e., the moving direction of the release lever 243, and a portion of the rotation-restricting arm 243c in the vicinity of the rear end (right end with respect to FIG. 34) thereof is bent downward to be shaped into a hook. The release lever 243 is provided in the vicinity of the lower end thereof with a spring hook 243d.

The release spring 244 is configured from an extension spring. The release spring 244 is hooked at one end and the other end thereof onto the spring hook 243d, which is formed on the release lever 243, and the spring hook 14g, which is formed on a side of the mirror box 14, respectively, to bias the release lever 243 downward. The engagement of the upper end (locking portion) of the guide hole 243b with the guide pin 14e prevents the release lever 243 from moving further downward in the biasing direction (downward direction) of the release spring 244. This movement limit of the release lever 243 in the biasing direction of the release spring 244 (in the downward direction) will be hereinafter referred to as "rotational limit position." When the release lever 243 is in the rotational limit position, the rotation-restricting arm 243c has moved into the path of rotational movement of the rotationally restricted surface 41b of the mirror-down shock-absorbing lever 241 about the shaft 41x to prevent the mirror-down shock-absorbing lever 241 from rotating in the biasing direction of the mirror-down shock-absorbing spring 242 by engagement of a side of the rotation-restricting arm 243c with the rotationally restricted surface 41b (see FIGS. 35 through 37). More specifically, it is possible for the rotationally restricted surface 41b of the mirror-down shock-absorbing lever 241 and a side of the rotation-restricting arm 243c of the release lever 243 to face each other and to come in contact with each other only when the release lever 243 is in the rotational limit position and when the mirror-down shock-absorbing lever 241 is in the overrun range (see FIGS. 35, 36, 37 and 40), in which the shock-absorbing pin 41a is disengaged from the shock-absorbing contact portion 16c of the mirror seat 16 in the mirror-down state. Accordingly, when the mirror-down shock-absorbing lever 241 is prevented from rotating by the engagement of the rotationally restricted surface 41b with the rotation-restricting arm 243c of the release lever 243, the mirror-down shock-absorbing lever 241 is held at a position in the overrun range, in which the shock-absorbing pin 41a is disengaged from the shock-absorbing contact portion 16c of the mirror seat 16. On the other hand, in a state (shown in FIG. 38) where the end of the rotation-restricting arm 243c is positioned out of the path of rotational movement of the rotationally restricted surface 41b, the holding of the mirror-down shock-absorbing lever 241 in the overrun range is released, which enables the mirror-down shock-absorbing lever 241 to rotate by the mirror-down shock-absorbing spring 242 in the biasing direction thereof (toward the shock-absorbing standby position of the mirror-down shock-absorbing lever 241). In addition, in a state (shown in FIG. 39) where the end of the rotation-restricting arm 243c abuts on the rotation allowance surface 41c, the mirror-down shock-absorbing lever 241 is allowed to rotate with the rotation allowance surface 41c in slidable contact with the rotation-restricting arm 243c.

The release lever 243 is provided with a support guide hole 243e which is formed as an elongated through-hole, the lengthwise direction of which is substantially parallel to the moving direction of the release lever 243. The mirror-up shock-absorbing slider 245 is positioned in the support guide hole 243e and supported by the release lever 243 therein to be slidably movable in the lengthwise direction of the support guide hole 243e. The mirror-up shock-absorbing slider 245 is provided with a shock-absorbing pin 245a which projects into the mirror box 14. The release lever 243 is provided with a through-hole 243f (see FIGS. 34 through 40) which is formed at a position that overlaps the through-hole 14f of the mirror box 14 and is elongated in the vertical direction. The through-hole 243f is communicatively connected to the support guide hole 243e, and the shock-absorbing pin 245a of the mirror-up shock-absorbing slider 245 that is supported by the support guide hole 243e is inserted into the through-holes 243f and 14f to project into the mirror box 14 (see FIGS. 2 through 4). The shock-absorbing pin 245a is positioned in the path of movement of the shock-absorbing contact portion 16c of the mirror seat 16 (i.e., in the path of rotational movement of the movable mirror 15 about the pair of mirror seat hinges 16x) to be contactable with an upper surface of the shock-absorbing contact portion 16c. The mirror-up shock-absorbing slider 245 is further provided with a lock pin (restricted portion) 245b which projects in a direction opposite to the direction of projection of the shock-absorbing pin 245a. The shock-absorbing pin 245a and the lock pin 245b are substantially coaxial with each other, and the shock-absorbing pin 245a is positioned behind the lock pin 245b so that the lock pin 245b is seen on top of the shock-absorbing pin 245a in FIGS. 34 through 40. The mirror-up shock-absorbing slider 245 is further provided below the shock-absorbing pin 245a and the lock pin 245b with a guide hole 245c which is formed as an elongated through-hole, the lengthwise direction of which is substantially parallel to the support guide hole 243e of the release lever 243 (i.e., substantially parallel to the moving direction of each of the release lever 243 and the mirror-up shock-absorbing slider 245). The guide pin 14e that passes through the guide hole 243b of the release lever 243 is inserted into the guide hole 245c, and the mirror-up shock-absorbing slider 245 is guided by the guide hole 245c and the guide pin 14e when the mirror-up shock-absorbing slider 245 moves.

The mirror-up shock-absorbing spring 246 is a torsion spring which is provided with a coil portion 246a, a spring arm portion 246b and a spring arm portion 246c. The coil portion 246a surrounds a support projection 14h (see FIG. 34) formed on a side of the mirror box 14, the spring arm portion 246b is engaged with a spring hook 14i formed on a side of the mirror box 14, and the spring arm portion 246c is engaged with the base of the shock-absorbing pin 245a of the mirror-up shock-absorbing slider 245. The mirror-up shock-absorbing spring 246 biases the mirror-up shock-absorbing slider 245 downward with respect to FIGS. 34 through 40. This biasing direction of the mirror-up shock-absorbing slider 245 by the mirror-up shock-absorbing spring 246 is a direction which brings the shock-absorbing pin 245a close to (to bring into contact with) the shock-absorbing contact portion 16c of the mirror seat 16, and the engagement of the mirror-up shock-absorbing slider 245 with the lower end of the support guide hole 243e prevents the mirror-up shock-absorbing slider 245 from moving in the biasing direction of the mirror-up shock-absorbing spring 246. More specifically, the mirror-up shock-absorbing slider 245 is prevented from moving further downward (moving in the biasing direction of the mirror-up shock-absorbing spring 246) by engagement with the lower end of the support guide hole 243e when the release lever 243 is in the aforementioned rotational limit position. This movement limit of the mirror-up shock-absorbing slider 245 in the downward direction will be hereinafter referred to as "shock-absorbing standby position."

The lock lever 247 is pivoted on a shaft 247x which projects from a side of the mirror box 14 and is substantially parallel to the shaft 41x of the mirror-down shock-absorbing lever 241. The lock lever 247 is provided with a linking arm (radial projection) 247a which projects in a radial outward direction of the shaft 247x, and the linking arm 247a is held by an arm holding portion 243g formed on the release lever 243. The arm holding portion 243g includes a pair of projections that are spaced from each other in the advancing/retracting direction of the release lever 243 (the vertical direction with respect to FIGS. 35 through 40). The linking arm 247a is inserted between the aforementioned pair of projections, so that upward and downward movements of the release lever 243 cause the lock lever 247 to rotate forward and reverse. The lock lever 247 is provided at the end of the linking arm 247a with a holding recess 247b which is recessed and has a shape corresponding to the shape of an outer peripheral surface of the lock pin 245b of the mirror-up shock-absorbing slider 245. When the release lever 243 is in the aforementioned rotational limit position, the lock lever 247 is held in an unlock position (shown in FIGS. 35 through 37 and 40) in which the linking arm 247a (the holding recess 247b) is retracted from the path of movement of the lock pin 245b. When the release lever 243 is moved upward from the rotational limit position, this upward movement of the release lever 243 causes the lock lever 247 to rotate to a lock position (shown in FIGS. 38 and 39) in which the linking arm 247a (the holding recess 247b) is positioned in the path of movement of the lock pin 245b. The distance between the pair of projections that comprise the arm holding portion 243g is slightly greater than the width of the linking arm 247a so that the arm holding portion 243g does not interfere with smooth rotation of the lock lever 247.

Figure 35:
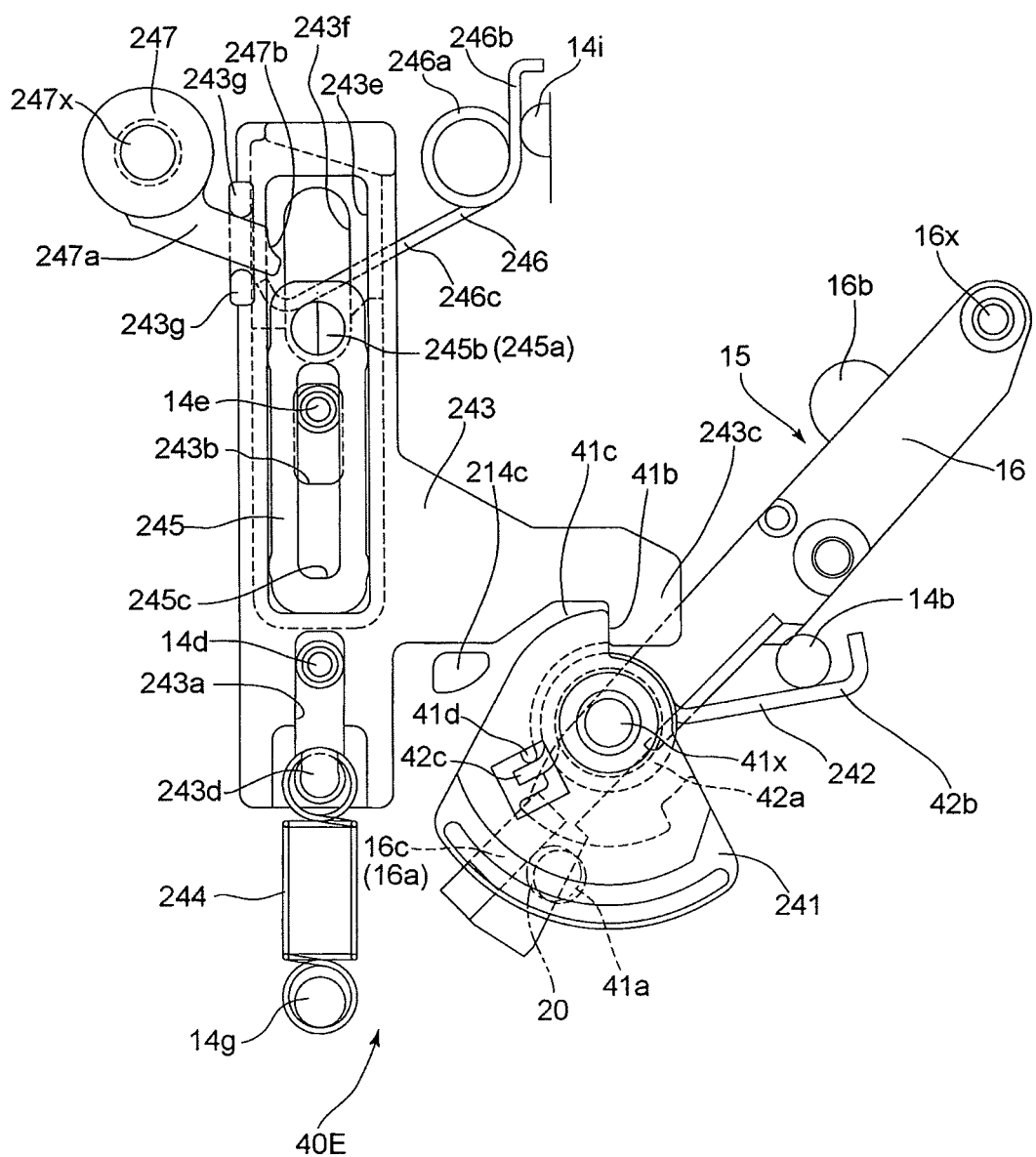
FIG. 35 is a side elevational view of the fifth embodiment of the mirror shock-absorbing mechanism in the mirror-down state.

Operations of the mirror shock-absorbing mechanism 40E will be hereinafter discussed with reference to FIGS. 35 through 40. FIG. 35 shows a state where the movable mirror 15 is in the mirror-down position. The release lever 243 is held in the rotational limit position by the biasing force of the release spring 244, and prevents the mirror-down shock-absorbing lever 241 from rotating in the biasing direction of the mirror-down shock-absorbing spring 242 (i.e., in the clockwise direction with respect to FIGS. 35 through 40) by bringing the rotation-restricting arm 243c into contact with the rotationally restricted surface 41b. At this stage, the mirror-down shock-absorbing lever 241 is in the overrun position, in which the shock-absorbing pin 41a is disengaged from the shock-absorbing contact portion 16c of the mirror seat 16 in a mirror-down direction (counterclockwise direction with respect to FIG. 35). The mirror-up shock-absorbing slider 245 is held in the shock-absorbing standby position, in which a lower end surface of the mirror-up shock-absorbing slider 245 is engaged with the lower end of the support guide hole 243e, by the biasing force of the mirror-up shock-absorbing spring 246. In addition, the lock lever 247 is held in the unlock position, in which the holding recess 247b is retracted from the path of movement of the lock pin 245b.

Figure 36:
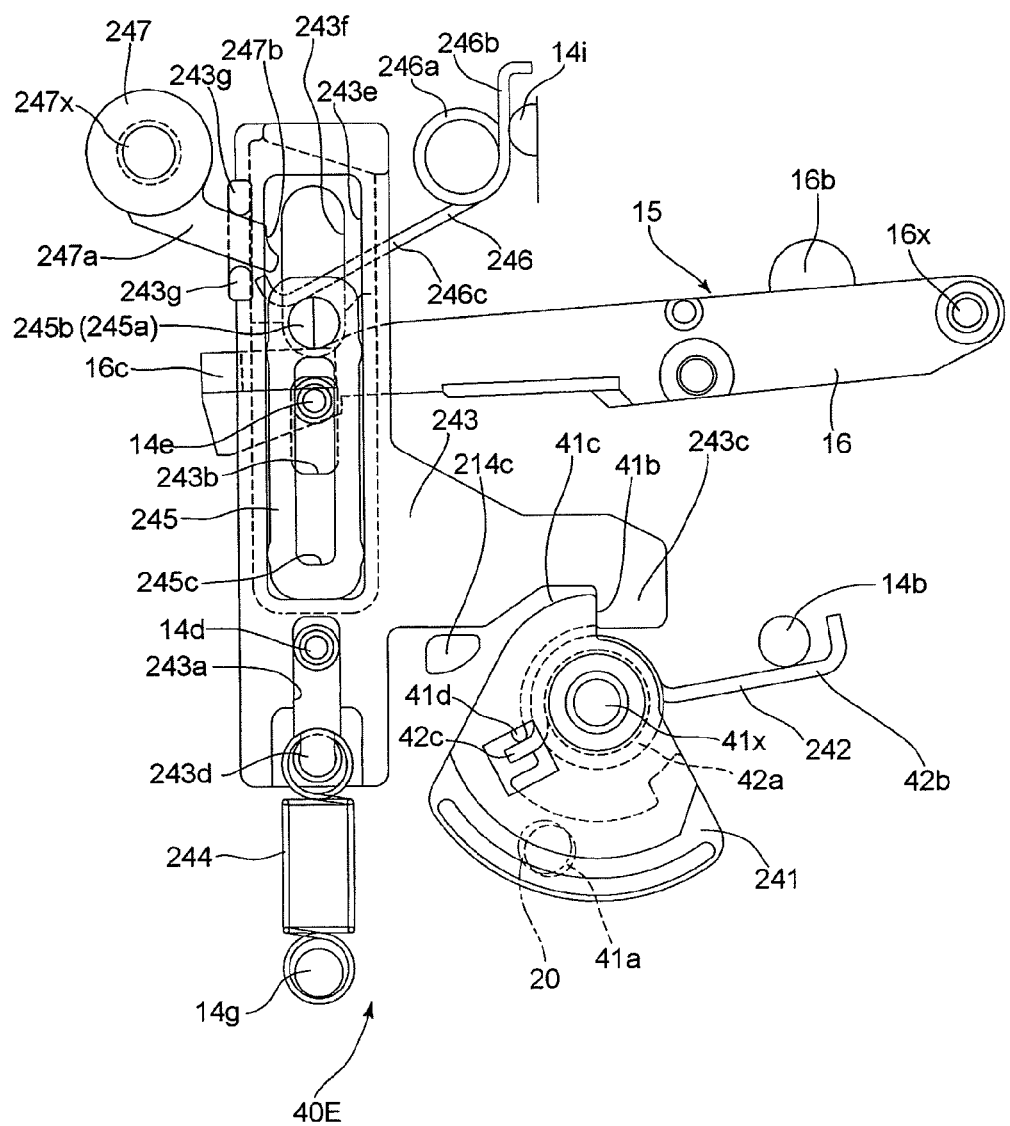
FIG. 36 is a side elevational view of the fifth embodiment of the mirror shock-absorbing mechanism in a state where the movable mirror is in the process of rotating to the mirror-up position from the mirror-down position.
Figure 37:
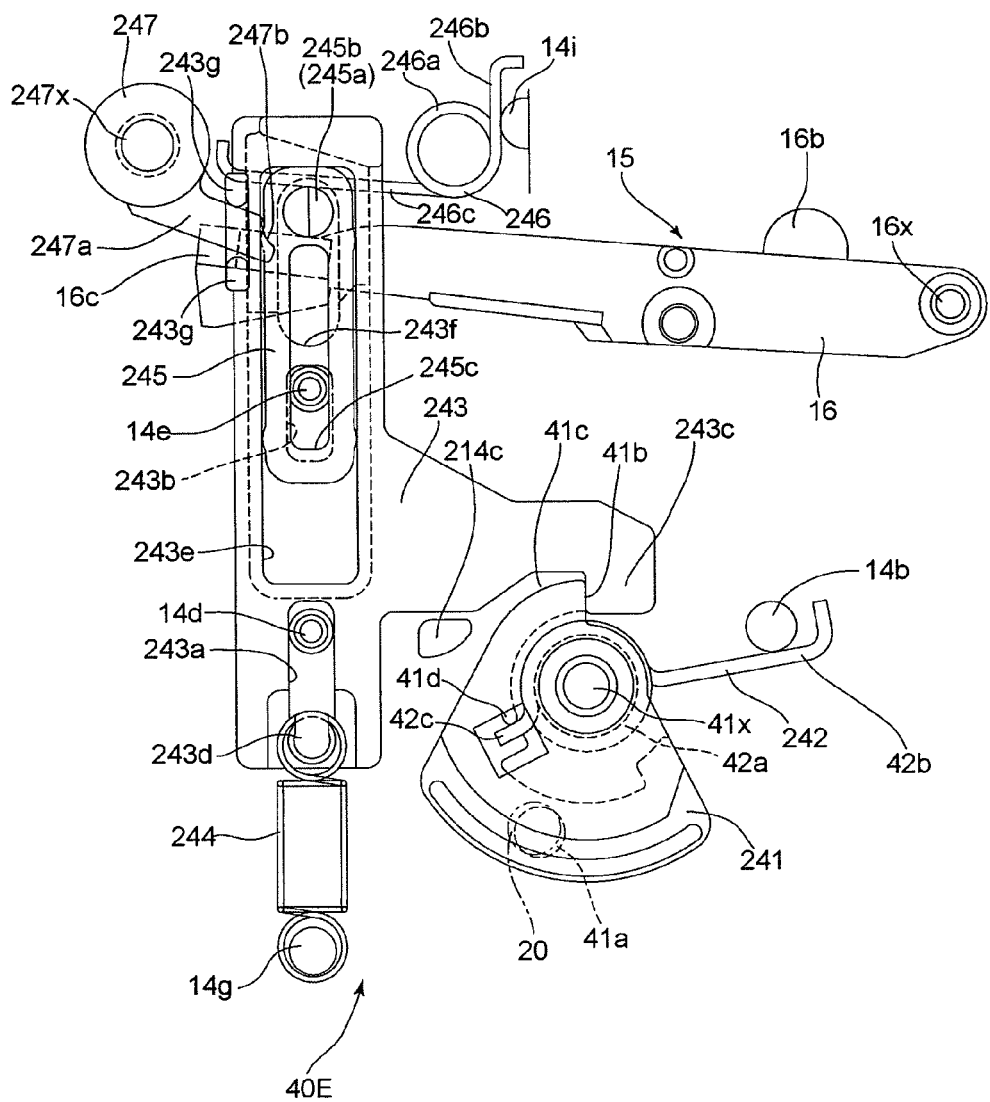
FIG. 37 is a side elevational view of the fifth embodiment of the mirror shock-absorbing mechanism in a state where the movable mirror is in the process of rotating to the mirror-up position from the mirror-down position.
Figure 38:
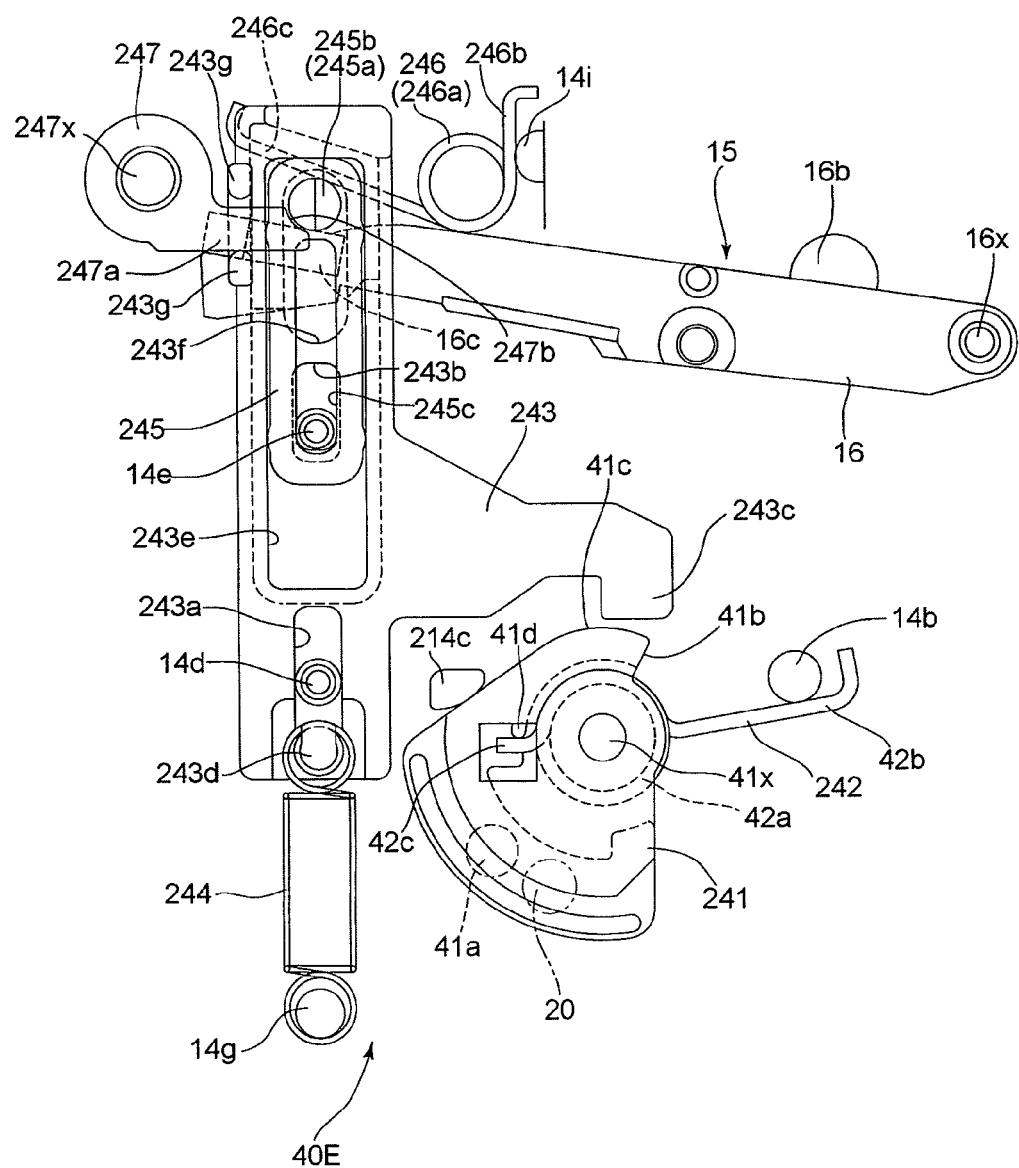
FIG. 38 is a side elevational view of the fifth embodiment of the mirror shock-absorbing mechanism in the mirror-up state.

When the movable mirror 15 is rotated from the mirror-down position toward the mirror-up position, this rotation of the movable mirror 15 causes an upper surface of the shock-absorbing contact portion 16c of the mirror seat 16 to come into contact with the shock-absorbing pin 245a of the mirror-up shock-absorbing slider 245 as shown in FIG. 36. From this state, a further rotation of the movable mirror 15 toward the mirror-up position causes the shock-absorbing contact portion 16c of the mirror seat 16 to lift the shock-absorbing pin 245a to press and move the mirror-up shock-absorbing slider 245 upward from the shock-absorbing standby position against the biasing force of the mirror-up shock-absorbing spring 246. At an initial stage of this upward movement of the mirror-up shock-absorbing slider 245, the mirror-up shock-absorbing slider 245 slidingly moves in the support guide hole 243e while the release lever 243 is not moved. Namely, the mirror-up shock-absorbing slider 245 moves solely (independently) while the release lever 243 remains in the rotational limit position, in which the release lever 243 prevents the mirror-down shock-absorbing lever 241 from rotating. Subsequently, upon the mirror shock-absorbing mechanism 40E entering the state shown in FIG. 37, in which the upper end surface of the mirror-up shock-absorbing slider 245 comes in contact with the upper end of the support guide hole 243e, the pressing and moving force by the movable mirror 15 also starts acting on the release lever 243, which causes the release lever 243 and the mirror-up shock-absorbing slider 245 to integrally move upward. At this stage, in addition to the biasing force of the mirror-up shock-absorbing spring 246, the biasing force of the release spring 244 also acts on the movable mirror 15, so that the movable mirror 15 rotates toward the mirror-up position while receiving loads from the release spring 244 and the mirror-up shock-absorbing spring 246. When the release lever 243 moves upward from the rotational limit position, this upward movement of the release lever 243 causes the rotation-restricting arm 243c of the release lever 243 to retract upward from the path of rotational movement of the rotationally restricted surface 41b of the mirror-down shock-absorbing lever 241. This releases the prevention of rotation of the mirror-down shock-absorbing lever 241, so that the mirror-down shock-absorbing lever 241 rotates to the shock-absorbing standby position, in which the mirror-down shock-absorbing lever 241 contacts the rotational limit projection 214c by the biasing force of the mirror-down shock-absorbing spring 242, as shown in FIG. 38. When the mirror-down shock-absorbing lever 241 is in the shock-absorbing standby position, the shock-absorbing pin 41a is positioned above the mirror-down position defining pin 20, namely, at a position advanced in a mirror-up direction (clockwise direction with respect to FIG. 38) of the movable mirror 15.

FIG. 38 shows a state where the release lever 243 and the mirror-up shock-absorbing slider 245 have been lifted upward by the movable mirror 15 rotated to the mirror-up position. As described above, from the state shown in FIG. 36, in which the shock-absorbing contact portion 16c of the mirror seat 16 commences to contact the shock-absorbing pin 245a, to the state shown in FIG. 37, in which the mirror-up shock-absorbing slider 245 comes in contact with the upper end of the support guide hole 243e, the movable mirror 15 presses and moves the mirror-up shock-absorbing slider 245 against the biasing force of the mirror-up shock-absorbing spring 246. From the state shown in FIG. 37 until the mirror-up completion state shown in FIG. 38, the movable mirror 15 presses and integrally moves the release lever 243 and the mirror-up shock-absorbing slider 245 against the biasing forces of the release spring 244 and the mirror-up shock-absorbing spring 246. Namely, as the movable mirror 15 approaches the mirror-up position, the spring loads of the release spring 244 and the mirror-up shock-absorbing spring 246 are exerted on rotation of the movable mirror 15, and the movable mirror 15 reaches the mirror-up position while being shock-absorbed (cushioned) by the mirror-up shock-absorbing slider 245, the mirror-up shock-absorbing spring 246, the release lever 243 and the release spring 244. This suppresses the occurrence of bouncing (vibrations) of the movable mirror 15 when the movable mirror 15 rotates from the mirror-down position to the mirror-up position. When the movable mirror 15 is in the mirror-up position, the engagement of an upper surface of the mirror seat 16 with the upper stopper 21 prevents the movable mirror 15 from moving further upward (see FIG. 1). Additionally, in the state shown in FIG. 38, the mirror-up shock-absorbing slider 245 is prevented from moving further upward by engagement of the lower end of the guide hole 245c with the guide pin 14e. The movable mirror 15 comes into contact with the upper stopper 21 before the mirror-up shock-absorbing slider 245 reaches this upper movement limit. Namely, similar to the mirror-down shock-absorbing lever 241, ahead of the aforementioned shock-absorbing moving range (in which the shock-absorbing pin 245a is pressed by the shock-absorbing contact portion 16c of the movable mirror 15 (the mirror seat 16)), the mirror-up shock-absorbing slider 245 also has an overrun range in which the shock-absorbing pin 245a is disengaged from the shock-absorbing contact portion 16c of the movable mirror 15 suspended in the mirror-up position by the upper stopper 21. However, the overrun range of the mirror-up shock-absorbing slider 245 is set to be narrower than the overrun range of the mirror-up shock-absorbing lever 241.

Figure 39:
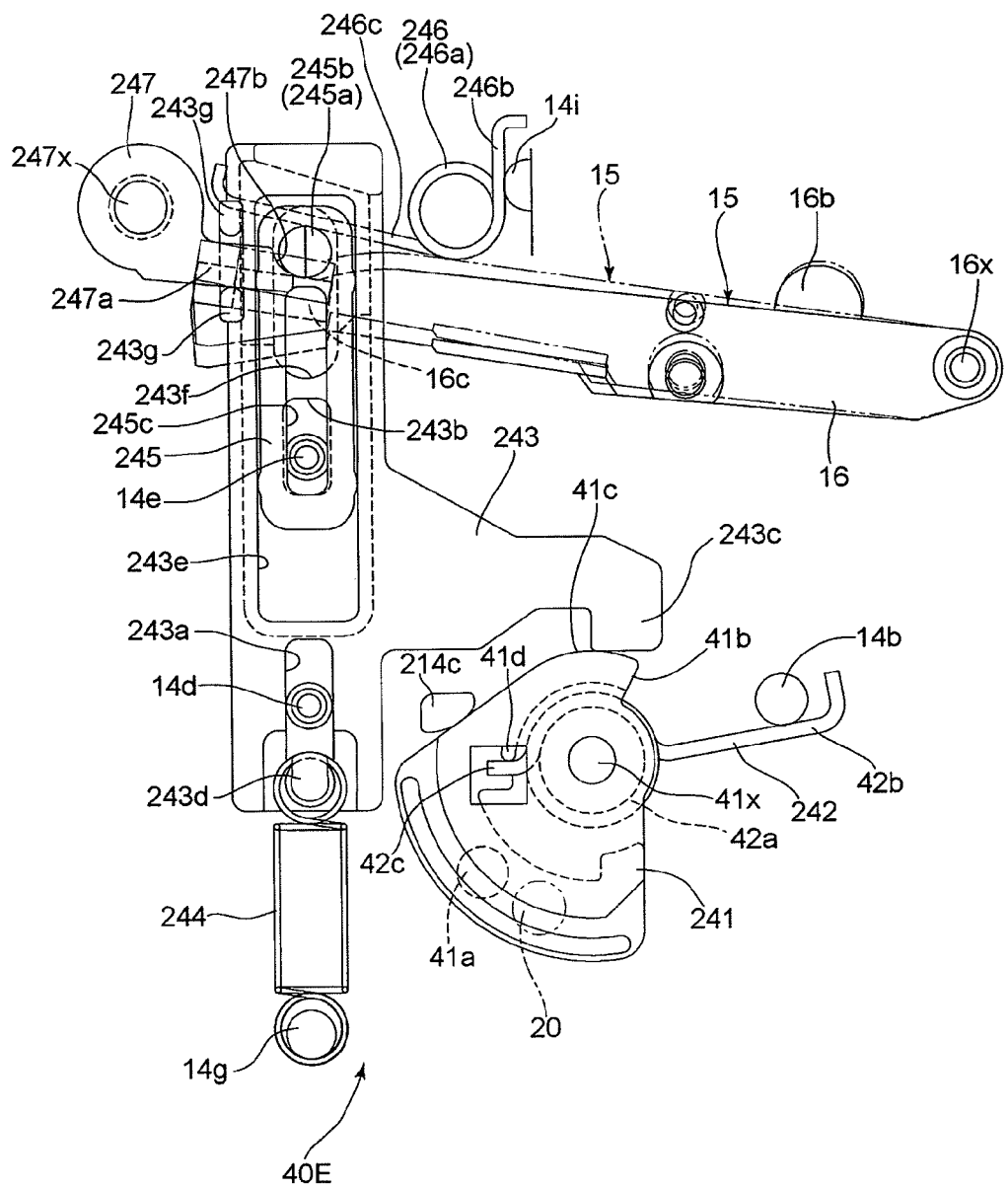
FIG. 39 is a side elevational view of the fifth embodiment of the mirror shock-absorbing mechanism in a state where a release lever is prevented from moving by the mirror-down shock-absorbing lever, and the mirror-up shock-absorbing lever is prevented from moving by the lock lever.

As shown in FIG. 38, when the release lever 243 is moved upward from the rotational limit position in response to rotation of the movable mirror 15 toward the mirror-up position, this upward movement of the release lever 243 causes the arm holding portion 243g of the release lever 243 to lift the linking arm 247a, which causes the lock lever 247 to rotate from the unlock position to the lock position. Thereupon, the linking arm 274a of the lock lever 247 advances to a position immediately below the lock pin 245b of the mirror-up shock-absorbing slider 245 that has been moved upward together with the release lever 243, so that the lock pin 245b is engaged in and supported by the holding recess 247b. At this stage, the rotation allowance surface 41c of the mirror-up shock-absorbing lever 241 rotated to the shock-absorbing standby position is positioned below the rotation-restricting arm 243c of the release lever 243, and the release lever 243 is prevented from moving further downward by engagement of the rotation-restricting arm 243c with the rotation allowance surface 41c, as shown in FIG. 39. In other words, the range of movement of the release lever 243 (at this stage) in the vertical direction is limited only to the range of the clearance between the rotation-restricting arm 243c and the rotation allowance surface 41c. In this limited range of movement of the release lever 243, the linking arm 247a (the holding recess 247b) of the lock lever 247 does not move off the path of movement of the lock pin 245b and therefore the lock lever 247 remains held in the lock position. Accordingly, even if the mirror-up shock-absorbing slider 245 attempts to move downward, i.e., in the biasing direction of the mirror-up shock-absorbing spring 246, the engagement between the lock pin 245b and the holding recess 247b prevents the mirror-up shock-absorbing slider 245 from moving downward. Namely, as the movable mirror 15 approaches the mirror-up position, the range of movement of the release lever 243 and the range of movement of the mirror-up shock-absorbing slider 245 are each limited by the mirror-up shock-absorbing lever 241 and the lock lever 247, so that the repulsive motion of the shock-absorbing pin 245a when bouncing of the movable mirror 15 is absorbed can be reduced to a minimal amount. As a result, bouncing of the movable mirror 15 which is applied via the shock-absorbing pin 245a is reduced within the range between the position of the movable mirror 15 shown by solid lines and the position of the movable mirror 15 shown by two-dot chain lines in FIG. 39.

When the movable mirror 15 rotates from the mirror-up position to the mirror-down position, the biasing forces of the release spring 244 and the mirror-up shock-absorbing spring 246 urge the release lever 243 and the mirror-up shock-absorbing slider 245 to move downward because the lifted state of the release lever 243 and the mirror-up shock-absorbing slider 245 by the shock-absorbing contact portion 16c of the mirror seat 16 of the movable mirror 15 rotated to the mirror-up position is cancelled. A further downward movement of the release lever 243 is stopped partway down by the engagement of the lower end of the rotation-restricting arm 243c with the rotation allowance surface 41c of the mirror-down shock-absorbing lever 241 as shown in FIG. 39. When the release lever 243 is in this position, the lock lever 247 is held in the lock position as described above, so that the mirror-up shock-absorbing slider 245 is prevented from moving downward by the engagement of the holding recess 247b with the lock pin 245b. Subsequently, as the movable mirror 15 approaches the mirror-down position, the shock-absorbing contact portion 16c of the mirror seat 16 comes into contact with the shock-absorbing pin 41a of the mirror-down shock-absorbing lever 241 before the stopper 16a of the mirror seat 16 comes into contact with the mirror-down position defining pin 20. At this stage, the mirror-down shock-absorbing lever 241 is held in the shock-absorbing standby position by the biasing force of the mirror-down shock-absorbing spring 242, and during the rotation of the movable mirror 15 to the mirror-down position, shown in FIG. 40, the shock-absorbing contact portion 16c of the mirror seat 16 depresses the shock-absorbing pin 41a of the mirror-down shock-absorbing lever 241 to rotate the mirror-down shock-absorbing lever 241 counterclockwise from the shock-absorbing standby position, shown in FIGS. 38 and 39, against the biasing force of the mirror-down shock-absorbing spring 242. At this stage, the mirror-down shock-absorbing lever 241 can rotate with the rotation allowance surface 41c in sliding contact with the end of the rotation-restricting arm 243c without being restricted by the release lever 243. Accordingly, during rotation of mirror-down shock-absorbing lever 241 in the shock-absorbing moving range that starts from the shock-absorbing standby position, the spring load of the mirror-down shock-absorbing spring 242 is exerted on rotation of the movable mirror 15, and the movable mirror 15 reaches the mirror-down position while being shock-absorbed (cushioned) by the mirror-down shock-absorbing lever 241 and the mirror-down shock-absorbing spring 242.

Figure 40:
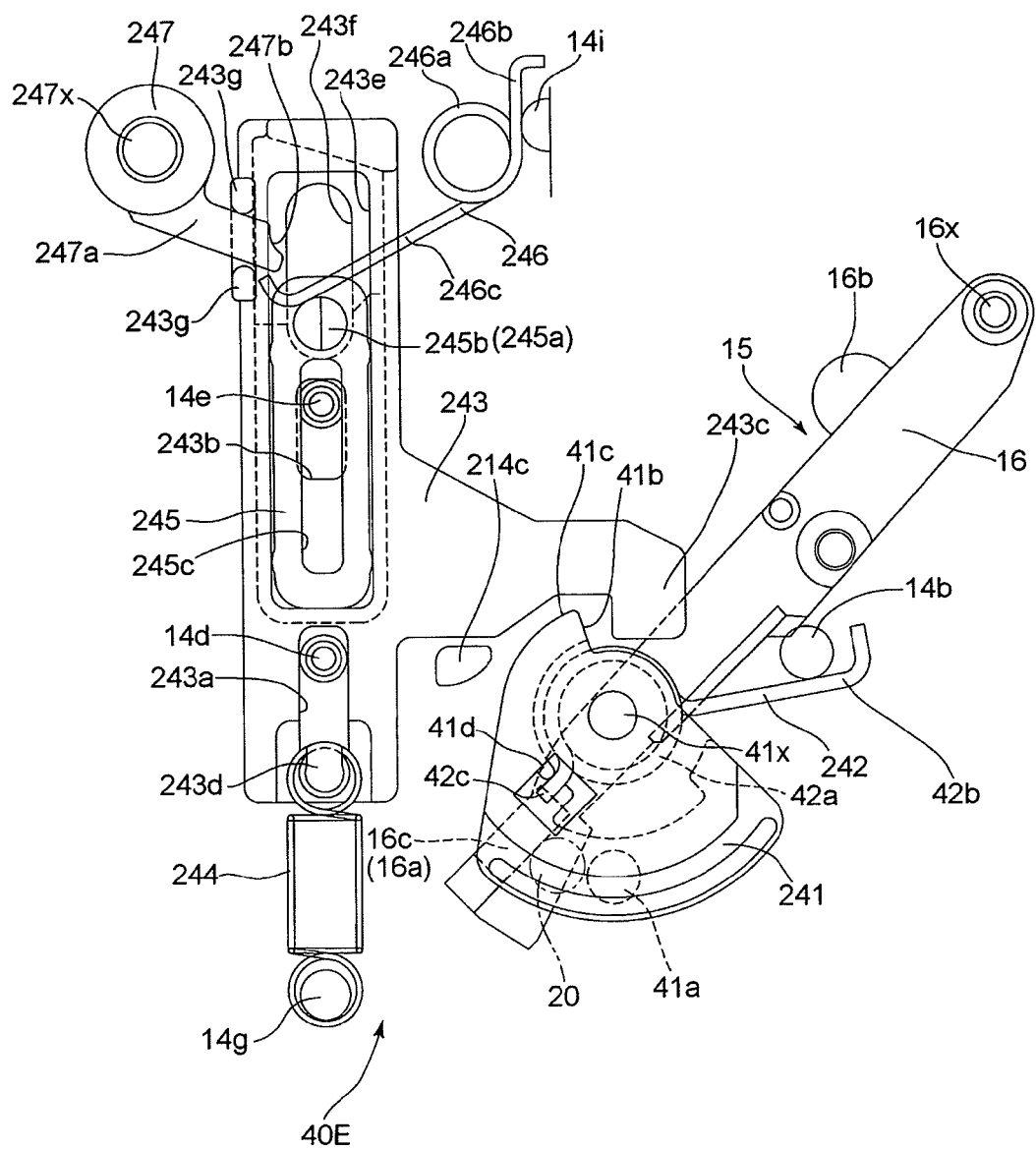
FIG. 40 is a side elevational view of the fifth embodiment of the mirror shock-absorbing mechanism in a state where the movable mirror has rotated from the mirror-up position to the mirror-down position, and the mirror-down shock-absorbing lever has been rotated to a position within an overrun range, exceeding a rotational limit position defined by the mirror-up shock-absorbing lever.
Figure 41:
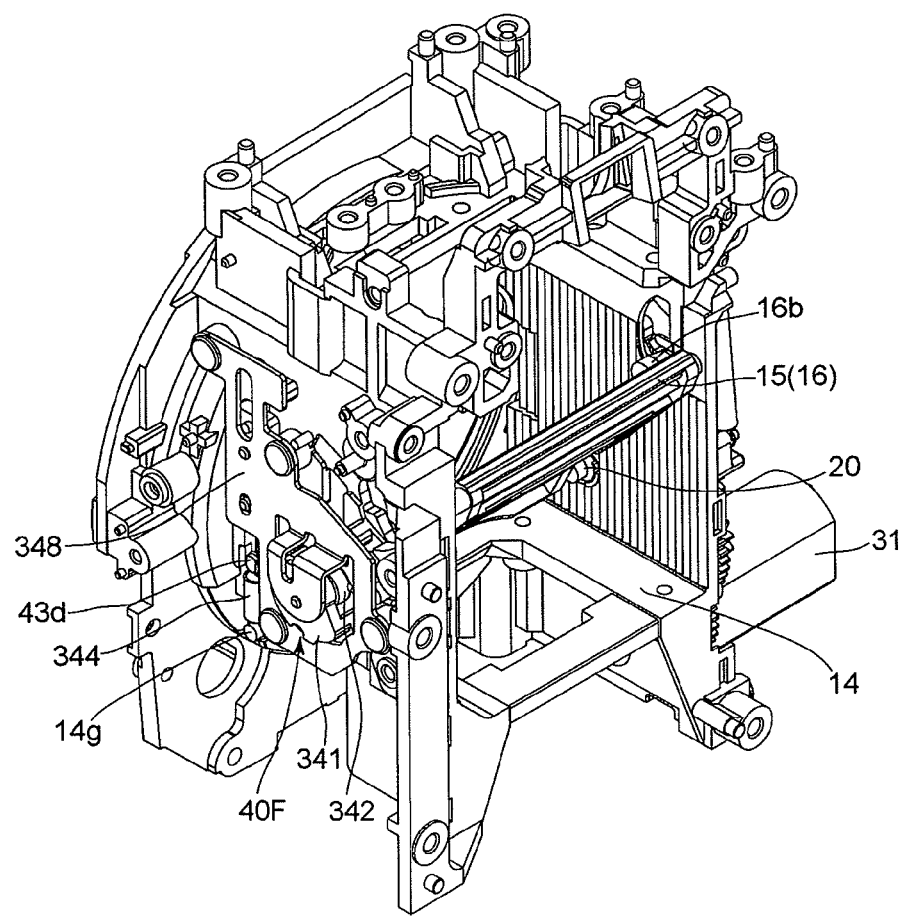
FIG. 41 is a rear perspective view of the mirror box unit in the mirror-down state which is equipped with a sixth embodiment of the mirror shock-absorbing mechanism.
Figure 42:
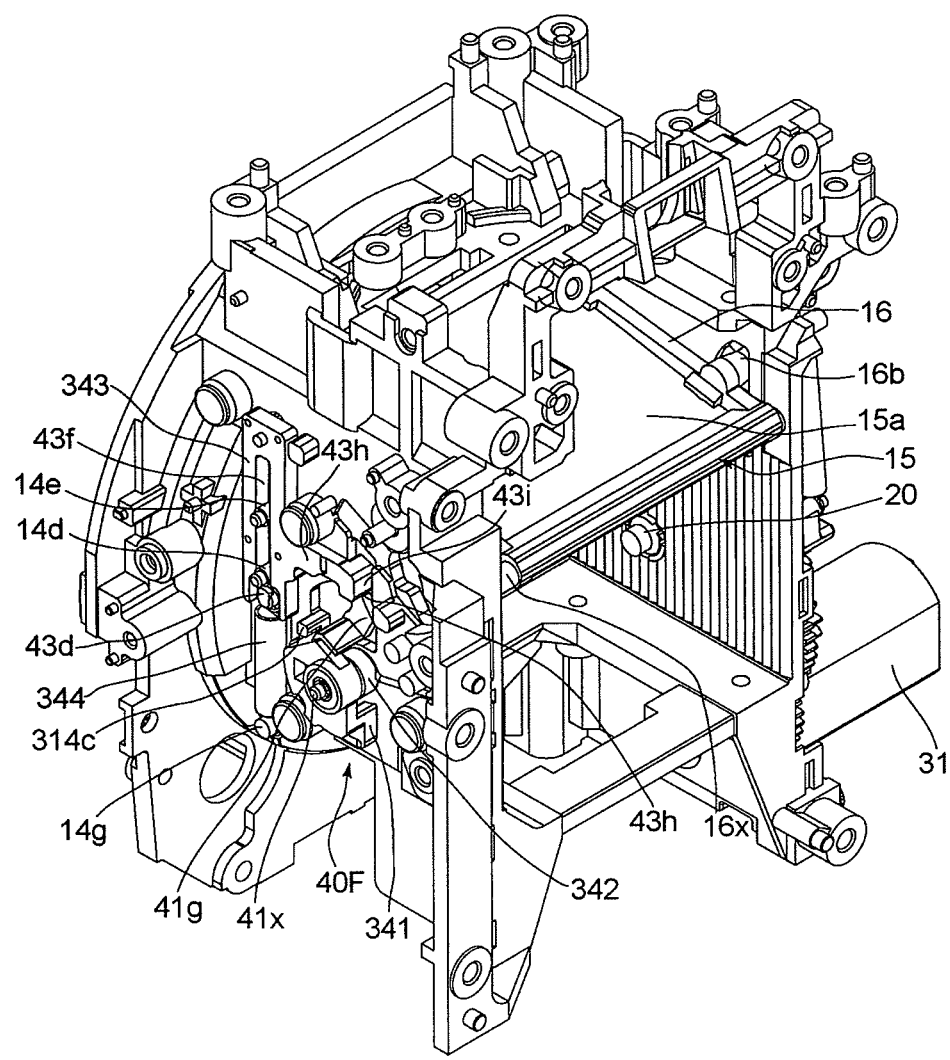
FIG. 42 is a rear perspective view of the mirror box unit in the mirror-up state which is equipped with the sixth embodiment of the mirror shock-absorbing mechanism.
Figure 43:
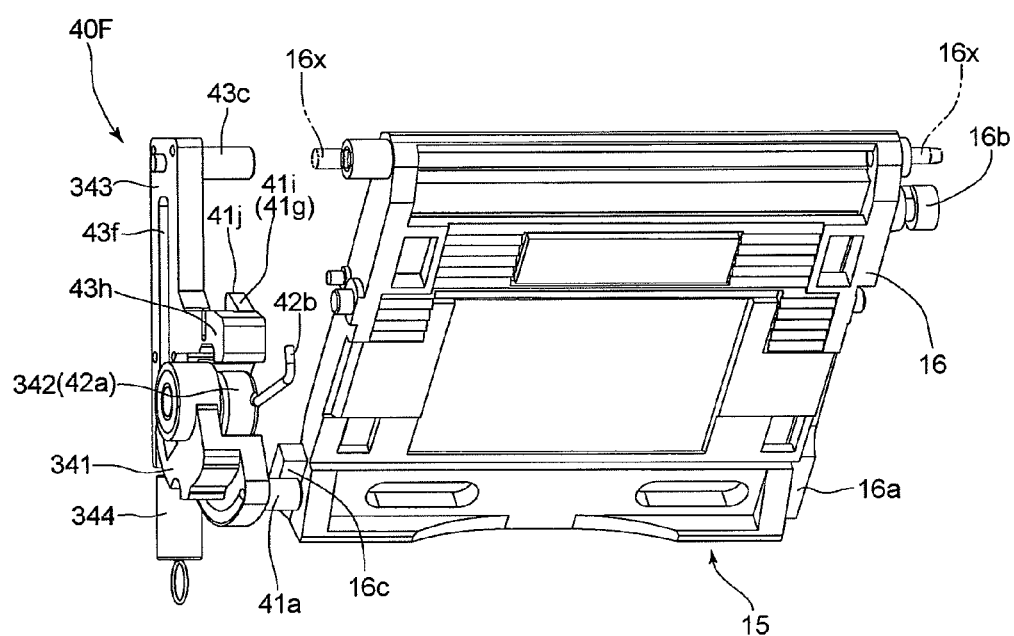
FIG. 43 is a rear perspective view of the sixth embodiment of the mirror shock-absorbing mechanism, showing a state where the contact portion of the mirror seat is in contact with the shock-absorbing pin of the mirror-down shock-absorbing lever.
Figure 44:
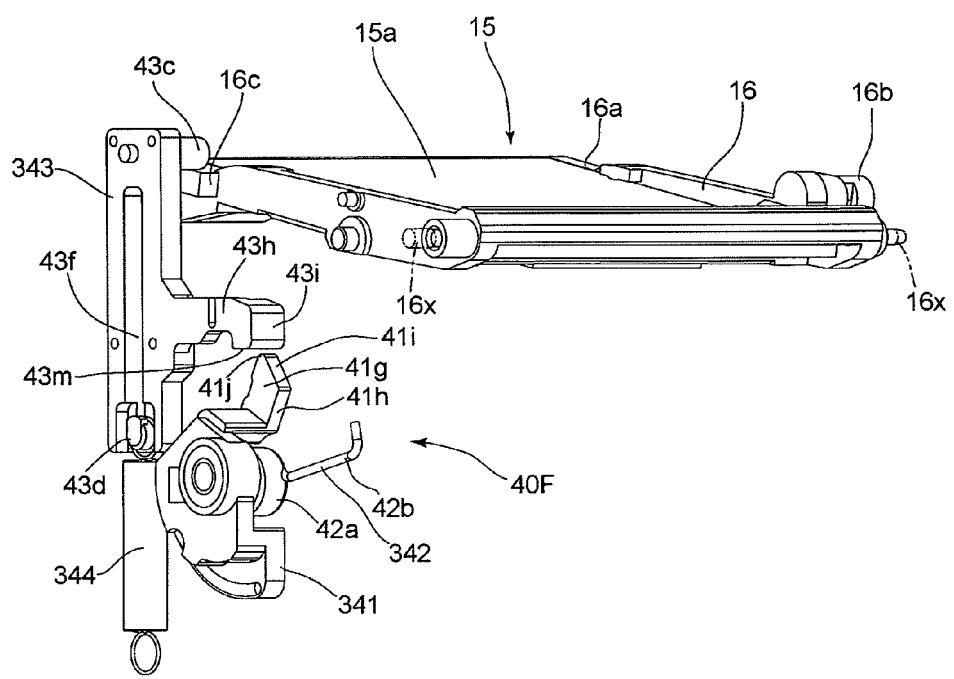
FIG. 44 is a rear perspective view of the sixth embodiment of the mirror shock-absorbing mechanism, showing a state where the contact portion of the mirror seat is in contact with the shock-absorbing pin of the mirror-up shock-absorbing lever.
Figure 45:
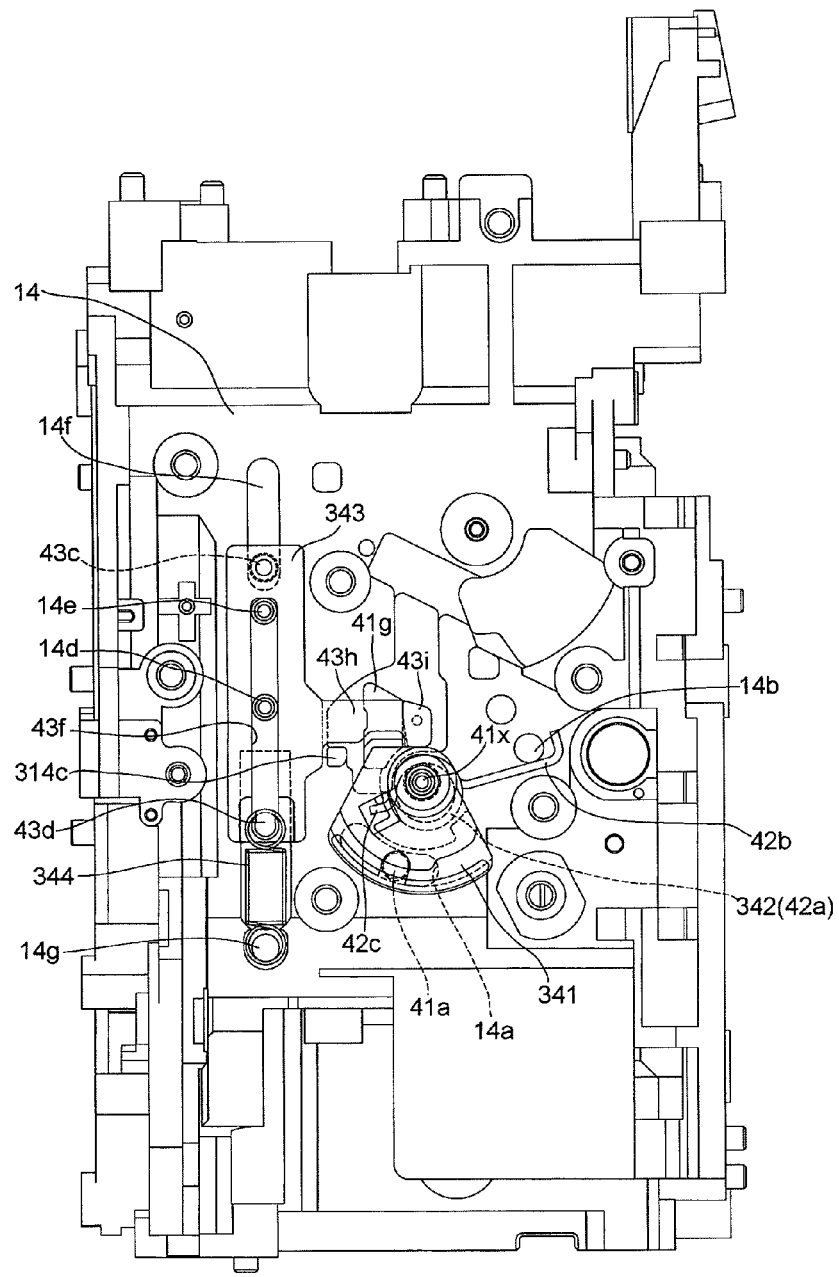
FIG. 45 is a left side elevational view of the mirror box unit shown in FIGS. 41 and 42 with the retaining plate removed to expose the sixth embodiment of the mirror shock-absorbing mechanism.

FIG. 40 shows a state immediately after the movable mirror 15 is rotated to the mirror-down position. Similar to the state shown in FIG. 35, the stopper 16a of the mirror seat 16 comes into contact with the mirror-down position defining pin 20 to thereby prevent the movable mirror 15 from rotating in the mirror-down direction (counterclockwise direction with respect to FIG. 40). As a result of the mirror-down shock-absorbing lever 241 having been pressed and rotated from the shock-absorbing standby position, the prevention of movement of the release lever 243 by engagement of the rotation allowance surface 41c with the rotation-restricting arm 243c is released, and the release lever 243 has been moved down to the shock-absorbing standby position by the biasing force of the release spring 244 as described above. This causes the rotation-restricting arm 243c to move onto the path of rotational movement of the rotationally restricted surface 41b to again prevent the mirror-down shock-absorbing lever 241 from rotating toward the shock-absorbing standby position (clockwise direction with respect to FIG. 40). Similar to the mirror-down shock-absorbing lever 41 of the first embodiment of the mirror shock-absorbing mechanism, when the movable mirror 15 rotates to the mirror-down position, the mirror-down shock-absorbing lever 241 rotates by inertia to the position shown in FIG. 40, and subsequently returns to the position shown in FIG. 35 (into the overrun range in which the shock-absorbing pin 41a is disengaged from the shock-absorbing contact portion 16c of the mirror seat 16 in the mirror-down state), in which the rotationally restricted surface 41b is made to contact the rotation-restricting arm 243c of the release lever 243.

Additionally, the movement of the release lever 243 to the rotational limit position causes the arm holding portion 243g to depress the linking arm 247a, which causes the lock lever 247 to rotate from the lock position to the unlock position. Thereupon, the linking arm 274a of the lock lever 247 retracts from the path of movement of the lock pin 245b, which causes the holding recess 247b and the lock pin 245b to be disengaged from each other to thereby allow the mirror-up shock-absorbing slider 245 to move downward in the support guide hole 243e. Consequently, the biasing force of the mirror-up shock-absorbing spring 246 causes the mirror-up shock-absorbing slider 245 to move down to the shock-absorbing standby position, which corresponds to the limit of downward movement of the mirror-up shock-absorbing slider 245.

As described above, in the mirror shock-absorbing mechanism 40E, bouncing of the movable mirror 15 is suppressed by making the shock-absorbing pin 41a of the mirror-down shock-absorbing lever 241 and the shock-absorbing pin 245a of the mirror-up shock-absorbing slider 245 into contact with the mirror seat 16 when the movable mirror 15 rotates between the mirror-down position and the mirror-up position, respectively. Additionally, the mirror shock-absorbing mechanism 40E is structured such that firstly the mirror-up shock-absorbing slider 245 is solely pressed and moved and subsequently the release lever 243 is pressed and moved together with the mirror-up shock-absorbing slider 245 when shock of the movable mirror 15 which is caused upon the movable mirror 15 rotating from the mirror-down position to the mirror-up position is absorbed. Although a load starts acting on the movable mirror 15 from the moment in time (shown in FIG. 36) at which the shock-absorbing contact portion 16c of the mirror seat 16 commences to press the shock-absorbing pin 245a of the mirror-up shock-absorbing slider 245, the release lever 243 is held at a stationary (constant) position during the time until the mirror-up shock-absorbing slider 245 commences to move integrally with the release lever 243 (i.e., until the mirror shock-absorbing mechanism 40E enters the state shown in FIG. 37). Accordingly, the space for movement of the release lever 243, which supports the mirror-up shock-absorbing slider 245, is reduced to a minimum while a wide range of movement of the mirror-up shock-absorbing slider 245, which directly comes in contact with the shock-absorbing contact portion 16c of the mirror seat 16, is secured, and hence an excellent capability of absorbing shock of the movable mirror 15 can be obtained, even though the mirror shock-absorbing mechanism 40E is compact in structure.

Additionally, in the mirror shock-absorbing mechanism 40E, the mirror-up shock-absorbing slider 245 and the release lever 243 are separately biased by the mirror-up shock-absorbing spring 246 and the release spring 244, respectively; in addition, when the movable mirror 15 rotates to the mirror-up position, first the spring load of the mirror-up shock-absorbing spring 246 is exerted on the movable mirror 15 and subsequently the spring load of the release spring 244 is exerted on the movable mirror 15 in addition to the spring load of the mirror-up shock-absorbing spring 246. Therefore, at an initial stage of the mirror shock-absorbing operation, the load on the movable mirror 15 is small, thus not reducing the rotating speed of the movable mirror 15; however, as the movable mirror 15 approaches the mirror-up position, the load on the movable mirror 15 is increased to reliably reduce bouncing of the movable mirror 15. Moreover, by adjusting the biasing forces of the mirror-up shock-absorbing spring 246 and the release spring 244, the degree of shock-absorbing can be easily set.

Additionally, in a state where the movable mirror 15 is in the mirror-up position, the mirror-up shock-absorbing slider 245 is prevented from moving downward by the lock lever 247 while the release lever 243 is prevented from moving downward by the mirror-down shock-absorbing lever 241. As a result, the range of movement of the shock-absorbing pin 245a that contacts the shock-absorbing contact portion 16c of the mirror seat 16 is limited, which makes it possible to minimize bouncing of the movable mirror 15. Additionally, since the mirror-down shock-absorbing lever 241 that limits the range of downward movement of the release lever 243 is a member which absorbs shock of the movable mirror 15 when the movable mirror 15 rotates from the mirror-up position to the mirror-down position, the number of elements of the mirror shock-absorbing mechanism 40E is smaller than that in the case where the mirror shock-absorbing mechanism is provided with an additional member which limits the range of movement of the release lever 243, hence, the mirror shock-absorbing mechanism 40E is simple in structure. Additionally, the lock lever 247 that limits the range of downward movement of the mirror-up shock-absorbing slider 245 is a member which is rotated between the lock position and the unlock position in accordance with movement of the release lever 243 that supports the mirror-up shock-absorbing slider 245, and accordingly, the lock lever 247 can be operated via a simple structure.

In addition, similar to each of the first through fourth embodiments of the mirror shock-absorbing mechanisms, the mirror-down shock-absorbing lever 241 is prevented from rotating in the biasing direction of the mirror-down shock-absorbing spring 242 by engagement of the rotationally restricted surface 41b of the mirror-down shock-absorbing lever 241 with the rotation-restricting arm 243c of the release lever 243 when the movable mirror 15 rotates from the mirror-up position to the mirror-down position, contrary to when the movable mirror 15 rotates from the mirror-down position to the mirror-up position, so that no influence is exerted on the positioning of the movable mirror 15 that is defined by the mirror-down position defining pin 20. Namely, the relationship between the mirror-down shock-absorbing lever 241 and the release lever 243 is such that the positions thereof are mutually restricted when the movable mirror 15 is rotated to the mirror-down position and when the movable mirror 15 is rotated to the mirror-up position, which achieves a simplification of the structure.

Additionally, the biasing forces of the mirror-down shock-absorbing spring 242, the release spring 244 and the mirror-up shock-absorbing spring 246 are used not only to absorb shock of the movable mirror 15 but also to limit movements of the mirror-up shock-absorbing slider 245 and the release lever 243 in a state where the movable mirror 15 is in the mirror-up position and to hold the mirror-down shock-absorbing lever 241 in a state where the movable mirror 15 is in the mirror-down position, which also contributes to the simplification of the structure.

As described above, the above illustrated fifth embodiment of the mirror shock-absorbing mechanism 40E is constructed such that shock-absorbing is performed by the mirror-up shock-absorbing slider 245 and the release lever 243, which serve as members which absorb shock of the movable mirror 15 in two stages when the movable mirror 15 rotates from the mirror-down position (viewfinder light-guiding position) to the mirror-up position (retracted position), and that the suppression of bouncing of the mirror-up shock-absorbing slider 245 and the release lever 243 is performed using the mirror-down shock-absorbing lever 241 and the lock lever 247 that serve as a shock absorber for absorbing shock of the movable mirror 15 when the movable mirror 15 rotates from the mirror-up position (retracted position) to the mirror-down position (viewfinder light-guiding position). In contrast, the above description of the fifth embodiment of the mirror shock-absorbing mechanism 40E is read with the terms "the mirror-up position" and "the mirror-down position" reversed, the present invention is also applicable to obtain similar effects when the movable mirror 15 rotates from the mirror-up position (retracted position) to the mirror-down position (viewfinder light-guiding position).

A sixth embodiment of the mirror shock-absorbing mechanism 40F will be hereinafter discussed with reference to FIGS. 41 through 51. The mirror shock-absorbing mechanism 40F is provided with a mirror-down shock-absorbing lever (first shock-absorbing member) 341, a mirror-down shock-absorbing spring (first biaser) 342, a mirror-up shock-absorbing lever (second shock-absorbing member) 343 and a mirror-up shock-absorbing spring (second biaser) 344. The mirror-down shock-absorbing lever 341, the mirror-down shock-absorbing spring 342, the mirror-up shock-absorbing lever 343 and the mirror-up shock-absorbing spring 344 are held so as not to come off the mirror box 14 by a retaining plate 348 (see FIG. 41) fixed to a side of the mirror box 14. The mirror-down shock-absorbing lever 341, the mirror-down shock-absorbing spring 342, the mirror-up shock-absorbing lever 343 and the mirror-up shock-absorbing spring 344 correspond to the mirror-down shock-absorbing lever 141, the mirror-down shock-absorbing spring 142, the mirror-up shock-absorbing lever 143 and the mirror-up shock-absorbing spring 144 of the third embodiment of the mirror shock-absorbing mechanism 40C, respectively, and elements of the sixth embodiment of the mirror shock-absorbing mechanism 40F which are the same as those of the third embodiment of the mirror shock-absorbing mechanism 40C are designated by the same reference numerals and the detailed description of the same elements will be omitted.

The mirror-down shock-absorbing lever 341 is provided with a control arm (first movement control member) 41g, which projects in a direction perpendicular to the shaft 41x of the mirror-down shock-absorbing lever 341, at an outer radial position away from the shaft 41x. A rotationally restricted surface 41h is formed on one side of the control arm 41g, and an inclined cam surface (auxiliary pressing member/first sliding contact surface) 41i is formed on aside of the control arm 41g that is adjacent to the rotationally restricted surface 41h. The rotationally restricted surface 41h is a surface that extends in a radial direction that is centered approximately at the axis of the shaft 41x. The inclined cam surface 41i is a surface which is inclined with respect to the rotational direction of the mirror-down shock-absorbing lever 341. More specifically, the inclined cam surface 41i is a surface which inclines in a manner so as to gradually increase the distance thereof from the shaft 41x at a point increasingly distant from the boundary position between the rotationally restricted surface 41h and the inclined cam surface 41i. A downward-restricting protrusion 41j is formed at the end (tip) of the control arm 41g in a continuous manner with the inclined cam surface 41i.

The mirror-down shock-absorbing spring 342 is a torsion spring similar to the mirror-down shock-absorbing springs 42, 142 and 242 of each of the first through fifth embodiments of the mirror shock-absorbing mechanisms. The mirror-down shock-absorbing spring 342 biases the mirror-down shock-absorbing lever 341 in a direction to rotate the mirror-down shock-absorbing lever 341 toward a shock-absorbing standby position, in which the mirror-down shock-absorbing lever 341 comes in contact with a rotational limit projection 314c which projects from a side of the mirror box 14.

A hook-shaped thick end-portion (second movement control member) 43i, which is bent downwardly, is formed at an end part of a side arm 43h that is provided on the mirror-up shock-absorbing lever 343. A rotational restricting surface 43j, an inclined cam surface (auxiliary pressing member/second sliding contact surface) 43k, and a downward-movement restricting surface 43m are formed on the thick end-portion 43i. The rotational restricting surface 43j is formed as a flat surface (plane) that is substantially parallel to the moving direction of the mirror-up shock-absorbing lever 343. An inclined cam surface 43k is formed as a surface that is inclined to the linear movement direction of the mirror-up shock-absorbing lever 343. More specifically, the inclined cam surface 43k is a surface which inclines in a manner so as to gradually increase the distance thereof from the body of the mirror-up shock-absorbing lever 343 (so as to approach the end of the side arm 43h) at a point increasingly distant from the boundary position between the rotational restricting surface 43j and the inclined cam surface 43k in a downward direction. The downward-movement restricting surface 43m is a surface which faces downwardly, formed in a continuous manner from the inclined cam surface 43k, and defines a flat surface which is substantially orthogonal to the movement direction of the mirror-up shock-absorbing lever 343. The rotational restricting surface 43j, the inclined cam surface 43k and the downward-movement restricting surface 43m are positioned in (intersect) a common plane defined by the control arm 41g of the mirror-down shock-absorbing lever 341, so that it is possible for the control arm 41g and the thick end-portion 43i to mutually contact each other in accordance with the relative positional relationship of the mirror-down shock-absorbing lever 341 and the mirror-up shock-absorbing lever 343.

Figure 46:
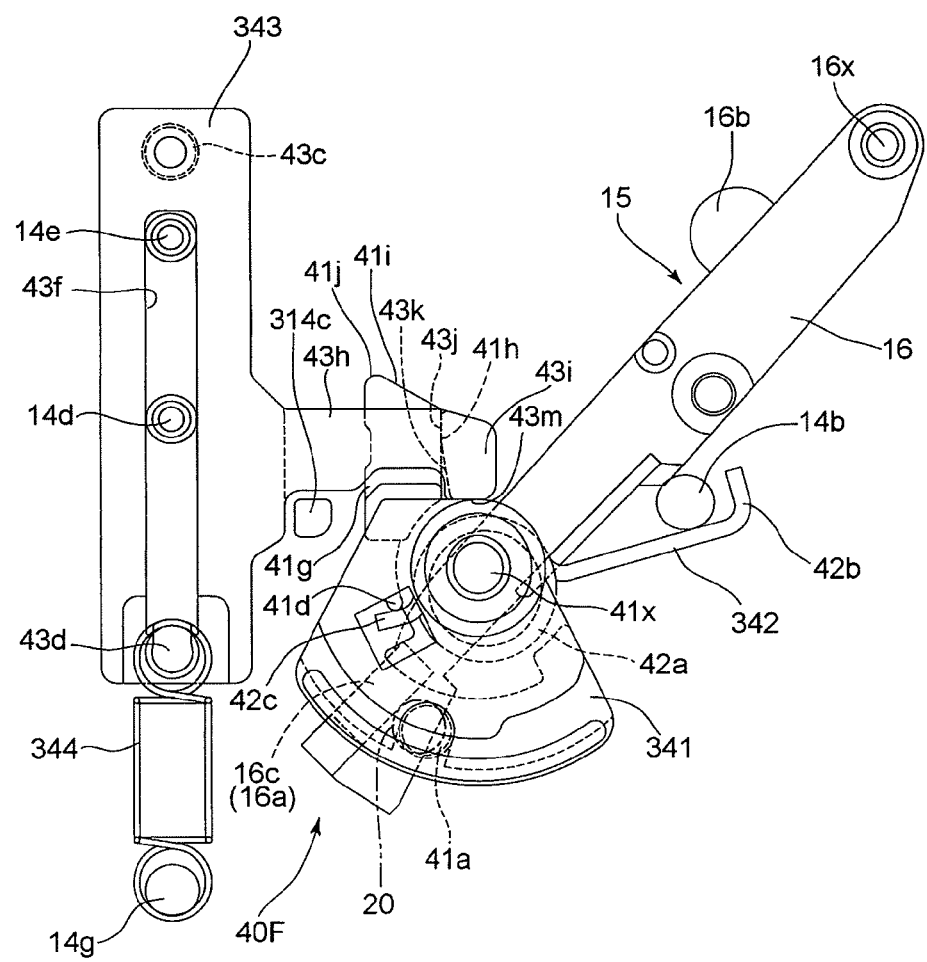
FIG. 46 is a side elevational view of the sixth embodiment of the mirror shock-absorbing mechanism in the mirror-down state.

The mirror-up shock-absorbing spring 344 is an extension spring which biases the movement of the mirror-up shock-absorbing lever 343 toward the downward shock-absorbing standby position. At the shock-absorbing standby position of the mirror-up shock-absorbing lever 343, the thick end-portion 43i of the side arm 43h enters into the rotational path of the control arm 41g, defined about the shaft 41x of the mirror-down shock-absorbing lever 341, so that the rotation of the mirror-down shock-absorbing lever 341 toward the biasing direction of the mirror-down shock-absorbing spring 342 is restricted due to the rotational restricting surface 43*j* abutting against the rotationally restricted surface 41*h* in order to hold the mirror-down shock-absorbing lever 341 within the overrun range (FIGS. 46 and 47).

Whereas, in a state in which the thick end-portion 43*i* of the side arm 43*h* is released from the rotational path of the control arm 41*g* (see FIG. 49), the holding of the mirror-down shock-absorbing lever 341 in the overrun range is released, so that the mirror-down shock-absorbing lever 341 can rotate toward the biasing direction (shock-absorbing standby position) of the mirror-down shock-absorbing spring 342. When the mirror-down shock-absorbing lever 341 is in the shock-absorbing standby position, the control arm 41*g* enters into the rotational path of the thick end-portion 43*i* of the side arm 43*h*, so that movement of the mirror-up shock-absorbing lever 343 toward the biasing direction (shock-absorbing standby position) of the mirror-up shock-absorbing spring 344 is restricted by the downward-restricting protrusion 41*j* abutting against the downward-movement restricting surface 43*m* (see FIG. 50).

Operations of the mirror shock-absorbing mechanism 40F will be hereinafter discussed with reference to FIGS. 46 through 51. FIG. 46 shows a state where the movable mirror is in the mirror-down position. The mirror-up shock-absorbing lever 343 is held in the shock-absorbing standby position by the biasing force of the mirror-up shock-absorbing spring 344 and prevents the mirror-down shock-absorbing lever 341 from rotating in the biasing direction of the mirror-down shock-absorbing spring 342 (i.e., in the clockwise direction with respect to FIG. 46) by bringing the side arm 43*h* of the rotational restricting surface 43*j* into contact with the rotationally restricted surface 41*h* of the control arm 41*g*. At this stage, the mirror-down shock-absorbing lever 341 is held in the overrun position, in which the shock-absorbing pin 41*a* is disengaged from the shock-absorbing contact portion 16*c* of the mirror seat 16 in the mirror-down direction (counterclockwise direction with respect to FIG. 46).

Figure 47:
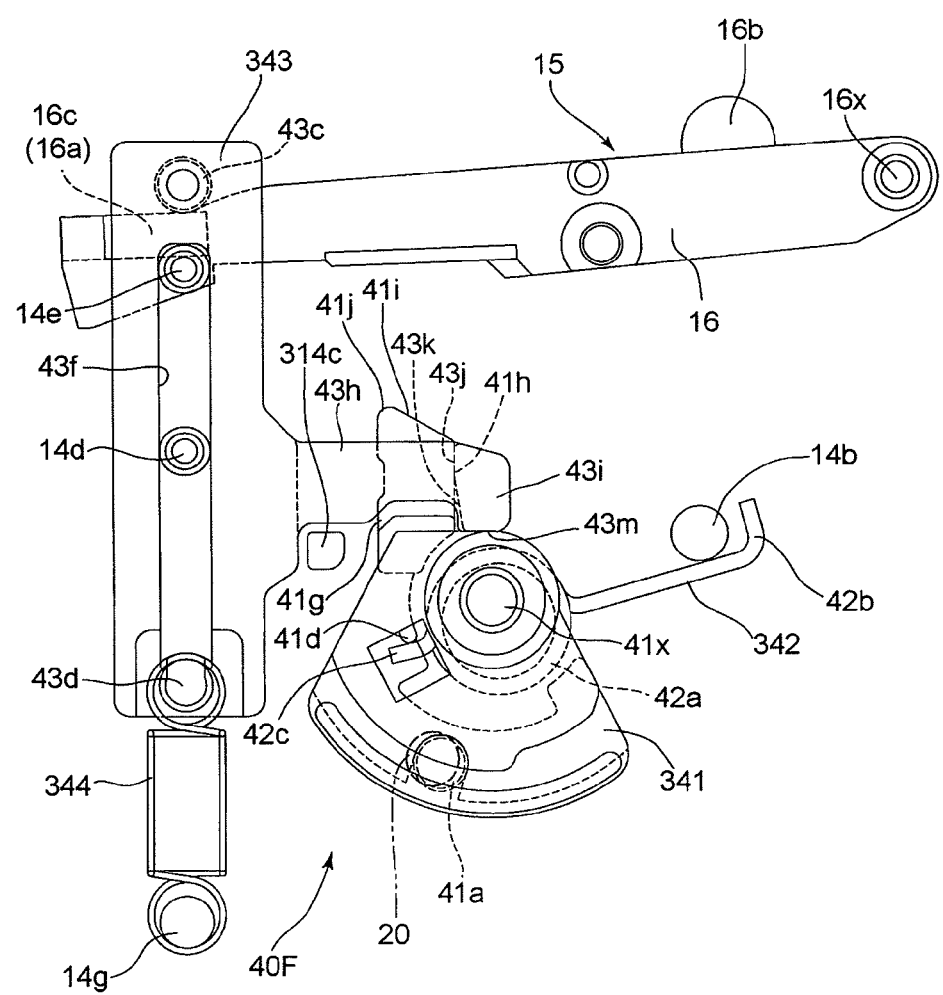
FIG. 47 is a side elevational view of the sixth embodiment of the mirror shock-absorbing mechanism in a state where the movable mirror is in the process of rotating to the mirror-up position from the mirror-down position.

When the movable mirror 15 is rotated from the mirror-down position toward the mirror-up position to thereby bring an upper surface of the shock-absorbing contact portion 16*c* of the mirror seat 16 into contact with the shock-absorbing pin 43*c* of the mirror-up shock-absorbing lever 343 as shown in FIG. 47, the mirror-up shock-absorbing lever 343 is pressed and moved upward from the shock-absorbing standby position against the biasing force of the mirror-up shock-absorbing spring 344.

Figure 48:
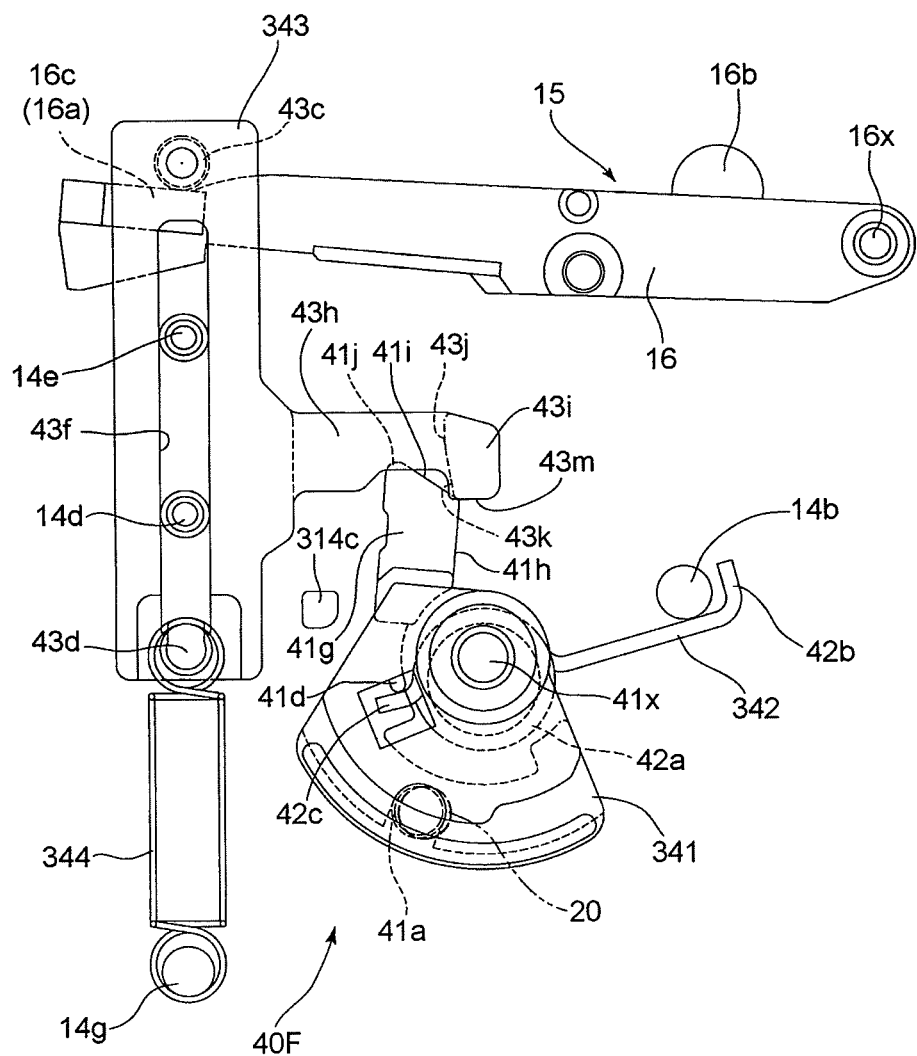
FIG. 48 is a side elevational view of the sixth embodiment of the mirror shock-absorbing mechanism in a state where the movable mirror is in the process of rotating to the mirror-up position from the mirror-down position.

Upon the mirror-up shock-absorbing lever 343 being pressed and moved upward from the shock-absorbing standby position, the rotational restricting surface 43*j* of the thick end-portion 43*i* (of the side arm 43*h*) retracts upward from the opposing position of the control arm 41*g* of the mirror-down shock-absorbing lever 341. Since the inclined cam surface 43*k*, which is continuously formed with the rotational restricting surface 43*j*, is a surface which is inclined in a direction away from the control arm 41*g* at a point increasingly downward, the mirror-down shock-absorbing lever 341 which is released from the rotational restriction from the rotational restricting surface 43*j* slightly rotates in the clockwise direction while the control arm 41*g* slides against the inclined cam surface 43*k* by the biasing force of the mirror-down shock-absorbing spring 342. Consequently, as shown in FIG. 48, the inclined cam surface 41*i* of the mirror-down shock-absorbing lever 341 abuts against the thick end-portion 43*i* (the boundary position between the inclined cam surface 43*k* and the downward-movement restricting surface 43*m*) of the mirror-up shock-absorbing lever 343. At this stage, the movable mirror 15 has not yet reached the mirror-up position.

Upon reaching the state shown in FIG. 48, the upward pressing force of the control arm 41*g* of the mirror-down shock-absorbing lever 341 that rotates to the shock-absorbing standby position by the biasing force of the mirror-down shock-absorbing spring 342 also acts on the mirror-up shock-absorbing lever 343 together with the upward pressing force of the shock-absorbing contact portion 16*c* of the mirror seat 16. Specifically, upon the mirror-down shock-absorbing lever 341 rotating in the clockwise direction by the biasing force of the mirror-down shock-absorbing spring 342, a component of force occurs that acts on the mirror-up shock-absorbing lever 343 to push the mirror-up shock-absorbing lever 343 upward in accordance with the inclination shape of the inclined cam surface 41*i* while the inclined cam surface 41*i* slides against the thick end-portion 43*i* of the side arm 43*h*. The movement resistance of the mirror-up shock-absorbing spring 344 against the mirror-up shock-absorbing lever 343 gradually increases from when the shock-absorbing contact portion 16*c* and the shock-absorbing pin 43*c* start to abut each other, as shown in FIG. 47, until reaching the state shown in FIG. 48. However, since the mirror-down shock-absorbing lever 341 supplementally presses the mirror-up shock-absorbing lever 343, the load of the mirror-up shock-absorbing lever 343 against the movable mirror does not become excessive, so that the mirror-up shock-absorbing lever 343 can reliably and securely be moved to the upper position, which corresponds to the mirror-up position of the movable mirror 15. In other words, the mirror-up shock-absorbing lever 343 is not hindered from reaching the mirror-up position of the movable mirror 15. Note that while the mirror-down shock-absorbing lever 341 presses against the mirror-up shock-absorbing lever 343 using the inclined cam surface 41*i*, since a pressing component force also acts on the mirror-up shock-absorbing lever 343 in a direction intersecting the linear movement direction of the guiding action of the guide hole 43*f* and the guide pins 14*d* and 14*e*, any backlash that would otherwise occur between the guide hole 43*f* and the guide pins 14*d* and 14*e* is absorbed, so that an effect is also obtained in which the mirror-up shock-absorbing lever 343 can smoothly move without play.

Figure 49:
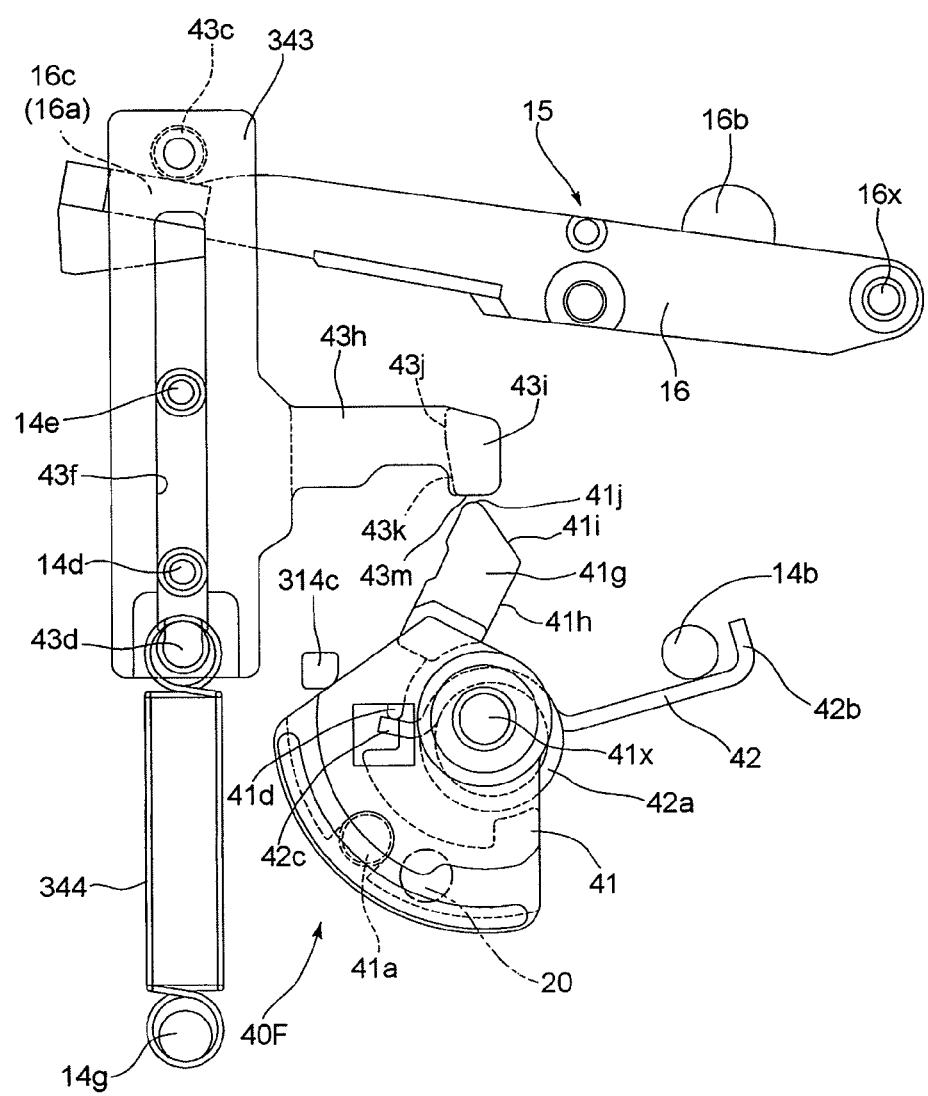
FIG. 49 is a side elevational view of the sixth embodiment of the mirror shock-absorbing mechanism in the mirror-up state.

Thereafter, upon the mirror-up shock-absorbing lever 343 being moved upward until the entire side arm 43*h* is totally removed upwardly from the rotational path of the control arm 41*g*, the rotational restriction against the mirror-down shock-absorbing lever 341 is completely released, so that the mirror-down shock-absorbing lever 341 rotates until the shock-absorbing standby position, at which the mirror-down shock-absorbing lever 341 abuts against the rotational limit projection 314*c*, by the biasing force of the mirror-down shock-absorbing spring 342 (see FIG. 49).

As shown in FIG. 49, when the mirror-down shock-absorbing lever 341 is rotated to the shock-absorbing standby position, the downward-restricting protrusion 41*j* is positioned immediately below the downward-movement restricting surface 43*m* of the mirror-up shock-absorbing lever 343. FIG. 49 shows a state where the mirror-up shock-absorbing lever 343 has been moved up by the movable mirror 15 rotated to the mirror-up position to thereby create a slight gap between the end (tip) of the downward-restricting protrusion 41*j* and the downward-movement restricting surface 43*m*. From this state, a downward movement of the mirror-up shock-absorbing lever 343 causes the downward-movement restricting surface 43*m* to come into contact with the end (tip) of the downward-restricting protrusion 41*j* as shown in FIG. 50, and engagement of the downward-movement restricting surface

43m with the downward-restricting protrusion 41j prevents the mirror-up shock-absorbing lever 343 from moving further downward.

As described above, when the movable mirror 15 rotates from the mirror-down position to the mirror-up position, the spring load of the mirror-up shock-absorbing spring 344 is exerted on rotation of the movable mirror 15 to absorb shock of the movable mirror 15 by engagement of the shock-absorbing contact portion 16c of the mirror sheet 16 with the shock-absorbing pin 43c of the mirror-up shock-absorbing lever 343. Additionally, the range of movement (the amount of downward movement) of the mirror-up shock-absorbing lever 343 in a state where the movable mirror 15 has reached the mirror-up position is limited to an extremely small range by the engagement between the downward-movement restricting surface 43m and the downward-restricting protrusion 41j of the mirror-down shock-absorbing lever 341. This reduces the degree of rebounding movement of the mirror-up shock-absorbing lever 343, shortens the duration of bouncing (vibration) of the movable mirror 15 and reduces the number of bounces thereof when the movable mirror 15 rotates to the up position. Namely, the shock-absorbing capability for the movable mirror is enhanced. Additionally, since the mirror-down shock-absorbing lever 341 supplementally presses the mirror-up shock-absorbing lever 343 using the inclined cam surface 41i, the mirror-up shock-absorbing lever 343 can reliably and securely be moved to the upper position, which corresponds to the mirror-up position of the movable mirror 15.

Figure 50:
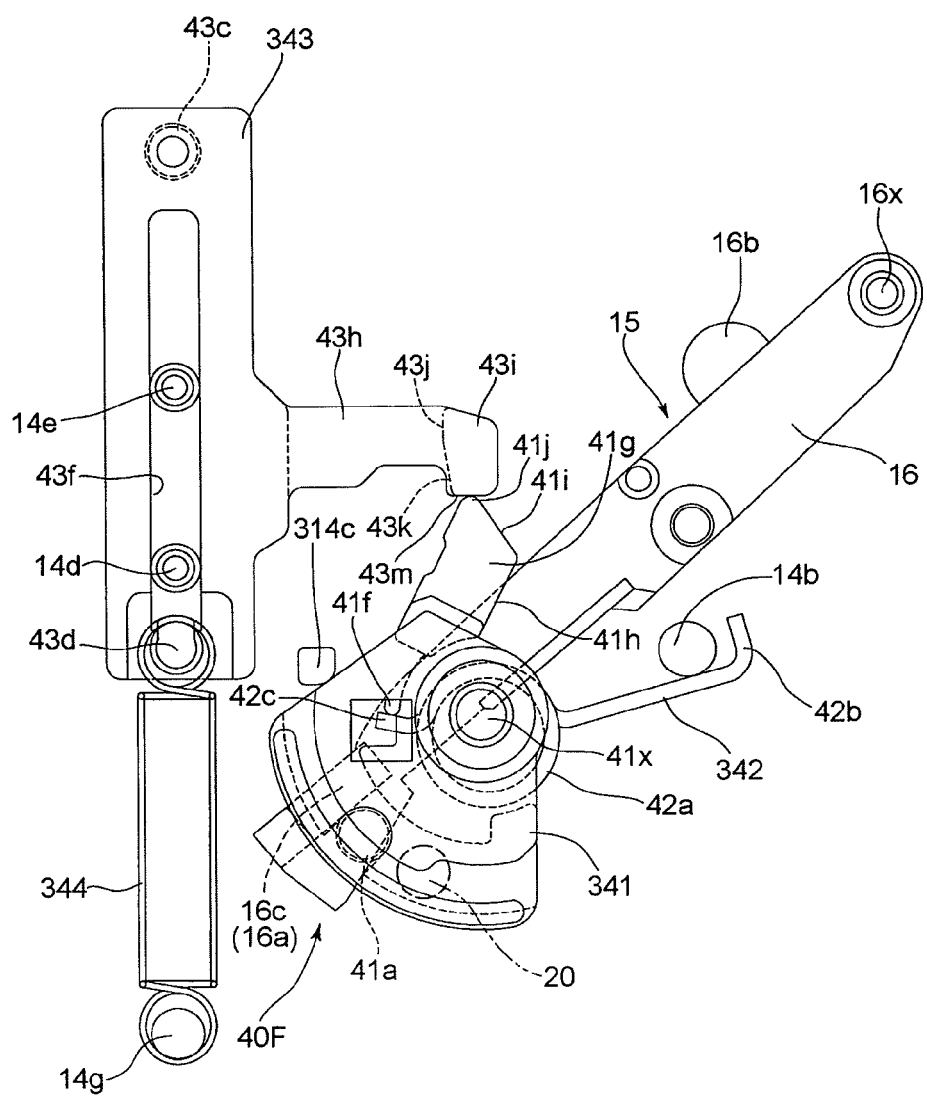
FIG. 50 is a side elevational view of the sixth embodiment of the mirror shock-absorbing mechanism in a state where the mirror-up shock-absorbing lever is prevented from moving down by the mirror-down shock-absorbing lever.

In a reverse operation to the above described mirror-up operation, as the movable mirror 15 approaches the mirror-down position while rotating from the mirror-up position, the shock-absorbing contact portion 16c of the mirror sheet 16 comes into contact with the shock-absorbing pin 41a of the mirror-down shock-absorbing lever 341 before the stopper 16a of the mirror sheet 16 comes into contact with the down-position defining pin 20, as shown in FIG. 50. At this stage, the mirror-down shock-absorbing lever 341 is held in the shock-absorbing standby position by the biasing force of the mirror-down shock-absorbing spring 342, and movement of the mirror-up shock-absorbing lever 343 toward the biasing direction (shock-absorbing standby position) of the mirror-up shock-absorbing spring 344 is restricted by the downward-restricting protrusion 41j abutting against the downward-movement restricting surface 43m.

Figure 51:
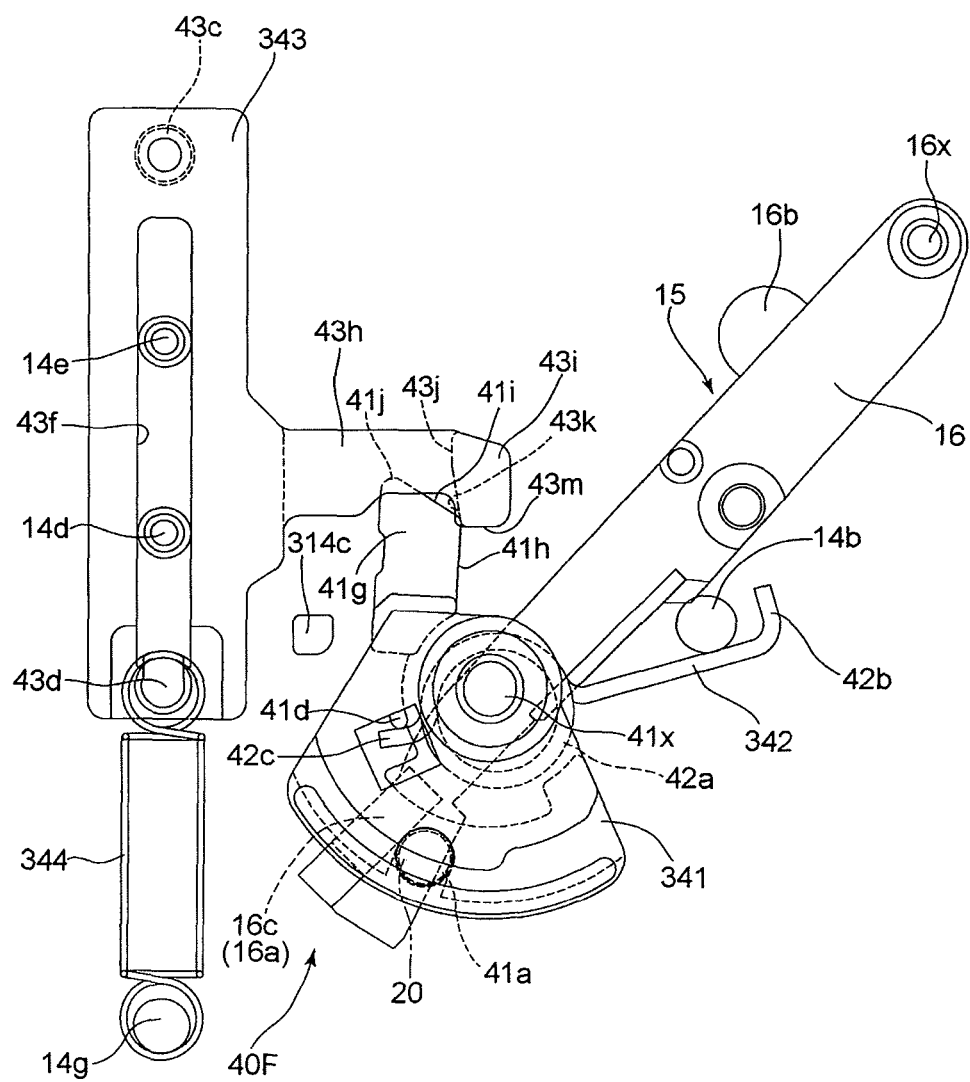
FIG. 51 is a side elevational view of the sixth embodiment of the mirror shock-absorbing mechanism in a state where the movable mirror is in the process of rotating to the mirror-down position from the mirror-up position.

During the rotation of the movable mirror 15 from the position shown in FIG. 50 until the mirror-down position shown in FIG. 51, the shock-absorbing contact portion 16c of the mirror seat 16 pushes the shock-absorbing pin 41a downward, rotating the mirror-down shock-absorbing lever 341 in an anti-clockwise direction from the shock-absorbing standby position, shown in FIG. 50, against the biasing force of the mirror-down shock-absorbing spring 342. FIG. 51 shows the instance when the movable mirror 15 has reached the mirror-down position, at which the stopper 16a abuts the mirror-down register pin 20. During the mirror-down operation of the movable mirror 15, the position of the movable mirror 15 shown in FIG. 50 until the position thereof in FIG. 51 define the range (shock-absorbing moving range) in which a shock-absorbing effect can be achieved by the mirror-down shock-absorbing lever 341. The mirror-down shock-absorbing lever 341 is rotated by the inertial force from the position shown in FIG. 51 to the above-mentioned overrun range advanced further in the anti-clockwise direction. In the state shown in FIG. 51, the downward-restricting protrusion 41j of the mirror-down shock-absorbing lever 341 is already removed from the lower position of the downward-movement restricting surface 43m of the side arm 43h, so that the mirror-up shock-absorbing lever 343, which has been released from restriction of downward movement thereof, is moved toward the shock-absorbing standby position by the biasing force of the mirror-up shock-absorbing spring 344, and the inclined cam surface 43k abuts against the control arm 41g (the boundary position between the rotationally restricted surface 41h and the inclined cam surface 41i). Thereafter, the downward pressing force of the side arm 43h (thick end-portion 43i) of the mirror-up shock-absorbing lever 343, which moves toward the shock-absorbing standby position by the biasing force of the mirror-up shock-absorbing spring 344 together with the inertial moving force of the mirror-up shock-absorbing lever 343, also acts on the mirror-down shock-absorbing lever 341. Specifically, when the mirror-up shock-absorbing lever 343 moves down from the position thereof shown in FIG. 51 by the biasing force of the mirror-up shock-absorbing spring 344, a component force occurs which rotates the mirror-down shock-absorbing lever 341 in the anti-clockwise direction in accordance with the inclined shape of the inclined cam surface 43k while the inclined cam surface 43k slides against the control arm 41g. The movement resistance of the downward-absorbing spring 342 against the mirror-down shock-absorbing lever 341 gradually increases from when the shock-absorbing contact portion 16c and the shock-absorbing pin 41a start to abut each other, as shown in FIG. 50, until reaching the state shown in FIG. 51. However, since the mirror-up shock-absorbing lever 343 supplementally presses the mirror-down shock-absorbing lever 341, the mirror-down shock-absorbing lever 341 can reliably and securely be moved to the lower position which corresponds to the mirror-down position of the movable mirror 15.

As described above, in the mirror shock absorbing mechanism 40F, since the device which restricts the movement range of the mirror-up shock-absorbing lever 343 in the mirror-up state also includes the mirror-down shock-absorbing lever 341, and since the device which restricts the movement range of the mirror-down shock-absorbing lever 341 in the mirror-down state also includes the mirror-up shock-absorbing lever 343, there is no need to provide a separate member for restricting the movement ranges of the mirror-down shock-absorbing lever 341 and the mirror-up shock-absorbing lever 343, so that a superior shock-absorbing capability can be achieved with a simple structure having a small number of components.

In addition, when the movable mirror 15 is rotated to the mirror-up position, the mirror-up shock-absorbing lever 343 that absorbs shock is supplementally pressed and moved by the mirror-down shock-absorbing lever 341 until the position corresponding to the mirror-up state (see FIG. 49); and when the movable mirror 15 is rotated to the mirror-down position, the mirror-down shock-absorbing lever 341 that absorbs shock is supplementally pressed and moved by the mirror-up shock-absorbing lever 343 until the position corresponding to the mirror-down state (see FIG. 46). Accordingly, the mirror-down shock-absorbing lever 341 and the mirror-up shock-absorbing lever 343 can be reliably and securely moved to a position after shock absorbing. According to this structure, even if the biasing forces of the mirror-down shock-absorbing spring 342 and the mirror-up shock-absorbing spring 344 are set at strong amounts, since the rotation of the movable mirror 15 to the mirror-down position and to the mirror-up position is not hindered, the degree of freedom for setting the shock-absorbing capability using the mirror-down shock-absorbing lever 341 and the mirror-up shock-absorbing lever 343 is improved. Furthermore, due to the relationship of the supplementally pressing movements of the mirror-down shock-absorbing lever 341 and the mirror-up shock-absorbing lever 343 that are mutually carried out on each other, there is no need to provide a separate mechanism for such supplementally pressing movements so that the number of components does not increase.

Note that in the mirror shock absorbing mechanism 40F, the mirror-down shock-absorbing lever 341 and the mirror-up shock-absorbing lever 343 are provided with the inclined cam surface 41i and the inclined cam surface 43k, respectively, and is configured so that the supplemental pressing movements of the mirror-down shock-absorbing lever 341 and the mirror-up shock-absorbing lever 343 can be carried out during the mirror-up operation and during the mirror-down operation, respectively, using the two inclined cam surfaces 41i and 43k. Alternatively, a configuration also possible in which only one of the inclined cam surfaces 41i and 43k is provided to assist only one of the movement of the mirror-up shock-absorbing lever 343 during the mirror-up operation and the movement of the mirror-down shock-absorbing lever 341 during the mirror-down operation, respectively. Namely, the present invention is achieved if at least one of a first shock-absorbing member (mirror-down shock-absorbing lever 341) that absorbs shock during the mirror-down operation and a second shock-absorbing member (mirror-up shock-absorbing lever 343) that absorbs shock during the mirror-up operation supplementally presses and moves the other of the first and second shock-absorbing members.

Although the present invention has been described with reference to the above illustrated embodiments of the mirror shock absorbing mechanisms, the present invention is not limited to these particular embodiments. For instance, although the shock absorbing member (the mirror-down shock-absorbing lever 41, 141, 241 or 341) which absorbs bouncing of the movable mirror 15 when the movable mirror 15 rotates to the down position is a rotational member which rotates about the shaft 41x while the shock absorbing member (the mirror-up shock-absorbing lever 43, 143, 245 or 343, or the release lever 243) which absorbs bouncing of the movable mirror 15 when the movable mirror 15 rotates to the up position is a linearly moving member in each of the above described embodiments of the mirror shock absorbing mechanisms, a combination of the manners of movement (directions of movement) of these shock absorbing members that operate when the movable mirror 15 rotates to the mirror-up position and when the movable mirror 15 rotates to the mirror-down position can be made different from above.

Additionally, according to the present invention, the detailed shape of each shock absorbing member for the movable mirror 15 can be different from that in each of the above described embodiments. For instance, each of the third and fourth embodiments of the mirror shock absorbing mechanism 40C and 40D is provided on the mirror-down shock-absorbing lever 141 side with the downward movement restricting arm 41e as a projection that projects radially outwards to serve as a movement restricting portion which limits the range of movement of the mirror-up shock-absorbing lever 143 in a state where the movable mirror 15 is in the up position, and the downward movement restricting arm 41e is made to face the downward movement restricted projection 43g of the mirror-up shock-absorbing lever 143; however, it is possible for a projection corresponding to the downward movement restricting arm 41e to be formed on the mirror-up shock-absorbing lever 143 with no projection formed on the mirror-down shock-absorbing lever 141.

Additionally, a torsion spring such as the mirror-down shock-absorbing spring 42, 142, 242 or 342 or the mirror-up shock-absorbing spring 46, 146 or 246 and an extension spring such as the mirror-up shock-absorbing spring 44, 144 or 344 or the release spring 244 can be freely combined to be used as each of the biasing members for biasing the above illustrated shock absorbing members; moreover, a biasing member other than such a torsion spring or an extension spring can also be used. For instance, it is possible to modify the fifth embodiment of the mirror shock absorbing mechanism 40E so that the release lever 243 is biased by a torsion spring such as the mirror-up shock-absorbing spring 246 and the mirror-up shock-absorbing slider 245 is biased by an extension spring such as the release spring 244.

Obvious changes may be made in the specific embodiments of the present invention described herein, such modifications being within the spirit and scope of the invention claimed. It is indicated that all matter contained herein is illustrative and does not limit the scope of the present invention.

The invention claimed is:

1. A movable mirror shock-absorbing mechanism of a camera, comprising:
    a movable mirror which is supported to be rotatable between a viewfinder light-guiding position, in which said movable mirror is positioned in a photographing optical path to reflect incident light from an object toward a viewfinder optical system, and a retracted position, in which said movable mirror is retracted from said photographing optical path to allow said object light to travel toward a photographic light-receiving medium;
    a first mirror-retracting shock-absorbing member which comes into contact with, and is pressed and moved by, said movable mirror when said movable mirror rotates from said viewfinder light-guiding position to said retracted position;
    a second mirror-retracting shock-absorbing member which supports said first mirror-retracting shock-absorbing member in a manner to allow said first mirror-retracting shock-absorbing member to relative to said second mirror-retracting shock-absorbing member, wherein, when said movable mirror rotates from said viewfinder light-guiding position to said retracted position, firstly said second mirror-retracting shock-absorbing member permits said first mirror-retracting shock-absorbing member to move solely in a pressing-moving direction in which said first mirror-retracting shock-absorbing member is pressed and moved by said movable mirror, and subsequently said second mirror-retracting shock-absorbing member is moved with said first mirror-retracting shock-absorbing member in said pressing-moving direction;
    a biaser which biases each of said first mirror-retracting shock-absorbing member and said second mirror-retracting shock-absorbing member in a direction opposite to said pressing-moving direction; and
    a holder which limits movements of said first mirror-retracting shock-absorbing member and said second mirror-retracting shock-absorbing member in a biasing direction of said biaser when said first mirror-retracting shock-absorbing member and said second mirror-retracting shock-absorbing member are pressed and moved in a direction opposite to said biasing direction of said biaser by said movable mirror which rotates toward said retracted position.

2. The movable mirror shock-absorbing mechanism according to claim 1, wherein said holder comprises:
    a mirror-advancing shock-absorbing member which is held in a movement limit position in which movement of said second mirror-retracting shock-absorbing member in said biasing direction of said biaser is limited when said movable mirror is in said retracted position, and which comes into contact with and is pressed and moved by said movable mirror from said movement limit position to absorb shock of said movable mirror and release said limitation to said movement of said second mirror-retracting shock-absorbing member when said movable mirror rotates from said retracted position to said viewfinder light-guiding position; and an interlocking lock member which is moved in association with movement of said second mirror-retracting shock-absorbing member between a lock position in which movement of said first mirror-retracting shock-absorbing member relative to said second mirror-retracting shock-absorbing member is restricted, and an unlock position in which said first mirror-retracting shock-absorbing member is allowed to move relative to said second mirror-retracting shock-absorbing member, wherein said interlocking lock member is held in said lock position when said second mirror-retracting shock-absorbing member is in a position in which movement thereof is restricted by said mirror-advancing shock-absorbing member, and wherein a movement in said biasing direction of said biaser of said second mirror-retracting shock-absorbing member which is released from the restriction in movement thereof by said mirror-advancing shock-absorbing member causes said interlocking lock member to move to said unlock position.

3. The movable mirror shock-absorbing mechanism according to claim 2, wherein each of said first mirror-retracting shock-absorbing member and said second mirror-retracting shock-absorbing member is linearly movable along a plane substantially orthogonal to an axis of rotation of said movable mirror, wherein said interlocking lock member is rotatable about a shaft which is substantially parallel to said axis of rotation of said movable mirror and comprises a radial projection which projects in a radial direction of said shaft, wherein said radial projection is positioned in a path of movement of a restricted portion formed on said first mirror-retracting shock-absorbing member to restrict the movement of said first mirror-retracting shock-absorbing member in said biasing direction of said biaser by engagement of said radial projection with said restricted portion when said interlocking member is in said lock position, and wherein said radial projection retracts from said path of movement of said restricted portion to allow said first mirror-retracting shock-absorbing member to move in said biasing direction of said biaser when said interlocking lock member moves to said unlock position from said lock position.

4. The movable mirror shock-absorbing mechanism according to claim 2, wherein said camera comprises a mirror box which accommodates and supports said movable mirror between a pair of laterally-opposed side walls, wherein said first mirror-retracting shock-absorbing member and said second mirror-retracting shock-absorbing member are supported on one of said pair of side walls of said mirror box, and wherein said biaser comprises:

a first spring which is engaged with said mirror box and said first mirror-retracting shock-absorbing member; and a second spring which is engaged with said mirror box and said second mirror-retracting shock-absorbing member.

5. The movable mirror shock-absorbing mechanism according to claim 2, further comprising a rotational biaser which biases and rotates said mirror-advancing shock-absorbing member toward said movement limit position, wherein said mirror-advancing shock-absorbing member is rotatable about a shaft which is substantially parallel to an axis of rotation of said movable mirror, and wherein said movable mirror presses said mirror-advancing shock-absorbing member against a biasing force of said rotational biaser when said movable mirror rotates to said viewfinder light-guiding position.

6. The movable mirror shock-absorbing mechanism according to claim 5, wherein said second mirror-retracting shock-absorbing member comprises:

a locking portion which defines a movement limit of said second mirror-retracting shock-absorbing member in said biasing direction of said biaser by engagement with a fixed member; and a rotation-restricting portion which moves into a path of rotational movement of said mirror-advancing shock-absorbing member to prevent said mirror-advancing shock-absorbing member from rotating to said movement limit position when said second mirror-retracting shock-absorbing member moves to a position to make said locking portion contact said fixed member, and which retracts from said path of rotational movement of said mirror-advancing shock-absorbing member to allow said mirror-advancing shock-absorbing member to rotate when said second mirror-retracting shock-absorbing member is pressed and moved with said first mirror-retracting shock-absorbing member by said movable mirror in a direction opposite to said biasing direction of said biaser.

7. The movable mirror shock-absorbing mechanism according to claim 6, wherein said mirror-advancing shock-absorbing member comprises:

a rotationally restricted surface which comes into contact with said rotation-restricting portion of said second mirror-retracting shock-absorbing member to be prevented from rotating to said movement limit position; and a rotation allowance surface which is positioned radially outside of said rotationally restricted surface, wherein, when said mirror-advancing shock-absorbing member is in said movement limit position, said rotation allowance surface contacts said second mirror-retracting shock-absorbing member to restrict movement of said second mirror-retracting shock-absorbing member in said biasing direction of said biaser and to allow said mirror-advancing shock-absorbing member to rotate.

8. A movable mirror shock-absorbing mechanism of a camera, comprising:

a movable mirror which is supported to be rotatable between a viewfinder light-guiding position, in which said movable mirror is positioned in a photographing optical path to reflect incident light from an object toward a viewfinder optical system, and a retracted position, in which said movable mirror is retracted from said photographing optical path to allow said object light to travel toward a photographic light-receiving medium;

a first shock-absorbing member which comes into contact with and is pressed and moved by said movable mirror when said movable mirror rotates in one direction between said viewfinder light-guiding position and said retracted position;

a second shock-absorbing member which supports said first shock-absorbing member in a manner to allow said first shock-absorbing member to move relative to said second shock-absorbing member, wherein, when said movable mirror rotates in said one direction, firstly said second shock-absorbing member permits said first shock-absorbing member to move solely in a pressing-moving direction in which said first shock-absorbing member is pressed and moved by said movable mirror, and subsequently said second shock-absorbing member is moved with said first shock-absorbing member in said pressing-moving direction;

a biaser which biases each of said first shock-absorbing member and said second shock-absorbing member in a direction opposite to said pressing-moving direction; and a holder which limits movements of said first shock-absorbing member and said second shock-absorbing member in a biasing direction of said biaser when said first shock-absorbing member and said second shock-absorbing member are pressed and moved by said movable mirror in a direction opposite to said biasing direction of said biaser.

9. The movable mirror shock-absorbing mechanism according to claim 8, wherein said holder comprises:

a third shock-absorbing member which is held in a movement limit position in which movement of said second shock-absorbing member in said biasing direction of said biaser is limited when said movable mirror rotates in said one direction to press and move said first shock-absorbing member and said second shock-absorbing member, and which comes into contact with, and is pressed and moved by, said movable mirror from said movement limit position to release said limitation of said movement of said second shock-absorbing member and to absorb shock of said movable mirror when said movable mirror rotates in a direction opposite to said one direction; and an interlocking lock member which is moved in association with movement of said second shock-absorbing member between a lock position in which said first shock-absorbing member is prevented from moving relative to said second shock-absorbing member and an unlock position in which said first shock-absorbing member is allowed to move relative to said second shock-absorbing member, wherein said interlocking lock member is held in said lock position when said second shock-absorbing member is in a position in which movement thereof is restricted by said third shock-absorbing member, and wherein a movement in said biasing direction of said biaser of said second shock-absorbing member which is released from limitation of movement thereof by said third shock-absorbing member causes said interlocking lock member to move to said unlock position.

* * * * *